United States Patent
Izumoto et al.

(10) Patent No.: US 9,543,834 B2
(45) Date of Patent: Jan. 10, 2017

(54) SWITCHING REGULATOR, ELECTRONIC DEVICE, AND ELECTRONIC CIRCUIT

(71) Applicant: FUJITSU TEN LIMITED, Kobe-shi, Hyogo (JP)

(72) Inventors: Ryoh Izumoto, Kobe (JP); Kiyoshi Koyama, Kobe (JP)

(73) Assignee: FUJITSU TEN LIMITED, Kobe (JP)

( * ) Notice: Subject to any disclaimer, the term of this patent is extended or adjusted under 35 U.S.C. 154(b) by 223 days.

(21) Appl. No.: 14/257,615

(22) Filed: Apr. 21, 2014

(65) Prior Publication Data

US 2014/0320098 A1 Oct. 30, 2014

(30) Foreign Application Priority Data

Apr. 26, 2013 (JP) .................... 2013-093383
Sep. 9, 2013 (JP) .................... 2013-185869
Oct. 15, 2013 (JP) .................... 2013-215007

(51) Int. Cl.
*G05F 1/46* (2006.01)
*H02M 3/156* (2006.01)
*H02M 1/00* (2006.01)

(52) U.S. Cl.
CPC ............ *H02M 3/156* (2013.01); *G05F 1/46* (2013.01); *H02M 2001/0009* (2013.01)

(58) Field of Classification Search
CPC .......... H02M 3/156; H02M 3/158; G05F 1/46; G05F 1/461; G05F 1/462; G05F 1/468
See application file for complete search history.

(56) References Cited

U.S. PATENT DOCUMENTS

| | | | | |
|---|---|---|---|---|
| 6,765,375 B1 * | 7/2004 | Tu | .......... | H02M 3/156 323/222 |
| 7,548,049 B2 * | 6/2009 | Yanagishima | .......... | H02M 1/08 323/283 |
| 8,169,205 B2 * | 5/2012 | Chen | .......... | H02M 3/156 323/282 |
| 8,791,678 B2 * | 7/2014 | Tai | .......... | H02M 3/156 323/283 |
| 2005/0007087 A1 | 1/2005 | Pullen et al. | | |
| 2008/0019160 A1 | 1/2008 | Umemoto et al. | | |
| 2009/0079406 A1 * | 3/2009 | Deng | .......... | G05F 1/565 323/280 |

(Continued)

FOREIGN PATENT DOCUMENTS

JP  A-8-289535  11/1996
JP  A-9-135568  5/1997

(Continued)

OTHER PUBLICATIONS

Jun. 16, 2015 Office Action Issued in Taiwanese Patent Application No. 103115079.

(Continued)

*Primary Examiner* — Matthew Nguyen
(74) *Attorney, Agent, or Firm* — Oliff PLC

(57) ABSTRACT

There is provided a switching regulator configured to convert an input voltage into an output voltage. A control unit is configured to perform switching control in response to a result of comparison between a reference voltage and a complex voltage which includes a feedback voltage acquired by feeding back the output voltage, and a derived voltage derived on the basis of an input current.

19 Claims, 35 Drawing Sheets

(56) References Cited

U.S. PATENT DOCUMENTS

2011/0227547 A1   9/2011  Wong et al.
2013/0088208 A1*  4/2013  Noda .................... H02M 3/158
                                                323/271

FOREIGN PATENT DOCUMENTS

| JP | A-2007-174772 | 7/2007 |
| JP | A-2010-263726 | 11/2010 |
| WO | WO 2005/046036 A1 | 5/2005 |

OTHER PUBLICATIONS

Japanese Office Action issued in Japanese Patent Application No. 2013-093383 on Mar. 25, 2014 (with partial translation).
Mar. 11, 2016 Office Action issued in Chinese Application No. 2014101742992.
Oct. 25, 2016 Office Action issued in Chinese Application No. 201410174299.2.

* cited by examiner

FIG. 8
<NO ADJUSTMENT ON REFERENCE VOLTAGE>
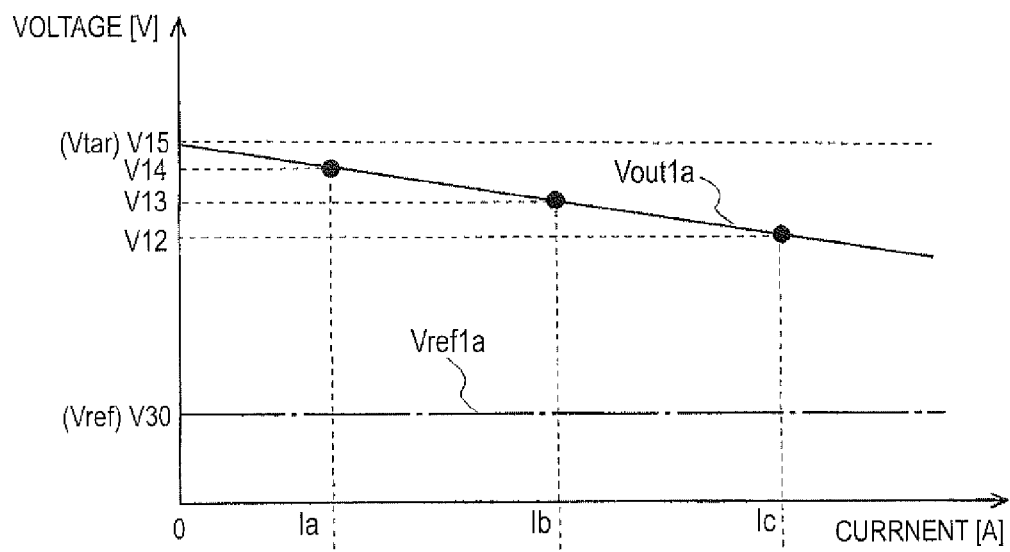
<ADJUSTMENT ON REFERENCE VOLTAGE>
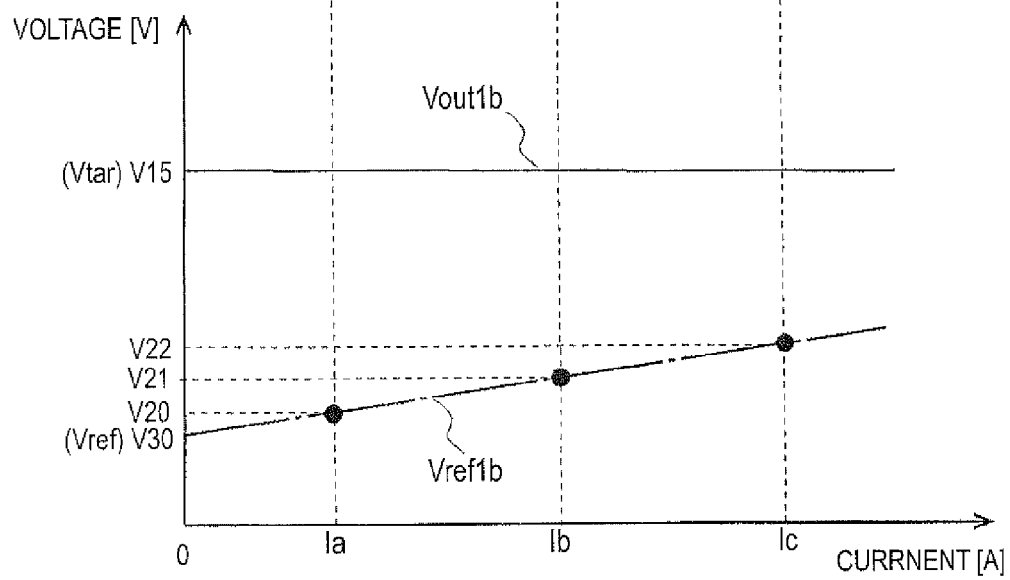

FIG. 20
<NO ADJUSTMENT ON REFERENCE VOLTAGE>
(a)
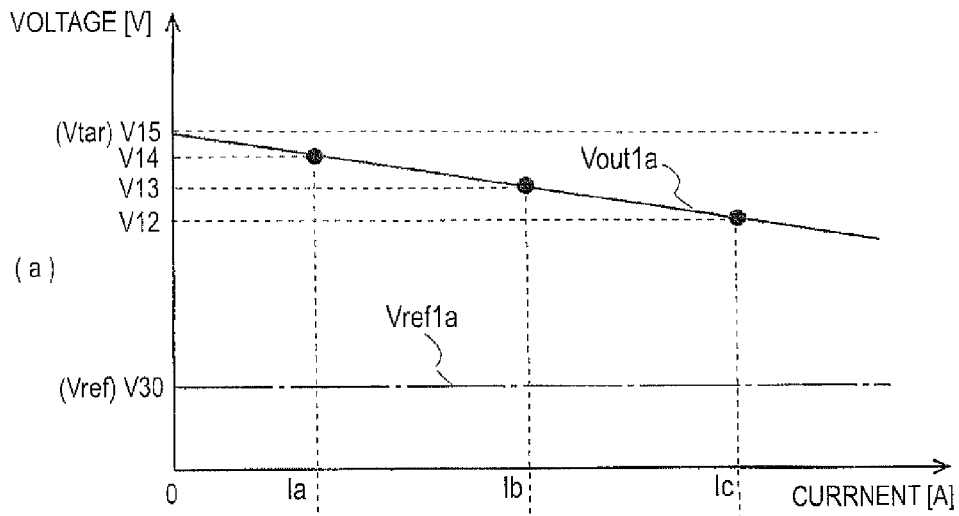
<ADJUSTMENT ON REFERENCE VOLTAGE>
(b)
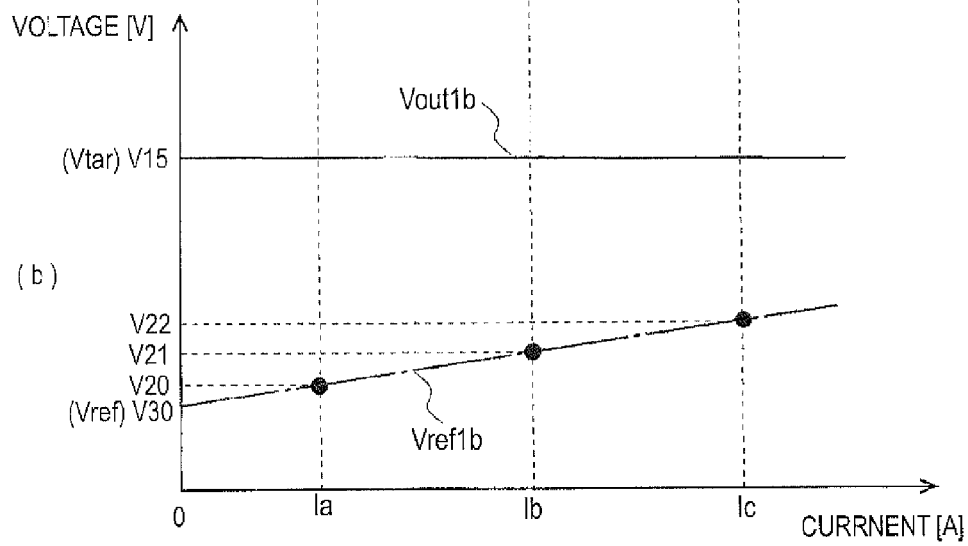

FIG. 33
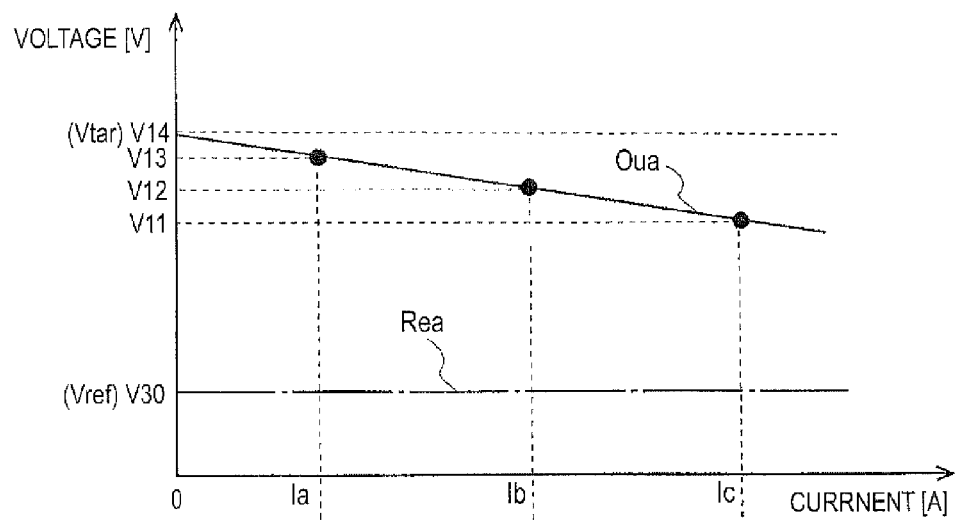
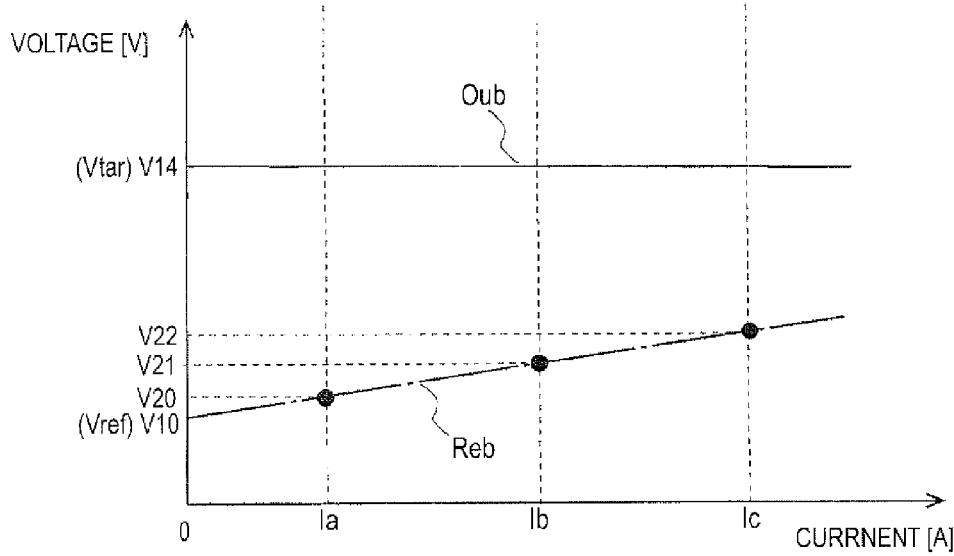

SWITCHING REGULATOR, ELECTRONIC DEVICE, AND ELECTRONIC CIRCUIT

CROSS-REFERENCE TO RELATED APPLICATIONS

This application is based on and claims priorities from Japanese Patent Application No. 2013-093383 filed on Apr. 26, 2013, Japanese Patent Application No, 2013-185869 filed on Sep. 9, 2013 and Japanese Patent Application No. 2013-215007 filed on Oct. 15, 2013.

TECHNICAL FIELD

The present invention relates to a switching regulator, an electronic device, and an electronic circuit for converting an input voltage to an output voltage.

BACKGROUND

Electronic circuits each having a switching regulator for feeding back an output voltage to turn on or off a MOS transistor, thereby controlling the output voltage such that the output value becomes a target voltage have been generally used.

For example, a switching regulator has a feedback loop, and includes a differential amplifier provided as an error amplifier on the path of the feedback loop. An output voltage is input as a feedback voltage to the differential amplifier. The differential amplifier outputs a differential voltage which is obtained by amplifying a difference between the feedback voltage and a reference voltage. The differential voltage is input to a comparator.

Also, the switching regulator has a current sense amplifier for detecting an input current. The input current is converted into a voltage, which is input as an input conversion voltage to the comparator. As a result, the comparator compares the input conversion voltage and the differential voltage, and turns on or off the MOS transistor according to the comparison result. This feedback control causes the output voltage to be maintained constant. However, actually, since the output voltage pulsates according to ON/OFF control on the transistor, in order to smooth the output voltage, a capacitor and an inductor are provided at the output of the switching regulator.

Further, the switching regulator has a phase compensation circuit. The phase compensation circuit is composed mainly of a capacitor and resistors, and lowers the gain of an output signal in terms of the alternating current relative to an input signal. Also, the phase compensation circuit adjusts the phase delay of the output signal relative to the input signal. That is, the phase compensation circuit adjusts the relation between the gain and phase of the output signal relative to the input signal. Specifically, due to influence of the capacitor for smoothing and the capacitor for phase compensation, a first pole and a second pole occur in a Bode plot, and at each pole, the phase is delayed by 90 degrees (total 180 degrees). Further, due to the resistors, the phase advances by 90 degrees. Therefore, before the phase is delayed by 180 degrees, the phase compensation circuit adjusts the gain such that the gain becomes 0 dB or lower. As a result, it is possible to prevent oscillation of the output voltage.

Here, in a case of providing a phase compensation circuit inside a switching regulator circuit, selection of internal elements, such as a capacitor, of the phase compensation circuit may need a lot of time. Also, in a case where the capacity of the capacitor of the phase compensation circuit is relatively large, ON/OFF control on a MOS transistor which is a response to a change in an output voltage is delayed. As an example for solving this problem, a DC to DC converter control circuit has been disclosed in Japanese Patent Application Laid-Open No. 2007-174772. The DC to DC converter control circuit controls an output voltage such that the output voltage becomes a target voltage, without providing a differential amplifier and a phase compensation circuit in the circuit.

However, the DC to DC converter control circuit disclosed in Japanese Patent Application Laid-Open No. 2007-174772 is a circuit which is controlled in a "voltage mode". Here, the voltage mode means a mode for controlling the output voltage of the control circuit on the basis of change of an input voltage such that the output voltage becomes close to target voltage. The DC to DC converter control circuit which is disclosed in Japanese Patent Application Laid-Open No. 2007-174772 and is controlled in the voltage mode as described above can eliminate one pole by removing the differential amplifier and the phase compensation circuit. However, due to a double pole of a capacitor for smoothing for the voltage mode, and a coil which is connected to the output of the transistor, the phase is delayed by 180 degrees, and thus the output voltage becomes likely to oscillate. As a measure for stabilizing the output, a measure such as provision of another phase compensation circuit becomes necessary. As a result, design becomes complicated, and due to provision of new components into the circuit, the size of the circuit increases.

Also, in a case where an element, such as a differential amplifier, for increasing the gain of the entire circuit (hereinafter, referred to as a gain increasing element) is not provided, there are the following problems. That is, if it is assumed that the DC gain of the entire circuit in a case where there is a gain increasing element provided in the circuit is, for example, 1000 times, due to an increase in an output current Iout, the DC gain of the entire circuit decreases. For example, due to an increase in the output current Iout, the gain decreases to a half, that is, the gain changes from 1000 times to 500 times. As a result, a voltage difference between the non-inverted input terminal and inverted input terminal of a comparator of the inside of the circuit specifically becomes as follows according to a voltage difference equation ([VOLTAGE DIFFERENCE]=Vout/A, wherein A represents a gain). In a case where a voltage which is input to the non-inverted input terminal of the comparator is 1 V, and a voltage which is input to the inverted input terminal is 1 V, the voltage difference between both terminals becomes 0 V, and a difference does not occur. However, actually, due to a difference in characteristics between both terminals, even in a case where there is no difference between input voltages, a voltage difference occurs between both terminals. For example, according to the voltage difference equation, in a case where the gain A is 1000, the voltage difference becomes 1 mV, and in a case where the gain A is 500, the voltage difference becomes 2 my. Here, in a case where the output current Iout increases, the DC gain of the entire circuit decreases due to the following reason. In a case where the output voltage Vout is substantially constant, as the output current Iout increases, the resistance value of a load resistor Rd decreases on the basis of Ohm's law. Further, if the resistance value of the load resistor Rd decreases, the DC gain also decreases according to a gain relation equation (A=Gm×R, wherein Gm represents conductance, and R represents resistance).

Also, in a case where both input terminals of the comparator has a voltage difference as described above, when the voltage which is input to the non-inverted input terminal of the comparator, and the reference value which is input to the inverted input terminal are compared, even if a difference between both voltage values becomes 0 V, the voltage difference between both input terminals of the comparator according to the decrease of the gain appears as the voltage difference of a target voltage Vtar from the output voltage Vout. However, in a case where the DC gain of the entire circuit is high to a certain degree as described above, even if the DC gain decreases according to an increase in the output current Iout, the voltage difference between both input terminals of the comparator becomes a relatively small value, and the voltage difference of the output voltage Vout from the target voltage Vtar also becomes a small value.

Further, since the DC gain of the entire circuit decreases due to an increase in the output voltage Vout, the voltage difference between both input terminals of the comparator becomes higher than that before the decreasing of the DC gain, and this voltage difference occurs as the voltage difference between the output voltage Vout and the target voltage Vtar.

Here, if the gain increasing element is removed from the inside of the circuit, the gain of the entire circuit further decreases. If the gain increasing element is removed from the inside of the circuit, for example, the DC gain of the entire circuit decreases from 1000 times which is the DC gain before the removal, to 100 times. In this case, if the output current Iout increases, whereby the DC gain further decreases (for example, from 100 times to 50 times), when the DC gain A is 100, the voltage difference becomes 10 mV, and when the DC gain A is 50, the voltage difference becomes 20 mV.

Also, of a voltage difference (2−1=1 mV) between both input terminals of the comparator due to an increase of the output current Iout in a case where there is a gain increasing element in the circuit, and a voltage difference (20−10=10 mV) in a case where there is no gain increasing element in the circuit), the voltage difference in the case where there is no gain increasing element in the circuit becomes larger. Therefore, the voltage difference of the output voltage Vout from the target voltage Vtar in the case where there is no gain increasing element in the circuit becomes larger than that in the case where there is a gain increasing element in the circuit, and thus stable power supply to a load may be impossible.

SUMMARY

It is thereof a first object of the present invention to simplify design and stabilize an output voltage.

It is thereof a second object of the present invention to secure stability of the voltage value of an output voltage.

According to a first aspect of the embodiments of the present invention, there is provided a switching regulator configured to convert an input voltage into an output voltage, the switching regulator comprising: a control unit configured to perform, switching control in response to a result of comparison between a reference voltage and a complex voltage which includes a feedback voltage acquired by feeding back the output voltage, and a derived voltage derived on the basis of an input current.

The switching regulator may further comprise: a transistor configured to be subjected to switching control; and a coil connected to an output side of the transistor, and the input current may be a current flowing in the coil.

The switching regulator may further comprise an adding unit configured to add currents, the adding unit may add a feedback current acquired by converting the feedback voltage, and the input current including an AC component and a DC component, to derive the complex voltage.

The switching regulator may further comprise a comparing unit configured to compare the complex voltage and the reference voltage, and the transistor may be turned on in response to an edge of a clock signal having a fixed period, and may be turned off in response to an output signal from the comparing unit.

The switching regulator may further comprise a first resistor connected at a previous stage of an output terminal at the output side of the transistor, and the complex voltage may be a voltage at an upstream side of the first resistor.

The switching regulator may further comprise: a filter unit configured to pass therethrough the DC component of the input current corresponding to the DC component of the derived voltage; and a generating unit configured to generate a first slope current whose current value increases and then decreases with time, and the complex voltage may include the feedback voltage, the DC component of the derived voltage, and a voltage corresponding to the first slope current.

The generating unit of the switching regulator may generate the first slope current whose current value increases at a constant slope at an ON timing of the transistor and then is reset at an OFF timing of the transistor.

The switching regulator may further comprise a second resistor configured to derive the complex voltage on the basis of a complex current including the input current and a feedback current corresponding to the feedback voltage.

The switching regulator may further comprise a changing unit configured to change the reference voltage in response to the current value of the input current.

The changing unit of the switching regulator may increase the reference voltage in response to an increase in the DC component of the input current.

The switching regulator may further comprise a filter unit configured to pass therethrough the DC component of the input current, and the changing unit may convert the DC component of the input current output from the filter unit into a voltage, and add the voltage to the reference voltage.

The switching regulator may further comprise a decreasing unit configured to decrease the complex voltage in response to an increase in the DC component of the input current.

The switching regulator may further comprise: a supplying unit configured to supply a second slope current whose current value increases and then decreases with time; and a signal outputting unit configured to output a signal for changing a rising rate of the current value of the second slope current, in response to the voltage value of the input voltage.

The signal outputting unit of the switching regulator may output a signal for reducing the rising rate of the current value of the second slope current, in response to a decrease in the input voltage.

The switching regulator may further comprise a setting unit configured to set the reference voltage in response to a peak value of the input current.

The switching regulator may further comprise a supplying unit configured to supply a slope current whose current value increases and then decreases with time, to the complex voltage, and the setting unit may set the reference voltage in response to a peak value of the input current and a peak value of the slope current.

The setting unit of the switching regulator may add the peak value of the input current and the peak value of the slope current to a reference power supply voltage having a predetermined voltage value, to set the reference voltage.

The switching regulator may further comprise an acquiring unit configured to acquire a peak value of a current, and the acquiring unit may acquire the peak value in one cycle from ON to OFF of the switching control, and reset the peak value having been acquired in the previous cycle, thereby acquiring the peak value of the present cycle.

According to a second aspect of the embodiments of the present invention, there is provided an electronic device comprising: the above-described switching regulator; and a control device that receives the voltage of the switching regulator, thereby operating.

According to a third aspect of the embodiments of the present invention, there is provided an electronic circuit configured to convert an input voltage into an output voltage, the electronic circuit comprising: a control unit configured to perform switching control in response to a result of comparison between a reference voltage and a complex voltage which includes a feedback voltage acquired by feeding back the output voltage, and a derived voltage derived on the basis of an input current.

According to a fourth aspect of the embodiments of the present invention, there is provided a switching regulator configured to convert an input voltage into an output voltage, the switching regulator comprising: an adding unit configured to add a feedback voltage acquired by feeding back the output voltage, and a converted voltage acquired by voltage-converting a current corresponding to an output current, to derive an addition voltage; a control unit configured to perform switching control in response to a result of comparison between the addition voltage and a reference voltage; and a changing unit configured to change the reference voltage according to a value of the current corresponding to the output current.

Changing of the reference voltage by the changing unit of the switching regulator may increase the reference value according to an increase in the DC component of the converted voltage.

According to a fifth aspect of the embodiments of the present invention, there is provided a switching regulator configured to convert an input voltage into a predetermined output voltage, the switching regulator comprising: an adding unit configured to add a feedback voltage acquired by feeding back the output voltage, and a converted voltage acquired by voltage-converting a current corresponding to an output current, to derive an addition voltage; a control unit configured to perform switching control in response to a result of comparison between the addition voltage and a reference voltage; and a shunting unit that shunts a portion of the current corresponding to the output current to a different path, according to the current corresponding to the output current.

The portion of the current corresponding to the output current of the switching regulator may correspond to increase of the DC component of the converted voltage.

The current corresponding to the output current of the switching regulator is a current whose current value changes by the switching control and which flows in a coil.

According to the first to third aspects of the embodiments of the present invention, since switching control is performed in response to the result of comparison between the complex voltage and the reference voltage, the regulator can prevent oscillation of the output voltage, and a stable output voltage of the output can be obtained. Also, design of the regulator becomes easier as compared to a circuit of a voltage mode, and since it is unnecessary to provide a new component inside the circuit, it is possible to reduce the size of the entire circuit.

Also, according to the first to third aspects of the embodiments of the present invention, since the adding unit adds the feedback current and the input current including the AC component and the DC component, thereby deriving the complex voltage, the regulator can control ON/OFF of the transistor in response to a change in the output voltage, and can reduce the voltage difference between the output voltage and the target voltage.

Also, according to the first to third aspects of the embodiments of the present invention, since the transistor is turned on in response to an edge of the clock signal having the fixed period, and is turned off in response to the output signal from the comparing unit, the regulator becomes capable of high-speed response, and since it is possible to see a switching frequency in advance, other devices such as a radio can take measures against noise, and it becomes unlike to be influenced by noise.

Also, according to the first to third aspects of the embodiments of the present invention, since the complex voltage is the voltage of the upstream side of the first resistor connected at the previous stage of the output terminal on the output side of the transistor, the regulator can eliminate a plurality of components, and can reduce the manufacturing cost.

Also, according to the first to third aspects of the embodiments of the present invention, since the complex voltage includes the feedback voltage, the DC component of the derived voltage, and the voltage corresponding to the first slope current, the regulator is not influenced by the amplitude of the AC component of the coil current, and it is possible to set the inductance of the coil to an arbitrary value.

Also, according to the first to third aspects of the embodiments of the present invention, since the generating unit generates the first slope current whose current value increases at a constant slope at the ON timing of the transistor and then is reset at the OFF timing of the transistor, the regulator can set the ON/OFF timings of the transistor with a predetermined period, and can stabilize the output voltage.

Also, according to the first to third aspects of the embodiments of the present invention, since the regulator includes the second resistor which derives the complex voltage on the basis of the complex current including the input current and the feedback current, the regulator can regulate the output voltage only by one resistor, and it is easy to perform adjustment on elements of the inside of the regulator circuit, and it is possible to improve the accuracy of deriving of the output voltage.

Also, according to the first to third aspects of the embodiments of the present invention, since the reference voltage varies in response to the current value of the input current, the regulator can stabilize the output of the output voltage even if the output current varies, and can control the output voltage such that the voltage difference between the output voltage and the target voltage is small.

Also, according to the first to third aspects of the embodiments of the present invention, since the changing unit increases the reference voltage in response to an increase in the DC component of the input current, the regulator can stabilize the output of the output voltage even if the output current increases, and can the output voltage such that the voltage difference between the output voltage and the target voltage is small.

Also, according to the first to third aspects of the embodiments of the present invention, since the complex voltage is deceased in response to an increase in the DC component of the input current, even if the output current increases, the regulator can control the output voltage such that the output voltage of the output voltage is stable, and can reduce the voltage difference between the output voltage and the target voltage.

Also, according to the first to third aspects of the embodiments of the present invention, since a signal for changing the rising rate of the current value of the second slope current is output according to the voltage value of the input voltage, even if the input voltage changes, the regulator can control the output voltage such that the output voltage of the output voltage is stable, and can reduce the voltage difference between the output voltage and the target voltage.

Also, according to the first to third aspects of the embodiments of the present invention, since switching control is performed in response to the result of comparison between the reference voltage and the complex voltage including the feedback voltage acquired by feeding back the output voltage and the derived voltage derived on the basis of the input current, it is possible to eliminate an error amplifier provided on the route of a feedback loop, and thus it is possible to eliminate a phase compensation circuit. Also, it becomes unnecessary a time for selecting elements, such as a capacitor, of a phase compensation circuit, and thus it is possible to considerably reduce man hour for circuit design. Further, according to the present invention, since the reference voltage is set according to the peak value of the input current, the input current which is included in the complex voltage, and the input current which is included in the reference voltage become the same value, and thus it is possible to reduce the voltage difference between the output voltage and the target voltage.

Also, according to the first to third aspects of the embodiments of the present invention, since the reference voltage is set according to the peak value of the input current and the peak value of the slope current, even if slope compensation is performed by a slope compensation circuit, it is possible to reduce the difference between the output voltage and the target voltage.

Also, according to the first to third aspects of the embodiments of the present invention, since the peak value of the input current and the peak value of the slope current are added to the reference power supply voltage having the predetermined voltage value, whereby the reference voltage is set, it is possible to set the voltage to be added to the feedback voltage, and the voltage to be added to the reference power supply voltage to the same voltage.

Also, according to the first to third aspects of the embodiments of the present invention, since the acquiring unit acquires the peak value in one cycle from ON to OFF of the switching control, and resets the peak value having been acquired in the previous cycle, thereby acquiring the peak value of the present cycle, it is possible to set the reference voltage according to a change in the peak value.

Also, according to the fourth aspect of the embodiments of the present invention, since the reference voltage varies in response to the value of the current corresponding to the output current, it is possible to suppress the output voltage from varying according to a decrease in the gain of the entire circuit, and to reduce the difference between the output voltage and the target voltage, and it is possible to supply stable electric power to a load.

Also, according to the fourth aspect of the embodiments of the present invention, since changing of the reference voltage by the changing unit increases the reference voltage in response to an increase in the DC component of the converted voltage, it is possible to increase the reference voltage in a state where periodic change of the voltage value of the converted voltage has been eliminated.

Also, according to the fifth aspect of the embodiments of the present invention, since a portion of the current corresponding to the output current is made flow in a different route in response to the current corresponding to the output current, it is possible to suppress the output voltage from changing due to a decrease in the gain of the entire circuit, and to reduce the difference between the output voltage and the target voltage, and it is possible to supply stable electric power to a load.

Also, according to the fifth aspect of the embodiments of the present invention, since a portion of the current corresponding to the output current is an increase of the DC component of the converted voltage, it is possible to shunt the current corresponding to the increase of the DC component of the converted voltage.

Also, according to the fourth and fifth aspects of the embodiments of the present invention, since the current corresponding to the output current is a current whose current value varies by switching control and which flows in the coil, it is possible to perform voltage control according to a change in the current value. It is possible to suppress the output voltage from changing due to a decrease in the gain of the entire circuit, and to reduce the difference between the output voltage and the target voltage, and it is possible to supply stable electric power to a load.

Also, according to the fifth aspect of the embodiments of the present invention, since a portion of the current corresponding to the output current is made flow in a different route in response to the DC component of the converted voltage, it is possible to suppress the output voltage from changing due to a change in the DC gain of the entire circuit, and to reduce the difference between the output voltage and the target voltage.

BRIEF DESCRIPTION OF THE DRAWINGS

In the accompanying drawings:

FIG. 8 shows graphs illustrating changes of the voltage values of a reference voltage and an output voltage according to existence or non-existence of adjustment on the reference voltage;

FIG. 20 shows graphs illustrating changes of the reference voltage and the output voltage according to existence or non-existence of correction on the reference voltage;

FIG. 33 is a view illustrating change of the output voltage according to existence or non-existence of adding of the voltage value of a regulated power supply to the reference voltage;

DETAILED DESCRIPTION OF THE EMBODIMENTS

Hereinafter, first to seventh embodiments of the present invention will be described with reference to the accompanying drawings. The following embodiments are illustrative, and the technical scope of the present invention is not limited thereto.

First Embodiment

1. Configuration of Switching Regulator

Figure 1:
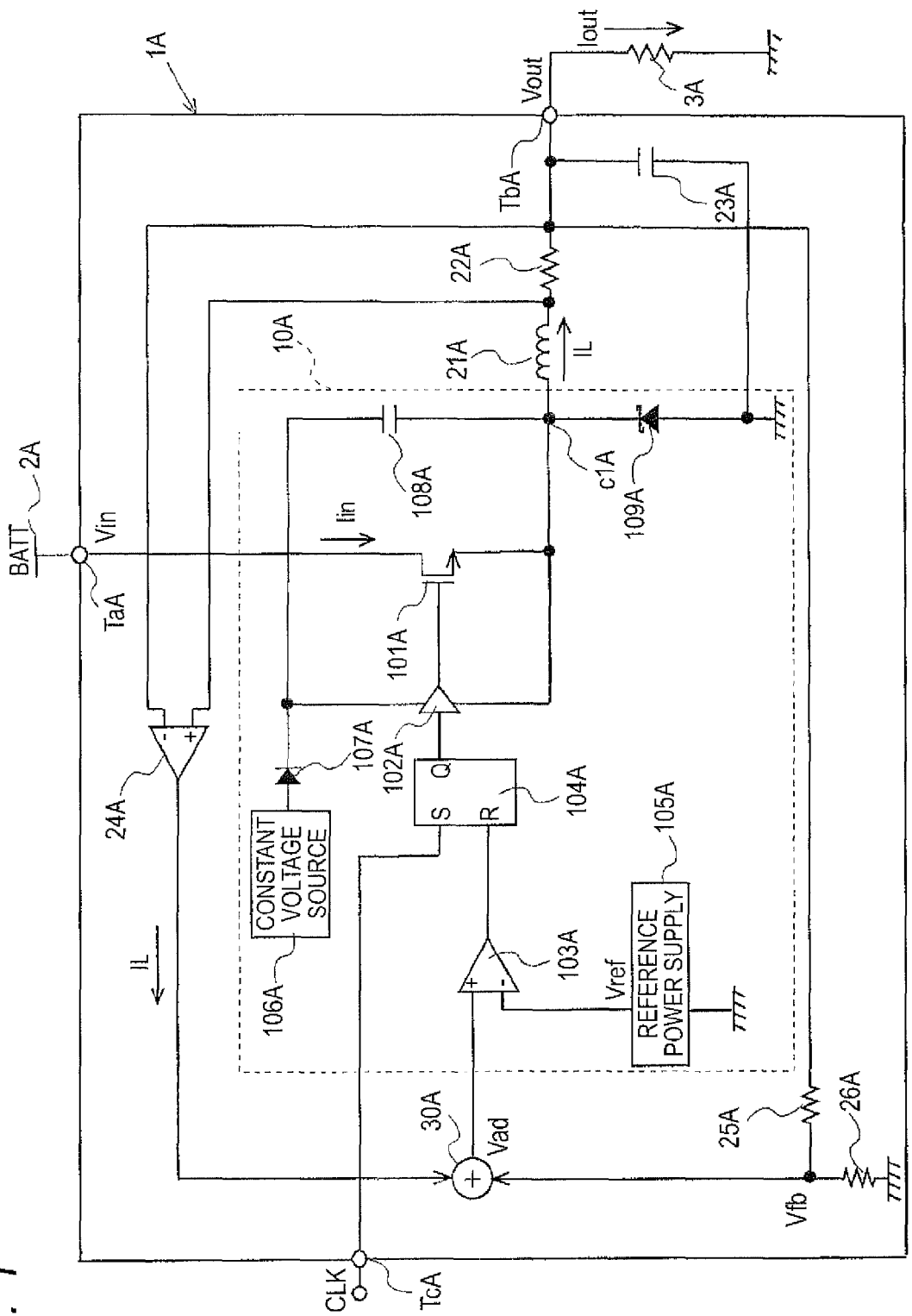
FIG. 1 is a view illustrating the circuit configuration of a switching regulator of a first embodiment.

FIG. 1 is a view illustrating the circuit configuration of a switching regulator 1A (hereinafter, referred to as "regulator 1A") of a first embodiment. The regulator 1A outputs an output voltage Vout by switching control on a transistor 101A (to be described below). The regulator 1A receives an input voltage Vin (for example, 14 V) from a battery 2A through an input terminal TaA. The regulator 1A steps down the input voltage Vin to the output voltage Vout. The regulator 1A performs control such that the output voltage Vout obtained by lowering the input voltage Vin becomes a target voltage Vtar (for example, 5 V). As a result, an output current Iout based on the output voltage Vout flows, into a load 3A through an output terminal TbA. The load 3A is, for example, a micro computer of an electro control unit (ECU) of an electronic device. The ECU is, for example, a device for controlling driving of an engine, and in order to supply necessary electric power to the micro computer of the electro control unit, the regulator 1A can be used. Therefore, as the electronic device, for example, not only an engine control device but also a variety of other devices such as a navigation device and an audio device can be applied.

Between the input terminal. TaA and output terminal TbA of the regulator 1A, the transistor 101A is provided. The transistor 101A is an N-channel MOS transistor which is subjected to switching control for lowering the input voltage Vin. The drain of the transistor 101A is connected to the input terminal TaA. The gate of the transistor 101A is connected to a driver 102A. The driver 102A controls ON/OFF of the transistor 101A. The source of the transistor 101A is connected to the driver 102A. Also, the source is connected to a coil 21A. The current value of a current IL (hereinafter, referred to as "coil current IL") which flows in the coil 21A varies by switching control on the transistor 101A. That is, according to switching control on the transistor 101A, an input current Iin based on the input voltage Vin flows in the coil 21A. Therefore, the coil current IL has the same current value as that of the input current Iin. The coil 21A is connected directly to a sense resistor 22A. The other end of the sense resistor 22A is connected to the load 3A through the output terminal TbA. The other end of the load 3A is connected to a ground.

The connection point of the coil 21A and the sense resistor 22A is connected to the non-inverted input terminal of a sense amplifier 24A. The other end of the sense resistor 22A is connected to the inverted input terminal of the sense amplifier 24A. If the coil current IL flows in the sense resistor 22A, the sense amplifier 24A derives a voltage difference between both ends of the sense resistor 22A. Then, the sense amplifier 24A derives the current value of the coil current IL on the basis of the voltage difference between both ends of the sense resistor 22A. The following description will be made on the assumption that the coil current IL which is derived by the sense amplifier 24A has the same current value as that of the coil current IL which flows in the coil 21A; however, the coil current IL which is derived by the sense amplifier 24A may have a current value which is a multiple of the current value of the coil current IL which flows in the coil 21A.

A capacitor 23A is connected to the connection point of the other end of the sense resistor 22A and the output terminal TbA. The capacitor 23A eliminates an AC component from the coil current IL, thereby stabilizing the output voltage Vout.

The other end of the capacitor 23A is connected to the anode of a Schottky diode 109A and the ground. The Schottky diode 109A passes the coil current IL from the anode to the cathode in a case where the transistor 101A is off.

Also, the above described connection point of the other end of the sense resistor 22A and the inverted input terminal of the sense amplifier 24A is connected to a first resistor 25A. The other end of the first resistor 25A is connected to a second resistor 26A. The other end of the second resistor 26A is connected to the ground. The first resistor 25A and the second resistor 26A are resistors for dividing the output voltage Vout having been fed back. The connection point of the first resistor 25A and the second resistor 26A is connected to an adder circuit 30A. The voltage of the connection point of the first resistor 25A and the second resistor 26A becomes a feedback voltage Vfb. The feedback voltage Vfb is a voltage obtained by dividing the output voltage Vout by the first resistor 25A and the second resistor 26A.

The adder circuit 30A is connected to the connection point of the first resistor 25A and the second resistor 26A as described above. Also, the adder circuit 30A is connected to the output terminal of the sense amplifier 24A. The coil current IL which is output from the sense amplifier 24A is input to the adder circuit 30A. Further, the adder circuit 30A is connected to the non-inverted input terminal of a comparator 103A. The adder circuit 30A converts the feedback voltage Vfb into a current, thereby deriving a feedback current Ifb. Then, the adder circuit 30A adds the feedback current Ifb and the coil current IL, thereby deriving a complex current Iad. The adder circuit 30A converts the complex current Iad into a voltage, thereby deriving a complex voltage Vad. As a result, the complex voltage Vad is applied to the non-inverted input terminal of the comparator 103A. Subsequently, the circuit configuration of a control unit 10A of the regulator 1A will be described. The control unit 10A includes elements relative to switching control on the transistor 101A. A flip-flop 104A of the control unit 10A has a set (S) terminal, a reset (R) terminal, and an output (Q) terminal. The set (S) terminal is connected to a clock input terminal TcA. The clock input terminal TcA is connected to a micro computer which is provided outside the regulator 1A. The set (S) terminal receives a clock signal having a predetermined period, from the micro computer through the clock input terminal TcA. The reset (R) terminal is connected to the output terminal of the comparator 103A. The output (Q) terminal is connected to the driver 102A.

The non-inverted input terminal of the comparator 103A is connected to the adder circuit 30A as described above, and the inverted input terminal thereof is connected to a reference power supply 105A. The other end of the reference power supply 105A is connected to the ground. The reference power supply 105A is a voltage source which outputs a reference voltage Vref (for example, 1.25 V) which is a constant voltage.

A constant voltage source 106A is connected to the anode of a diode 107A. The cathode of the diode 107A is connected to a capacitor 108A for boostrapping. The constant voltage source 106A outputs a predetermined voltage (for example, 5 V). The connection point of the diode 107A and the capacitor 108A is connected to the driver 102A. The other end of the capacitor 108A is connected to a connection point 1A which is the connection point of the coil 21A and the Schottky diode 109A. The constant voltage source 106A, the diode 107A, and the capacitor 108A constitute a known boostrap circuit, and it is possible to stably perform switching control on the transistor 101A.

The present embodiment is configured as described above, and has the following two features. A first feature is that a differential amplifier and a phase compensation circuit for feedback are not provided unlike in the related art. A second feature is as follows. The coil current IL (including an AC component and a DC component) which is output from the sense amplifier 24A is added to the feedback current Ifb corresponding to the feedback voltage Vfb, whereby the complex voltage Vad is derived, and the complex voltage Vad is compared with the reference voltage Vref of the reference power supply 105A. The comparison between the complex voltage Vad and the reference voltage Vref is performed by the comparator 103A. Further, the transistor 101A is turned on with a fixed period by a clock signal CL, and the transistor 101A is turned off by the output of the comparator 103A. This is the second feature. The effects of those features will be described below.

2. Operation of Regulator

Figure 2:
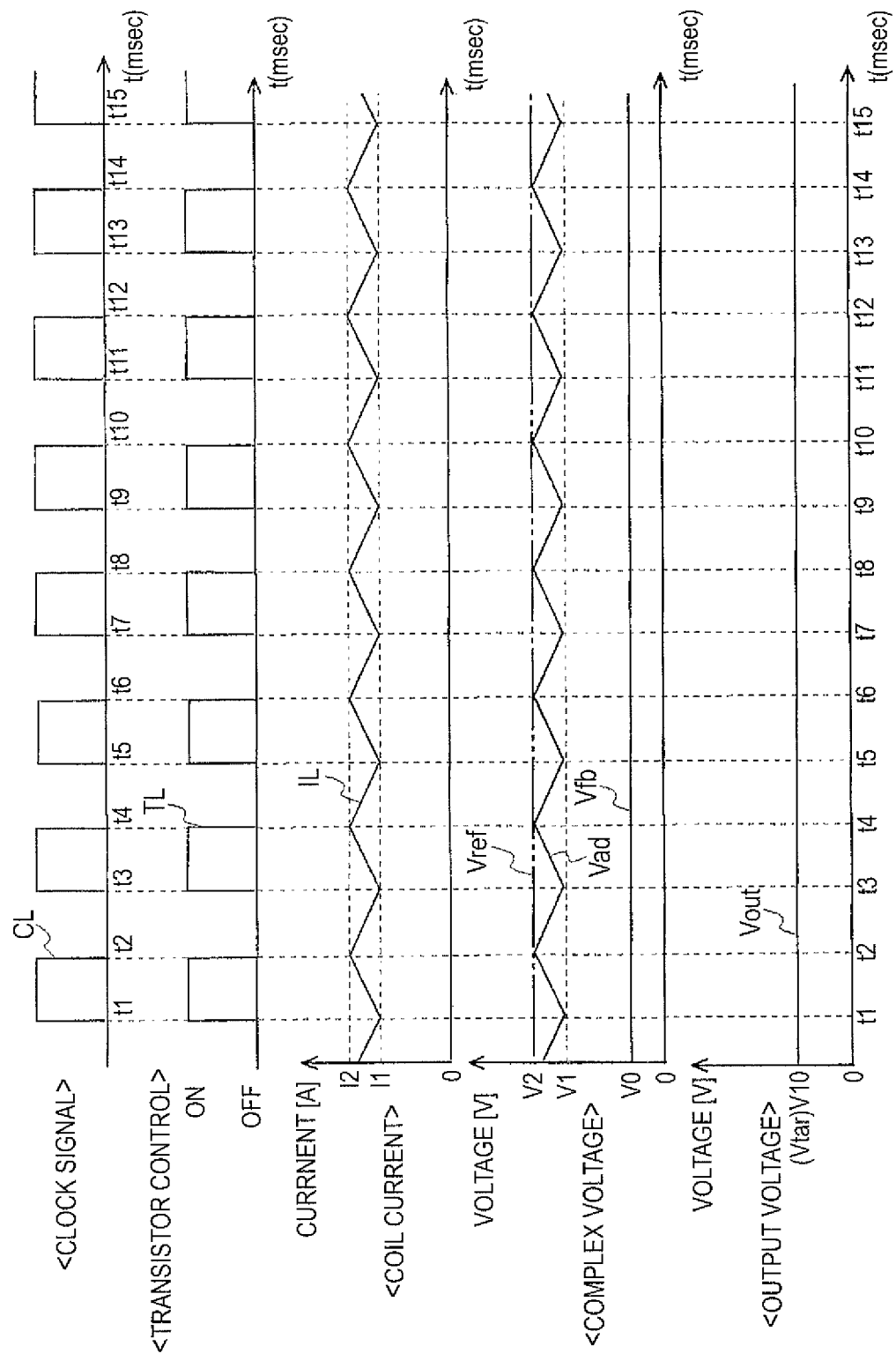
FIG. 2 is a view illustrating temporal changes of individual signals relative to the regulator of the first embodiment.

Subsequently, the operation of the regulator 1A will be described. A description of the operation will be made mainly with reference to FIG. 2. FIG. 2 is a view illustrating temporal variations of individual signals relative to the regulator 1A of the first embodiment. In FIG. 2, a clock signal graph, a transistor control graph, a coil current graph, a complex voltage graph, and an output voltage graph are shown. The horizontal axis of each graph represents time (msec).

<2-1. Clock Signal Graph>

The clock signal graph is a graph representing the waveform of the clock signal CL which is input from the micro computer provided outside the regulator 1A to the set (S) terminal of the flip-flop 104A. The clock signal CL repeats rising and falling at a fixed frequency. For example, if a rising edge of the clock signal CL of a time t1 is input to the set (S) terminal, the flip-flop 104A outputs a High signal (hereinafter, referred to as "H signal") from the output (Q) terminal to the driver 102A. If receiving the H signal, the driver 102A applies a voltage higher than the voltage of the source of the transistor 101A, to the gate. As a result, the transistor 101A is turned on at the timing of the time t1. Thereafter, the clock signal CL with a predetermine period is input to the set (S) terminal of the flip-flop 104A. At the rising timings of the clock signal CL with the predetermined period (times t3, t5, t7, t9, t11, t13, and t15), the flip-flop 104A outputs the H signal form the output (Q) terminal to the driver 102A <2-2. Transistor Control Graph>

The transistor control graph is a graph representing the ON/OFF state of the transistor 101A. In other words, the transistor control graph (hereinafter, referred to as "control graph") is a graph representing the ON periods and OFF periods of the transistor 101A. For example, in a case where the ON periods and OFF periods of the transistor 101A have the same length, an ON-Duty ratio and an OFF-Duty ratio which are shown in a control graph become the same ratio (50%). The control graph represents that the transistor 101A is turned on at the time t1 and the ON state is maintained until a time t2. Also, as described above, the timings when the transistor 101A is turned on are the same as the rising timings of the clock signal CL. The control graph shows that the transistor 101A is turned off at the time t2. Thereafter, the control graph repeats change according to the ON-Duty ratio and the OFF-Duty ratio. Also, the timings when the transistor 101A is turned off are determined on the basis of the relation (to be described below) between the reference voltage Vref and the complex voltage Vad (to be described below), regardless of the falling timings of the clock signal CL. For this reason, there is a case where the ON periods and OFF periods of the transistor 101A have different lengths. In this case where the ON periods and the OFF periods have different lengths, the ON-Duty ratio and the OFF-Duty ratio become different from each other.

Also, as described above, whenever the clock signal CL with the predetermined period rises (that is, at the times t1, t3, t5, t7, t9, t11, t13, and t15), the transistor 101A is turned on. That is, the transistor 101A is switched at a fixed frequency.

<2-3. Coil Current Graph>

The coil current graph is a graph illustrating the waveform of the coil current IL which flows in the coil 21A. The vertical axis of the coil current graph represents a current value [A]. The coil current IL is a current which flows in the coil 21A if the transistor 101A is turned on, for example, at the time t1, and becomes the same current value as that of the input current Iin as described above. While the transistor 101A is on (for example, in a period from the time t1 until the time t2), a current is supplied through the transistor 101A, whereby the coil current IL decreases from a current value I1 to a current value I2. While the transistor 101A is off (for example, in a period from the time t2 until the time t3), the current value of the coil current IL increases from the current value I2 to the current value I1 by the Schottky diode 109A. As described above, the coil current IL varies in response to ON/OFF of the transistor 101A. Also, the coil current IL has the DC component and the AC component. For example, at the time t2, the coil current becomes the current value I2, and the DC component becomes the current value I1, and the AC component becomes the difference (I2−I1) of the current value I1 from the current value I1.

<2-4. Complex Voltage Graph>

The complex voltage graph is a graph representing the waveform of the complex voltage Vad which is applied to the non-inverted input terminal of the comparator 103A. Also, in the complex voltage graph, the waveform of the feedback voltage Vfb and the waveform of the reference voltage Vref are shown. The vertical axis of the complex voltage graph represents a voltage value [V].

The complex voltage Vad is a voltage including the feedback voltage Vfb and a voltage VL (hereinafter, referred to as "derived voltage VL") derived on the basis of the coil current IL. Specifically, the complex voltage Vad is a voltage including the derived voltage VL having a DC component and an AC component, and the feedback voltage Vfb obtained by feeding back the output voltage Vout. For example, at the time t1, the feedback voltage Vfb and the derived voltage VL become a voltage value V0 and the difference (V1−V0) of the voltage value V0 from a voltage value V1, respectively. The complex voltage Vad becomes the voltage value V1, and the reference voltage Vref becomes a voltage value V2. Here, the reference voltage Vref is constant at the voltage value V2, and the feedback voltage Vfb is substantially constant at the voltage value V0.

If the transistor 101A is turned on, for example, at the time t1, with increasing of the coil current IL, the complex voltage Vad increases. If the complex voltage Vad coincides with the reference voltage Vref at the time t2, the flip-flop 104A is reset by the comparator 103A, whereby the transistor 101A is turned off. If the transistor 101A is turned off, the coil current IL decreases, and thus the complex voltage Vad also decreases. Thereafter, at the time t3, the transistor 101A is turned on again due to rising of the clock signal CL. Thereafter, the same operation is repeated.

<2-5. Output Voltage Graph>

The output voltage graph is a graph representing the waveform of the output voltage Vout. The vertical axis of the output voltage graph represents a voltage value [V]. In a period from the time t1 until the time t5, the output voltage Vout becomes substantially constant at a voltage value V10 by the capacitor 23A for smoothing. The voltage value V10 corresponds to the target voltage Vtar. In other words, the output voltage Vout varies such that a difference between the output voltage Vout and the target voltage Vtar does not occur. A mode for controlling the voltage value of the output voltage Vout on the basis of the current value of the coil current IL including at least the DC component as described above is referred to as a current mode.

Subsequently, the effects of the present embodiment will be described.

Figure 3:
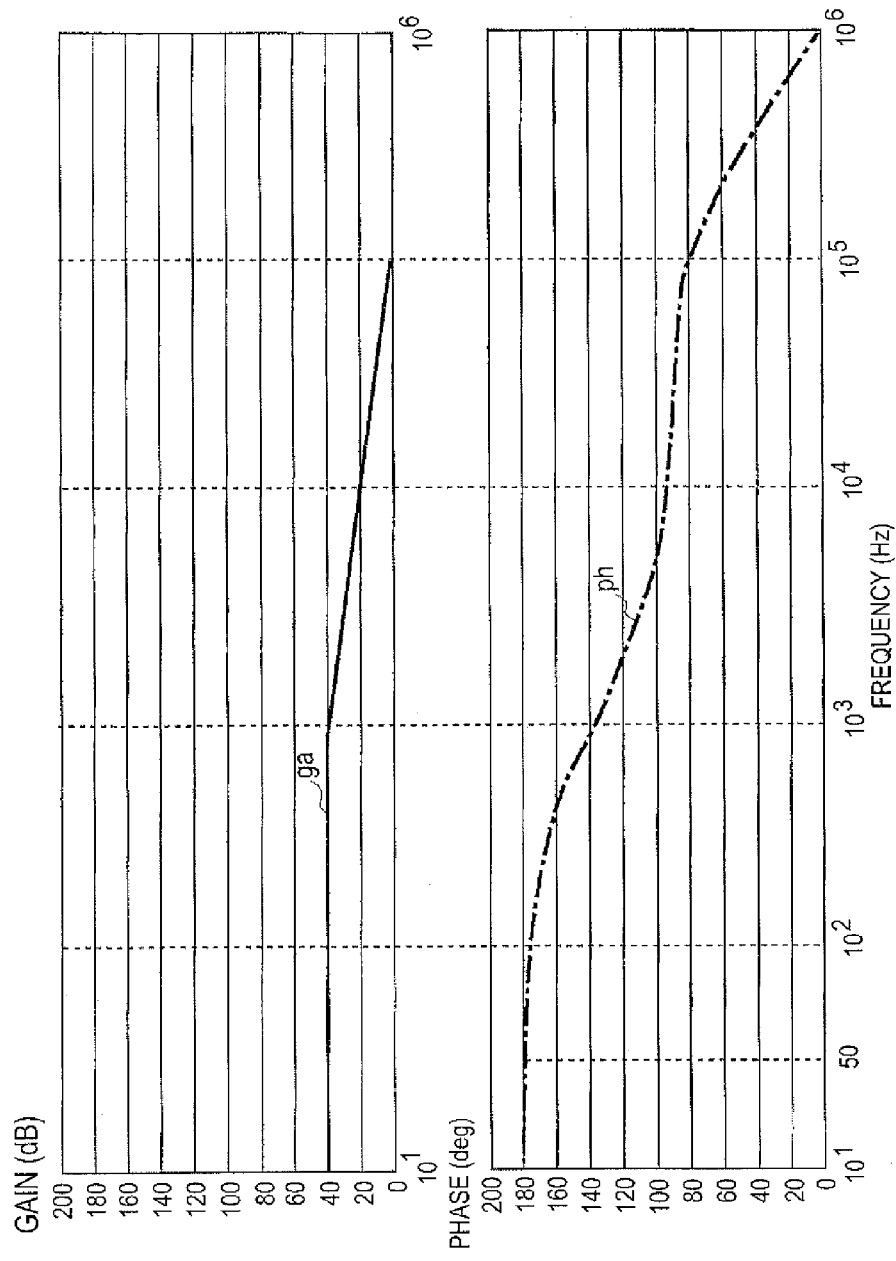
FIG. 3 is a Bode plot illustrating frequency characteristics in a current mode.

The regulator 1A of the present embodiment performs control by the current mode. In FIG. 3, at the upper portion of FIG. 3, a gain characteristic at each frequency in the current mode is shown by a gain characteristic curve ga. Also, at the lower portion of FIG. 3, a phase characteristic is shown by a phase characteristic curve ph. Since the regulator 1A performs control in the current mode, the regulator 1A is not influenced by the impedance of the coil 21A, and thus one pole attributable to the capacitor 23A appears. The frequency of the pole is, for example, about 1 kHz as shown by the gain characteristic curve ga. Therefore, the gain is substantially constant (for example, at 40 dB) from 0 Hz to about 1 kHz, and decreases after about 1 kHz. This decreasing of the gain is caused by decreasing of the impedance of the capacitor 23A attributable to increasing of the frequency. Further, in the present embodiment, since a differential amplifier for feedback is not used, the gain becomes a small value. Therefore, with increasing of the frequency, the gain relatively quickly decreases to 0 dB. For example, at about 100 kHz, the gain becomes 0 dB. Meanwhile, as shown by the phase characteristic curve ph, before and after the pole frequency, the phase exceeds 90 degrees. For example, the phase is almost constant at 180 degrees until about 50 Hz, and starts to be delayed after about 50 Hz, and is delayed to 90 degrees at about 10 kHz. Since the phase delay attributable to influence of the pole is only 90 degrees, at 100 kHz at which the gain 0 dB, a phase margin can be set to a sufficient value of about 80 degrees. Therefore, it is possible to ensure a stable operation without oscillation of the output voltage Vout.

As described above, the gain and phase of the regulator 1A of the present embodiment are controlled according to the frequency of a signal by the current mode, without using a differential amplifier and a phase compensation circuit. Therefore, it is possible to oscillation of the output voltage Vout, and to obtain the stable output voltage Vout of the output. Therefore, the regulator 1A of the present embodiment can be easier designed as compared to a circuit of a voltage mode, and since it is unnecessary to provide a new component inside the circuit, it is possible to reduce the size of the entire circuit.

Also, according to the regulator 1A of the present embodiment, since there is no differential amplifier, the gain of the inside of the circuit decreases. Therefore, the voltage difference between the feedback voltage Vfb and the predetermined reference voltage Vref increases. As a result, the comparator which receives the voltage difference can detect change of the feedback voltage Vfb.

Therefore, the regulator 1A of the present embodiment uses change of the current value of the coil current IL. Specifically, the current value of the coil current IL is added to the feedback current corresponding to the feedback voltage Vfb, whereby the complex voltage Vad is obtained, and the complex voltage Vad is compared with the reference voltage. As a result, the regulator 1A can control ON/OFF of the transistor 101A in response to a change in the output voltage Vout, and can reduce the voltage difference between the output voltage Vout and the target voltage Vtar. Further, since the timings to turn on the transistor 101A are controlled on the basis of the clock signal CL having the fixed frequency, the switching frequency of the transistor 101A also becomes a fixed frequency. In a case where the switching frequency varies, in an in-vehicle device, noise becomes more likely to influence a radio or the like. In contrast to this, in the regulator 1A of the present embodiment, since the switching operation is performed at the fixed frequency, it becomes possible to set the reception frequency of the radio and the switching frequency to different frequencies. As a result, the regulator 1A can avoid superimposition of switching noise on the radio. Also, since it is possible to see the switching frequency in advance, other devices such as a radio can take a measure against noise, and is unlikely to be influenced by noise.

Second Embodiment

Subsequently, a second embodiment will be described. In the first embodiment, the configuration in which the sense resistor 22A and the sense amplifier 24A are used to derive the coil current IL, and the adder circuit 30A is used to derive the complex voltage Vad has been described. In contrast to this, in the second embodiment, without using the sense resistor 22A, the sense amplifier 24A, and the adder circuit 30A, the complex voltage Vad is derived, whereby the transistor 101A is controlled. A switching regulator 1aA (hereinafter, referred to as "regulator 1aA") has been obtained by changing the configuration of a portion of the regulator 1A of the first embodiment. Hereinafter, the configuration change and an operation according to the configuration change will be mainly described with reference to FIG. 4.

3. Configuration Change and Operation According to Configuration Change

<3-1. Configuration Change>

Figure 4:
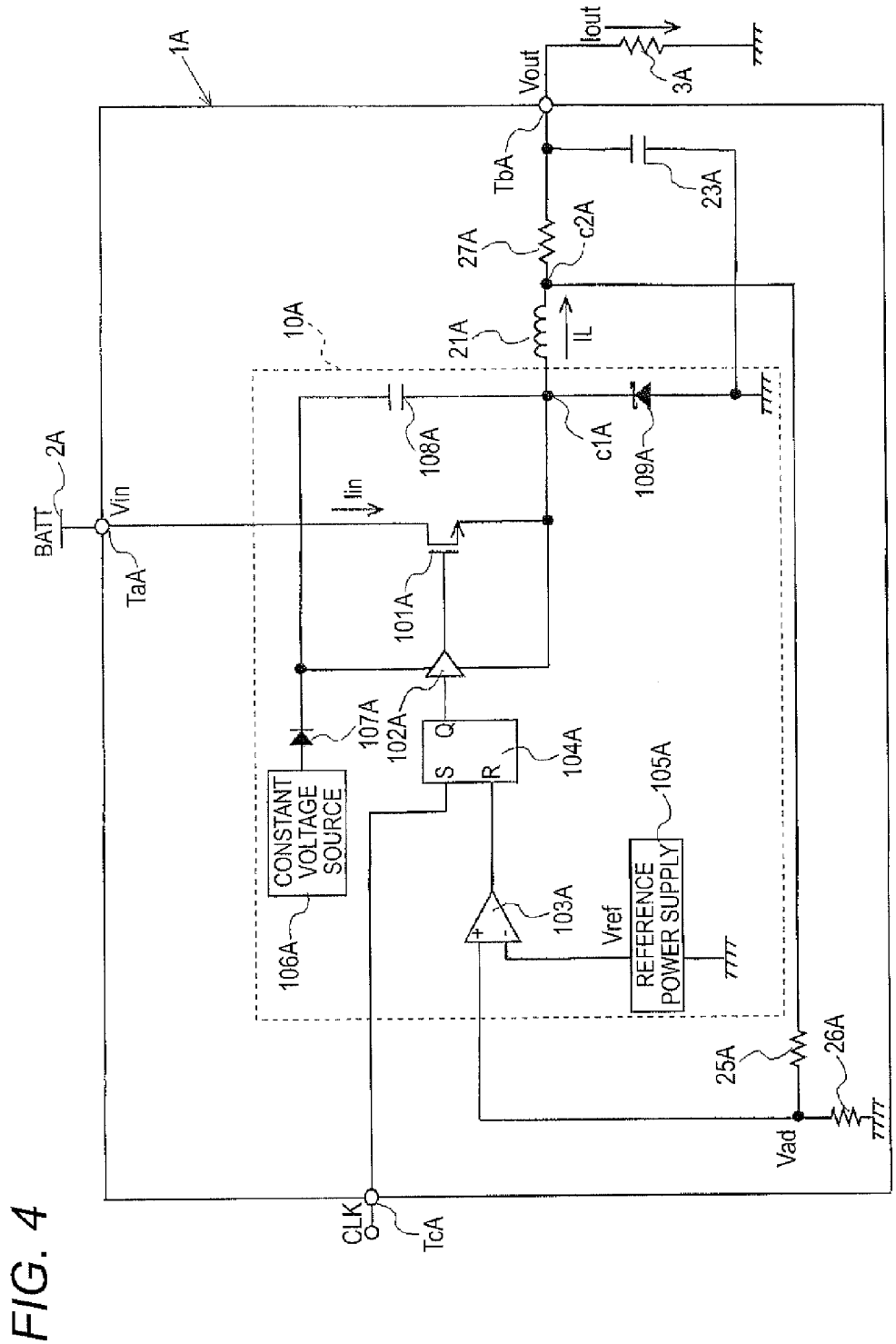
FIG. 4 is a view illustrating the circuit configuration of a regulator of a second embodiment.

FIG. 4 is a view illustrating the circuit configuration of the regulator 1aA of the second embodiment. The regulator 1aA includes a detection resistor 27A substituting for the sense amplifier 24A and the adder circuit 30A, as a new component, in addition to the regulator 1A of the first embodiment. The detection resistor 27A is connected on the output side (source side) of the transistor 101A and at the previous stage of the output terminal TbA. In other words, the detection resistor 27A is provided between the coil 21A and the output terminal TbA. Also, unlike in the configuration of the regulator 1A of the first embodiment, in the regulator 1aA, there are not provided the sense resistor 22A and the sense amplifier 24A.

Also, in the regulator 1A of the first embodiment, the connection point of the sense resistor 22A and the sense amplifier 24A is connected to the first resistor 25A. In contrast to this, in the regulator 1aA, the connection point of the coil 21A and the detection resistor 27A is connected to the first resistor 25A. Also, the connection point of the first resistor 25A and the second resistor 26A is connected directly to the non-inverted input terminal of the comparator 103A. That is, the connection point of the first resistor 25A and the second resistor 26A is connected to the non-inverted input terminal of the comparator 103A, not via the adder circuit 30A.

<3-2. Operation According to Configuration Change>

The detection resistor 27A extracts the voltage of the connection point c2A of the detection resistor 27A and the coil 21A on the upstream side of the detection resistor, that is, on the transistor (101A) side, as a feedback voltage. Therefore, the feedback voltage becomes the sum of the output voltage Vout and the derived voltage VL corresponding to the coil current IL. In other words, the feedback voltage is a voltage including the derived voltage VL and the output voltage Vout, and is supplied to a voltage dividing circuit composed of the first resistor 25A and the second resistor 26A.

The first resistor 25A and the second resistor 26A divide the feedback voltage including the output voltage Vout and the derived voltage VL, thereby outputting the complex voltage Vad. As a result, the complex voltage Vad is applied to the non-inverted input terminal of the comparator 103A, whereby switching control is performed on the transistor 101A. As described above, since the upstream side voltage of the detection resistor 27A is supplied to the comparator 103A, it is possible to implement the same function as that of the regulator of the first embodiment including the sense amplifier 24A and the adder circuit 30A. Also, as compared to the regulator 1A of the first embodiment, since a plurality of components of the sense amplifier 24A and the adder circuit 30A is eliminated, the regulator 1aA can reduce the manufacturing cost.

Third Embodiment

Subsequently, a third embodiment will be described. In the first embodiment, change of the current value of the AC component of the coil current IL is influenced by the inductance of the coil 21A. Specifically, in a case where the inductance of the coil 21A is relatively large, the amplitude of the AC component of the coil current IL becomes small. In contrast to this, in a case where the inductance of the coil 21A is relatively small, the amplitude of the AC component of the coil current IL becomes large. Therefore, in order to appropriately set the amplitude of the AC component of the coil current IL, it is necessary to set the inductance of the coil 21A to a value in a predetermined range. That is, the inductance value is restricted according to the amplitude of the AC component of the coil current IL, and thus cannot be set to an arbitrary value. In contrast to this, in a switching regulator 1bA (hereinafter, referred to as "regulator 1bA") of the third embodiment, the AC component of the coil current IL is separately generated, such that the inductance of the coil 21A is not restricted. The regulator 1bA has been obtained by changing the configuration of a portion of the regulator 1A of the first embodiment. Hereinafter, the configuration change and an operation according to the configuration change will be mainly described with reference to FIGS. 5 and 6.

4. Configuration Change and Operation According to Configuration Change

<4-1. Configuration Change>

Figure 5:
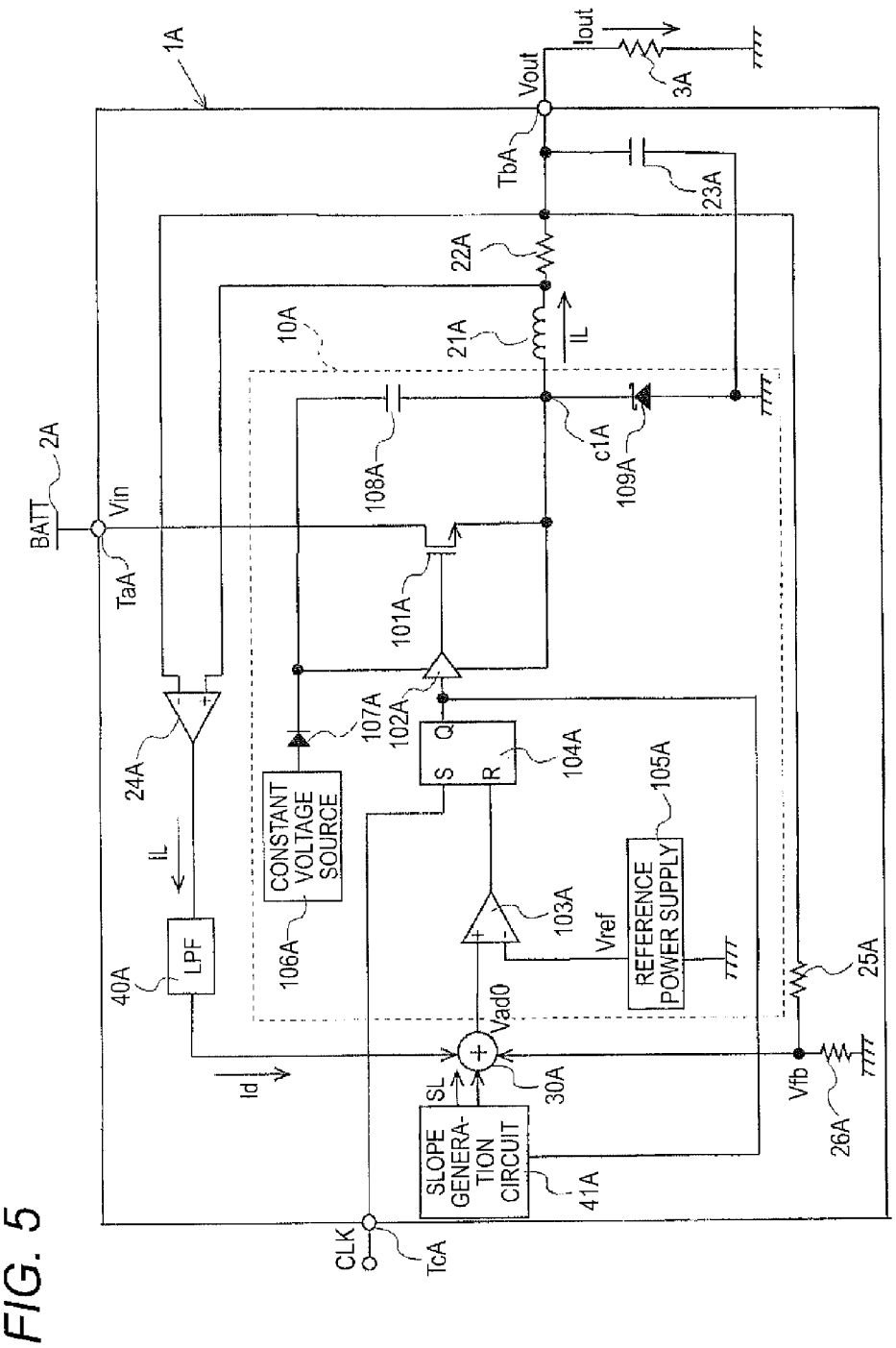
FIG. 5 is a view illustrating the circuit configuration of a regulator of a third embodiment.

FIG. 5 is a view illustrating the circuit configuration of the regulator 1bA of the third embodiment. The regulator 1bA includes a low-pass filter (LPF) 40A and a slope generation circuit 41A, as new components, in addition to the components of the regulator 1A of the first embodiment. The LPF 40A is connected to the output side of the sense amplifier 24A. Also, the LPF 40A is connected to the adder circuit 30A. The slope generation circuit 41A is connected to the adder circuit 30A. Also, the slope generation circuit 41A is connected to a point between the output (Q) terminal of the flip-flop 104A and the driver 102A.

<4-2. Operation According to Configuration Change>

The LPF 40A passes therethrough the DC component (hereinafter, referred to as "DC current Id") of the coil current IL output from the sense resistor 22A, and outputs the DC current Id to the adder circuit 30A.

The slope generation circuit 41A generates a slope current having a predetermined slope, and supplies the slope current to the adder circuit 30A. The slope current is a current corresponding to the AC component of the coil current IL which is eliminated by the LPF 40A.

Figure 6:
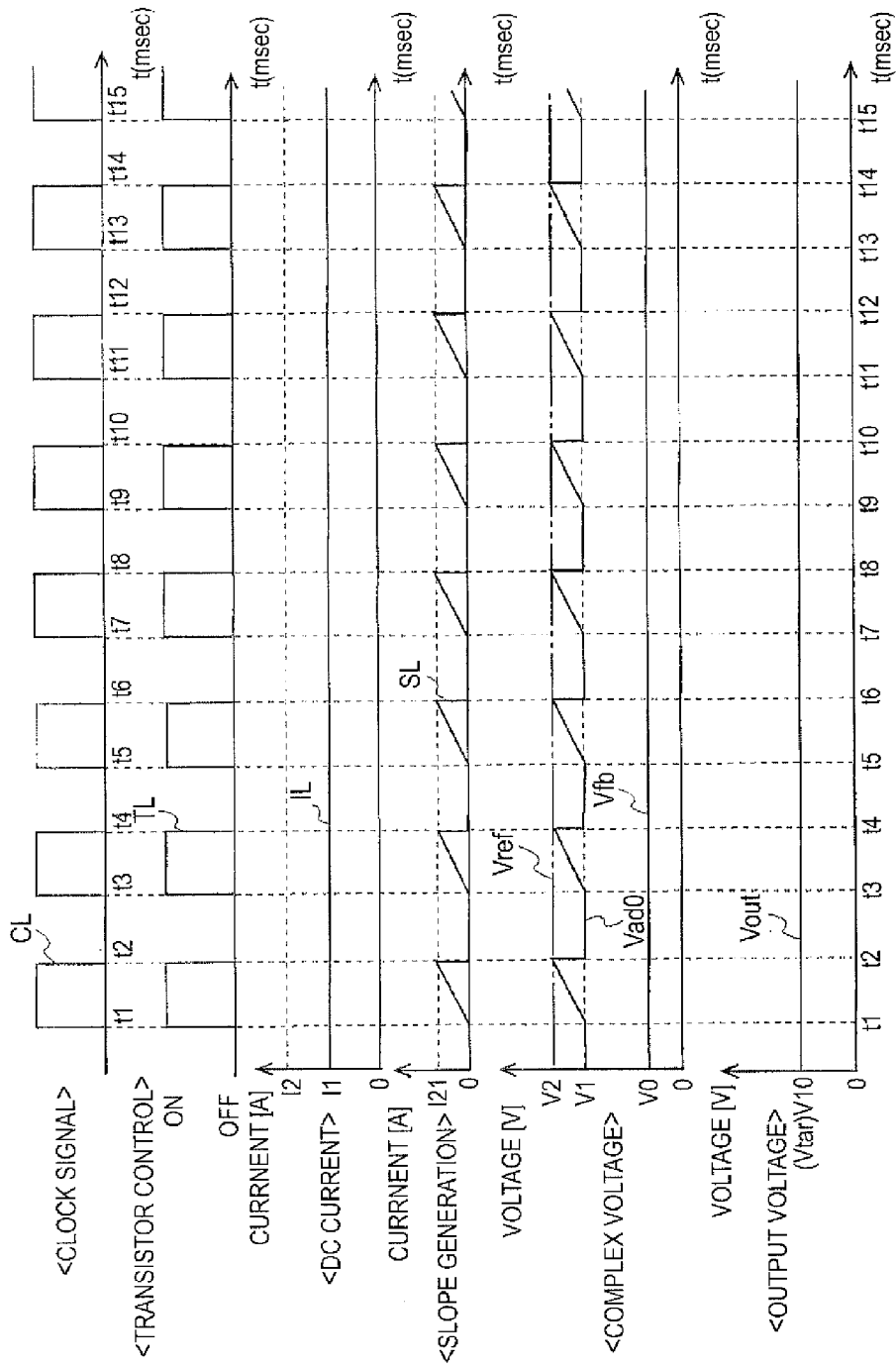
FIG. 6 is a view illustrating temporal changes of individual signals relative to the regulator of the third embodiment.

Subsequently, the DC current Id and the slope current will be described with reference to FIG. 6. FIG. 6 is a view illustrating temporal changes of individual signals relative to the regulator 1bA of the third embodiment. In FIG. 6, a DC current graph and a slope generation graph are shown in addition to a clock signal graph, a transistor control graph, a coil current graph, a complex voltage graph, and an output voltage graph. The horizontal axis of each graph represents time (msec).

The DC current graph is a graph representing the waveform of the DC current Id which is the DC component of the coil current IL having passed through the LPF 40A. The vertical axis of the DC current graph represents a current value [A]. Since the AC component is eliminated by the LPF 40A, the DC current Id represents substantially a constant current value (for example, a current value I1).

The slope generation graph is a graph representing the waveform of a slope current SL corresponding to the AC component of the coil current IL. The vertical axis of the slope generation graph represents a current value [A]. In a case where the transistor 101A is turned on, that is, the H signal is output from the output (Q) terminal of the flip-flop 104A, the current value of the slope current SL increases at a constant slope, and at a timing when the transistor 101A is turned off by output of the comparator 103A, the current value of the slope current SL is reset. In FIG. 6, the current value of the slope current SL increases from 0 A to a current value I21 in a period from a time t1 until a time t2, and thereafter decreases to 0 A. In a case where an L signal is output from the output (Q) terminal of the flip-flop 104A, the current value of the slope current SL becomes 0 A.

As described above, the current value of the slope current SL is increased at the constant slope at a timing when the transistor 101A is turned on, and then is reset to 0 at a timing when the transistor 101A is turned off, whereby it is possible to turn on or off the transistor 101A with a predetermined period, thereby stabilizing the output voltage Vout. The reason is that if the current value is decreased at a constant slope like when the current value increases, the transistor 101A is not turned on or off with a predetermined period, and thus the output voltage Vout is not stable. Thereafter, the slope current SL repeatedly and periodically increases and decreases in sync with the ON/OFF timings of the transistor 101A.

A complex voltage Vad0 of the complex voltage graph is a voltage including a DC voltage Vd, a slope voltage SV, and the feedback voltage. Vfb. In other words, the complex voltage Vad0 is the slope voltage SV corresponding to the slope current SL, and a voltage including the DC component of the derived voltage. VL, in place of the derived voltage VL including the DC component and the AC component and described in the first embodiment. Also, the DC voltage Vd is a voltage which is derived on the basis of the DC current Id. The slope voltage SV is a voltage which is derived on the basis of the slope current SL.

For example, at the time t1, the feedback voltage Vfb and the DC voltage Vd become a voltage value V0 and the difference (V1−V0) of the voltage value V0 from a voltage value V1, respectively, and the complex voltage Vad0 becomes the voltage value V1. Also, at the time t2, the feedback voltage Vfb and the DC voltage Vd have the same voltage values as those at the time t1; however, since the slope voltage SV is added, the complex voltage Vad0 becomes a voltage value V2 larger than the voltage value at the time t1.

As described above, if the transistor 101A is turned on at the time t1, the voltage value of the complex voltage Vad0 increases with increasing of the slope voltage SV, and if the complex voltage Vad0 becomes the same voltage value as the reference voltage Vref at the time t2, the transistor 101A is turned off, whereby the slope voltage SV is reset. As a result, the voltage value of the complex voltage Vad0 decreases from the voltage value V2 to the voltage value V1. Thereafter, M a period from the time t2 until a time t3, the complex voltage Vad0 is maintained constant at the voltage value V1. Thereafter, the same operation is repeated in sync with the ON/OFF timings of the transistor 101A. As described above, the regulator 1bA controls ON/OFF of the transistor 101A in response to periodic change of the complex voltage Vad0, thereby capable of stabilizing output of the output voltage Vout, and controlling the voltage value of the output voltage Vout such that a difference between the voltage value of the output voltage Vout and the voltage value of the target voltage Vtar is small. Also, change of the current value of the AC component of the coil current IL are influenced by the inductance of the coil 21A. Specifically, in a case where the inductance of the coil 21A is relatively large, the amplitude of the AC component of the coil current IL becomes small. In contrast to this, in a case where the inductance is relatively small, the amplitude of the AC component of the coil current IL becomes large. Therefore, in order to appropriately set the amplitude of the AC component of the coil current IL, it is necessary to set the inductance of the coil 21A to a value in a predetermined range. That is, the inductance value is restricted according to the amplitude of the AC component of the coil current IL. With respect to this, the regulator 1bA generates the slope current SL by the slope generation circuit 41A, thereby capable of setting the inductance of the coil to an arbitrary value, without being influenced by the amplitude of the AC component of the coil current IL. As a result, the regulator 1bA can regulate the current amount of the coil current IL, and the regulator 1bA can perform stable control on the output of the output voltage Vout.

Fourth Embodiment

Subsequently, a fourth embodiment will be described. In the first embodiment, a case of using the adder circuit 30A to derive the complex voltage Vad has been described. Also, in the first embodiment, the output voltage Vout is divided by the first resistor 25A and the second resistor 26A, whereby the feedback voltage Vfb to be included in the complex voltage Vad is derived. The fourth embodiment is configured such that the complex voltage Vad is derived without some internal components of the circuit, that is, the adder circuit 30A, the first resistor 25A, and the second resistor 26A described above. A switching regulator 1cA (hereinafter, referred to as "regulator 1cA") of the fourth embodiment has been obtained by changing a portion of the regulator 1A of the first embodiment. Hereinafter, the configuration change and an operation according to the configuration change will be mainly described with reference to FIG. 7.

5. Configuration Change and Operation According to Configuration Change

<5-1. Configuration Change>

Figure 7:
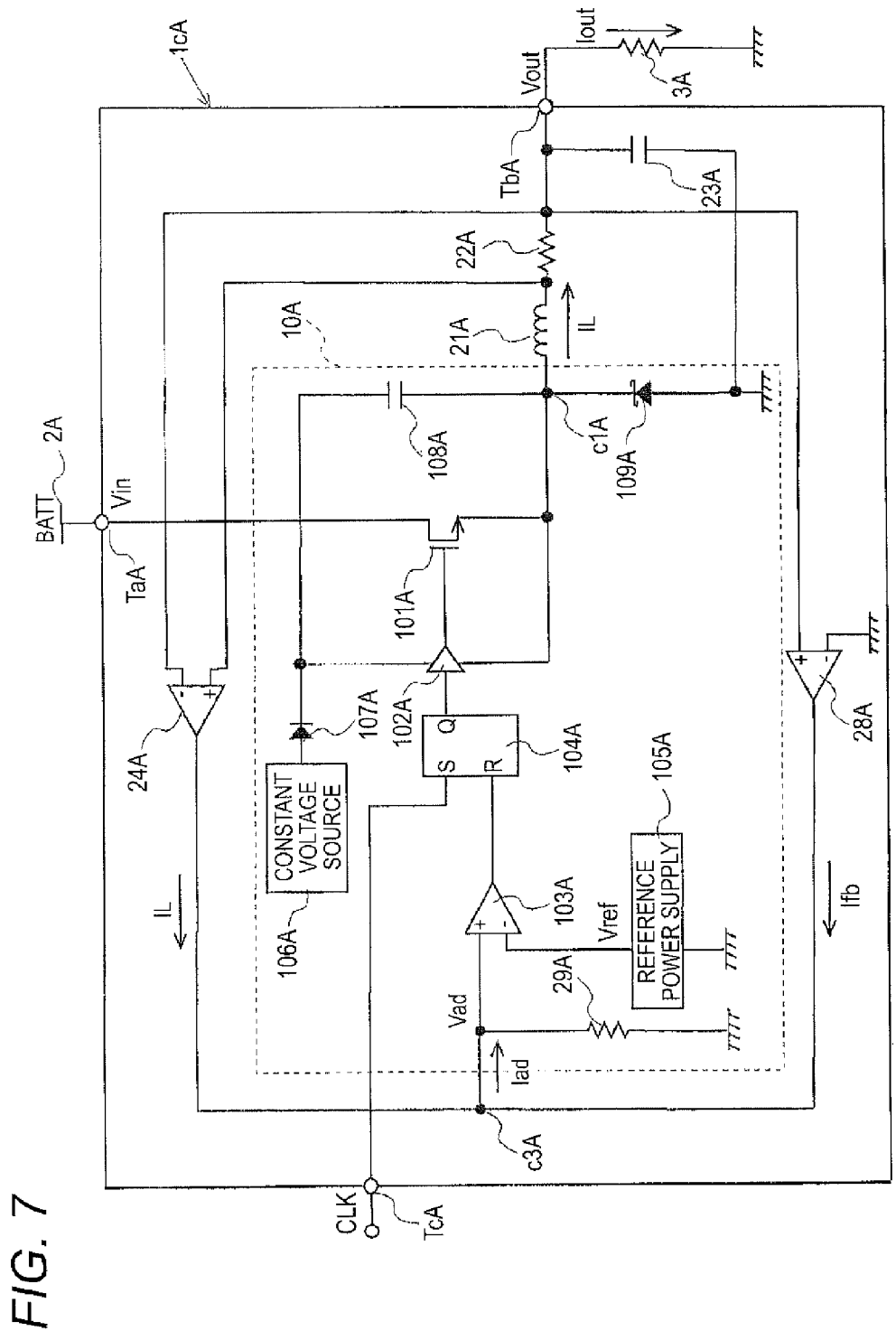
FIG. 7 is a view illustrating the circuit configuration of a regulator of a fourth embodiment.

FIG. 7 is a view illustrating the circuit configuration of the regulator 1cA of the fourth embodiment. The regulator 1cA includes a V/I conversion circuit 28A for converting a voltage into a current, and a derivation resistor 29A as new components, in addition to the configuration of the regulator 1A of the first embodiment. The non-inverted input terminal of the V/I conversion circuit 28A is connected to the connection point of the other end of the sense resistor 22A and the inverted input terminal of the sense amplifier 24A. The inverted input terminal of the V/I conversion circuit 28A is connected to the ground. The output terminal of the V/I conversion circuit 28A is connected to a connection point c3A which is the connection point of the output terminal of the sense amplifier 24A and the non-inverted input terminal of the comparator 103A. The derivation resistor 29A is connected to a point between the non-inverted input terminal of the comparator 103A and the connection point c3A. The other end of the derivation resistor 29A is connected to the ground. Also, unlike in the configuration of the regulator 1A of the first embodiment, in the regulator 1cA, there are not provided the first resistor 25A, the second resistor 26A, and the adder circuit 30A.

<5-2. Operation According to Configuration Change>

The V/I conversion circuit 28A converts the output voltage Vout having been fed back, into the feedback current Ifb. The feedback current Ifb joins the coil current IL at the connection point c3A. In the derivation resistor 29A, the complex current Iad flows. The complex current Iad is a current including the feedback current Ifb and the coil current IL. The derivation resistor 29A derives the complex voltage Vad on the basis of the complex current Iad. As a result, the complex voltage Vad is derived on the basis of the complex current Iad flowing in the derivation resistor 29A. The complex voltage Vad is applied to the non-inverted input terminal of the comparator 103A. Therefore, switching control is performed on the transistor 101A. Therefore, without a plurality of components of the first resistor 25A, the second resistor 26A, and the adder circuit 30A, the regulator 1cA can control the output voltage Vout such that the voltage value of the output voltage Vout is stable, and can reduce the voltage difference between the output voltage Vout and the target voltage Vtar. Also, since the complex voltage Vad is derived by the derivation resistor 29A, it is possible to regulate the output voltage Vout only by one resistor, and it is easy to control internal elements of the circuit of the regulator 1cA, and it is possible to improve the accuracy of deriving of the output voltage Vout.

Fifth Embodiment

Subsequently, a fifth embodiment will be described. In the regulator 1A of the first embodiment, in a case where the current value of the output current Iout increases, there is a problem in which the voltage value of the output voltage Vout decreases with increasing of the output current Iout. As a result, the voltage difference between the output voltage Vout and the target voltage Vtar increases, and stable power supply to the load 3A becomes difficult. For this reason, in the fifth embodiment, the reference voltage Vref is adjusted such that the voltage value of the output voltage Vout is prevented from decreasing even if the output current Iout increases. Also, the relation between increasing of the current value of the output current Iout and decreasing of the output voltage Vout will be described below.

FIG. 8 shows graphs representing changes of the voltage values of the reference voltage Vref and the output voltage Vout according to existence or non-existence of adjustment on the reference voltage Vref of a switching regulator 1dA (hereinafter, referred to as "regulator 1dA") of the fifth embodiment. In the graphs of FIG. 8, each horizontal axis represents a current value [A], and each vertical axis represents a voltage value [V]. The upper graph of FIG. 8 is a graph representing change of the output voltage Vout and the reference voltage Vref in a case where the reference voltage Vref is not adjusted. The output voltage Vout is represented by a line Vout1a, and the reference voltage Vref is represented by a line Vref1a.

If the output current Iout increases from a current value Ia to a current value Ic as shown in the horizontal axis of the upper graph of FIG. 8, the voltage value of the output voltage Vout decreases a voltage value V14 to a voltage value V12 as shown by the line Vout1a. As a result, the voltage difference between the output voltage Vout and the target voltage Vtar increases, and stable power supply to the load 3A becomes difficult. Also, the voltage value of the reference voltage Vref is constant as shown by the line Vref1a. The reason why the output voltage Vout decreases with increasing of the output current Iout is as follows. Increasing of the output current Iout means increasing of the DC component of the output current Iout. That is, the DC component of the coil current IL corresponding to the output current Iout increases, and with the increasing of the DC component of the coil current IL, the derived voltage VL corresponding to the coil current IL also increases. As a result, the complex voltage Vad increases. The complex voltage Vad is a voltage including the feedback voltage Vfb obtained by dividing the output voltage Vout, and the derived voltage VL corresponding to the coil current IL.

The regulator 1dA performs feedback control on the output voltage Vout such that the complex voltage Vad and the reference voltage Vref coincide with each other. Then, it is assumed that the output current Iout increases by ΔI, and with the increasing of the output current Iout, the derived voltage VL increases by ΔV. The complex voltage Vad increases by ΔV at the initial stage when the output current Iout increases, and thus the ON-Duty of the transistor 101A decreases. Thereafter, the ON-Duty of the transistor 101A decreases to about 50% by feedback control. In this state, the voltage increase ΔV of the complex voltage Vad according to increasing of the coil current IL remains. As a result, the output voltage Vout is settled in the state where the output voltage Vout has decreased by ΔV.

In the present embodiment, in response to decreasing of the voltage value of the output voltage Vout as described above, the voltage value of the reference voltage Vref is adjusted such that the voltage difference between the output voltage Vout and the target voltage Vtar becomes small.

The lower graph of FIG. 8 is a graph representing change of the output voltage Vout and the reference voltage Vref in a case where the reference voltage Vref is adjusted. The output voltage Vout is shown by a line Vout1b, and the reference voltage Vref is shown by a line Vref1b. In the upper graph, the reference voltage Vref is maintained constant at a voltage value (a voltage value V30) as shown by the line Vref1a; however, in the lower graph, as shown by the line Vref1b, the voltage value of the reference voltage Vref increases as the current value of the output current Iout increases.

If the output current Iout varies to the current value Ia, the voltage value of the reference power supply 105A increases by a regulated power supply 51A (to be described below). As a result, the reference voltage Vref changes from the voltage value V30 to a voltage value V20 as shown by the line Vref1b. The voltage value V20 is a voltage value larger than the voltage value V30. Further, if the output current Iout changes to a current value Ib larger than the current value Ia, the reference voltage Vref changes from the voltage value V20 to a voltage value V21 as shown by the line Vref1b. The voltage value V21 is a voltage value larger than the voltage value V20. Furthermore, if the output current Iout changes to the current value Ic larger than the current value Ib, the reference voltage Vref changes from the voltage value V21 to a voltage value V22 as shown by the line Vref1b. The voltage value V22 is a voltage value larger than the voltage value V21. This change of the voltage value is caused by increasing the voltage value of the reference power supply 105A by the regulated power supply 51A.

As described above, as the current value of the output current Iout increases, the voltage value of the reference voltage Vref which is the voltage of the reference power supply 105A is increased by the regulated power supply 51A, whereby it is possible to compensate the increase of the current value of the output current Iout by the increase of the reference voltage Vref. As a result, the output voltage Vout becomes substantially the same voltage value as the voltage value V15 of the target voltage Vtar. As described above, the regulator 1dA can control the output voltage Vout such that the voltage value of the output voltage Vout is stable. Further, the regulator 1dA can reduce the voltage difference between the output voltage Vout and the target voltage Vtar.

Subsequently, the configuration of the regulator 1dA of the fifth embodiment will be described. The regulator 1dA has been obtained by changing the configuration of a portion of the regulator 1A of the first embodiment. Hereinafter, the configuration change and an operation according to the configuration change will be mainly described with reference to FIGS. 9 and 10.

6. Configuration Change and Operation According to Configuration Change>

<6-1. Configuration Change>

Figure 9:
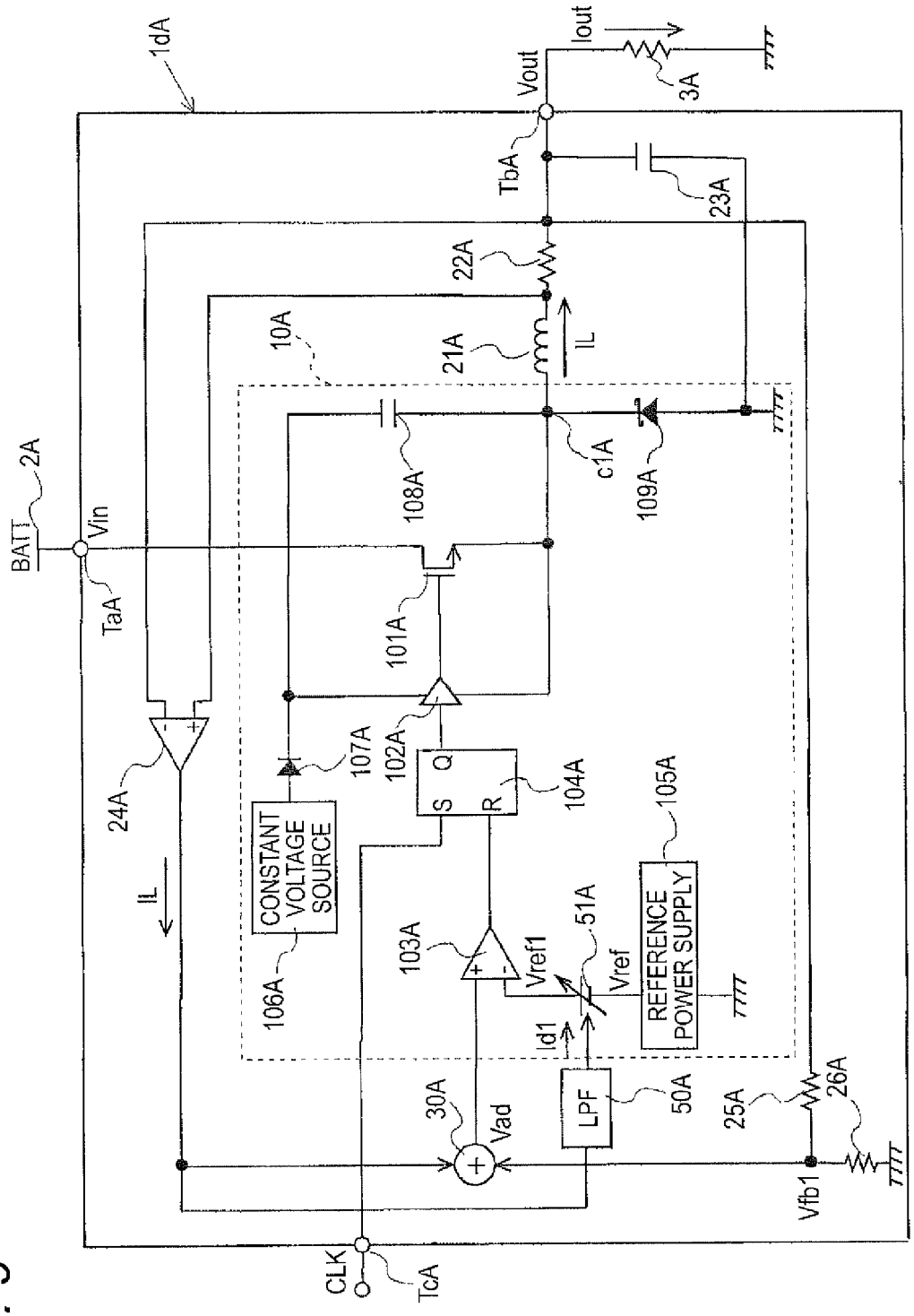
FIG. 9 is a view illustrating the circuit configuration of a regulator of a fifth embodiment.

FIG. 9 is a view illustrating the circuit configuration of the regulator 1dA of the fifth embodiment. The regulator 1dA includes an LPF 50A and the regulated power supply 51A as new components, in addition to the configuration of the regulator 1A of the first embodiment. The LPF 50A is connected to the connection point of the comparator 103A and the adder circuit 30A. One end of the regulated power supply 51A is connected to the inverted input terminal of the comparator 103A, and the other end thereof is connected to the reference power supply 105A. The regulated power supply 51A is comprised of a circuit for offsetting the reference voltage Vref. Also, the regulator 1dA is configured such that the output of the LPF 50A is input to the regulated power supply 51A.

<6-2. Operation According to Configuration Change>

The LPF 50A is a filter for passing therethrough the current Id1 (hereinafter, referred to as "DC current Id1) of the DC component of the coil, current IL, and has a function of detecting the magnitude of the output current Iout. The regulated power supply 51A is a power supply circuit for increasing the voltage value of the reference power supply 105A by a voltage Vd1 (hereinafter, referred to as "DC voltage Vd1") derived on the basis of the DC current Id1. Hereinafter, a detailed description will be made with reference to FIG. 10.

Figure 10:
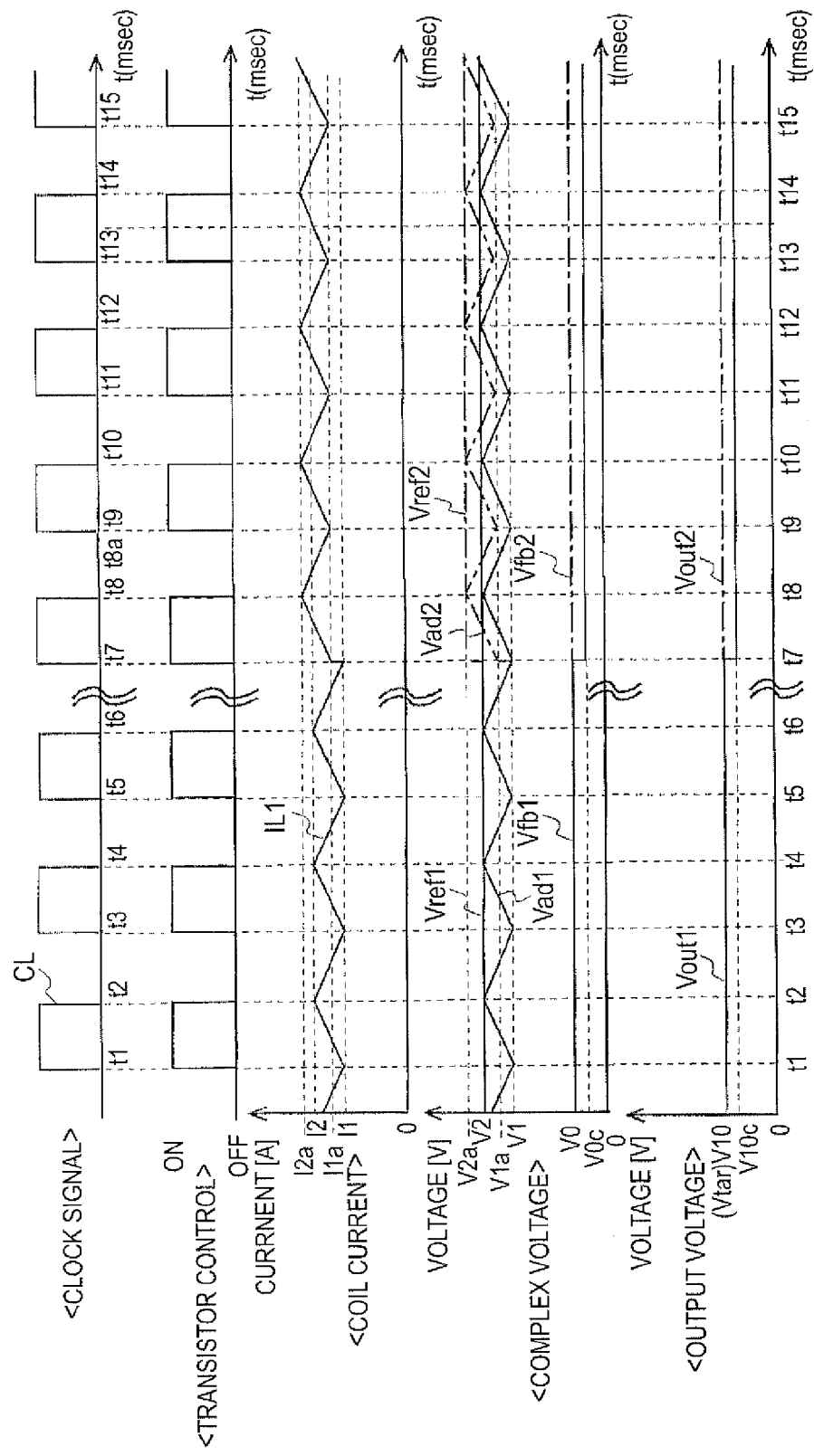
FIG. 10 is a view illustrating temporal changes of individual signals relative to the regulator of the fifth embodiment.

FIG. 10 is a view illustrating temporal changes of individual signals relative to the regulator 1dA of the fifth embodiment. First, the waveforms of individual signals in a case where the reference voltage has not been adjusted will be described.

In a period from a time 0 until a time t6, each signal of the regulator 1dA repeats the same periodic change as that of the first embodiment. Thereafter, at a time t7, the clock signal CL rises, whereby the transistor 101A is turned on. If it is assumed that the output current Iout increases in a period from the time t6 until the time t7, and thereafter is maintained at the increased current value, since a complex voltage Vad1 increases due to the initial increase of the current value, the ON periods of the transistor 101A are reduced. However, thereafter, due to feedback control, the ON periods of the transistor 101A gradually increase, and in a short time, the ON-Duty becomes the same as that before the increasing of the current. In FIG. 10, after the time t7, the output current is settled in the state where the output current has increased. At the time t7, the current value of the coil current IL becomes a current value I1a larger than the current value I1.

The complex voltage Vad1 transiently changes in the period from the time t6 until the time t7. That is, after the time t6, the current value of a coil current IL1 increases, and thus the increasing time of the voltage value of the complex voltage Vad1 becomes shorter than that before the time t6. The reason why the increasing time of the complex voltage Vad1 shortens as described above is that a time for the voltage value of the complex voltage Vad1 to increase in response to the increase of the coil current IL1 and reach the voltage value of a reference voltage Vref1 shortens.

As a result, the ON periods of the transistor 101A shorten, and the OFF period lengthens. Thereafter, due to feedback control, the ON periods of the transistor 101A gradually lengthen. Then, the voltage value of the complex voltage Vad1 is stabilized after the time t7, and periodically and repeatedly changes in sync with the ON/OFF timings of the transistor 101A, like before the time t6. In other words, the ON-Duty and OFF-Duty ratios of the control graph become the same ratios as the ON-Duty and the OFF-Duty ratios before the time t6.

Further, while the ON periods of the transistor 101A shorten after the time t6 and returns to the original state, an output voltage Vout1 transiently decreases from a voltage value V10 at the time t6 to a voltage value V10c at the time t7, so as to absorb the increase of the coil current IL. After the time t7, due to the ON-Duty and OFF-Duty ratios of the transistor 101A according to the stabilization of the voltage value of the complex voltage Vad, the state where the output voltage Vout having decreased to the voltage value V10c is maintained.

Also, the voltage value of the feedback voltage Vfb decreases from a voltage value V0 to a voltage value V0c with transient decreasing of the voltage value of the output voltage Vout1 in the period from the time t6 until the time t7, and after the time t7, similarly to the output voltage Vout1, the state where the feedback voltage Vfb having decreased to the voltage value V0c is maintained.

As described above, if the output current Iout increases, the output voltage Vout decreases to absorb the increase of the current value, and then is stabilized.

Subsequently, with respect to decreasing of the output voltage Vout1 according to increasing of the output current Iout, the waveforms of the signals in a case where the DC voltage Vd1 of the regulated power supply 51A is added to the reference voltage Vref such that the voltage value of the reference voltage Vref has increased will be described. The following description will be made on the assumption that the output current Iout increases at the time t7 unlike the above.

The voltage value of the DC voltage Vd1 of the regulated power supply 51A increases with increasing of the coil current IL1 corresponding to the output current Iout. If the output current Iout increases at the time t7, and the coil current IL1 increases with the increasing of the current value of the output current Iout, the DC voltage Vd1 increases with the increasing of the current value of the coil current IL1. As a result, the voltage value of the reference power supply 105A increases from a voltage value V2 to a voltage value V2a as shown by a reference voltage Vref2.

Also, a complex voltage Vad2 increases from a voltage value V1 to a voltage value V1a with the increasing of the DC voltage Vd1 as shown by a dotted line. That is, almost at the same time as the complex voltage Vad2 increases, the reference voltage Vref2 also increases by the same voltage. Therefore, it is possible to maintain the ON-Duty of the transistor 101A almost at 50% like before the time t6. Thereafter, the same state is repeated. As a result, the voltage value of the output voltage Vout is maintained at the voltage value V10 like before the time t6, without decreasing, as shown by the waveform of an output voltage Vout2. Also, since the feedback voltage Vfb changes according to the voltage value of the output voltage Vout, the feedback voltage Vfb is be maintained at the voltage value V0 like before the time t6 as shown by the waveform of a feedback voltage Vfb2. As described above, the regulator 1dA increases the voltage value of the reference voltage Vref in response to increasing of the current value of the DC current Id1, thereby capable of stabilizing the output of the output voltage Vout even if the output current Iout increases, and controlling the output voltage Vout such that the voltage difference between the output voltage Vout and the target voltage Vtar is small.

Sixth Embodiment

Subsequently, a sixth embodiment will be described. In the above described fifth embodiment, as the output current Iout increases, the reference voltage Vref is increased, whereby a measure to prevent the output voltage Vout from decreasing is taken. In contrast to this, in the present embodiment, as the coil current IL2 corresponding to an output current Iout1 increases, the voltage value of the complex voltage Vad2 is decreased without changing the reference voltage Vref, whereby a measure to prevent the output voltage Vout from decreasing is taken. A switching regulator 1eA (hereinafter, referred to as "regulator 1eA") of the sixth embodiment has been obtained by changing the configuration of a portion of the regulator 1A of the first embodiment. Hereinafter, the configuration change and an operation according to the configuration change will be mainly described with reference to FIGS. 11 and 12:

7. Configuration Change and Operation According to Configuration Change

<7-1. Configuration Change>

Figure 11:
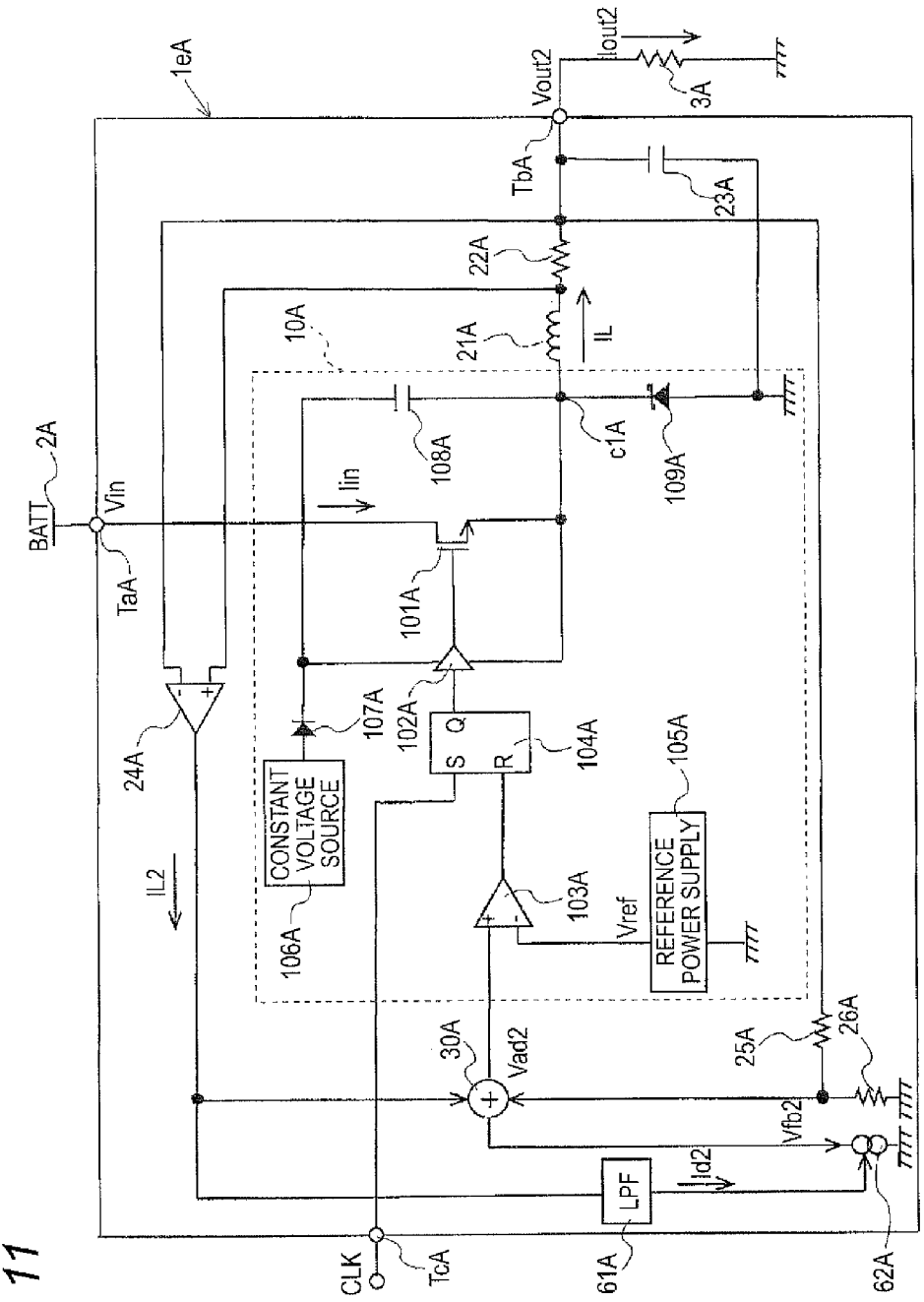
FIG. 11 is a view illustrating the circuit configuration of a regulator of a sixth embodiment.

FIG. 11 is a view illustrating the circuit configuration of the regulator 1eA of the sixth embodiment. The regulator 1dA includes an LPF 61A and a constant current source 62A as new components, in addition to the configuration of the regulator 1A of the first embodiment. The LPF 61A is connected to the connection point of the comparator 103A and the adder circuit 30A. Also, the other end of the LPF 61A is connected to the constant current source 62A. Also, the regulator 1eA is configured such that the output of the LPF 61A is be input to the constant current source 62A. The constant current source 62A is connected to the adder circuit 30A. Also, the constant current source 62A is configured to pull a current from the adder circuit 30A according to the output of the LPF 61A. The other end of the constant current source 62A is connected to the ground.

<7-2. Operation According to Configuration Change>

Figure 12:
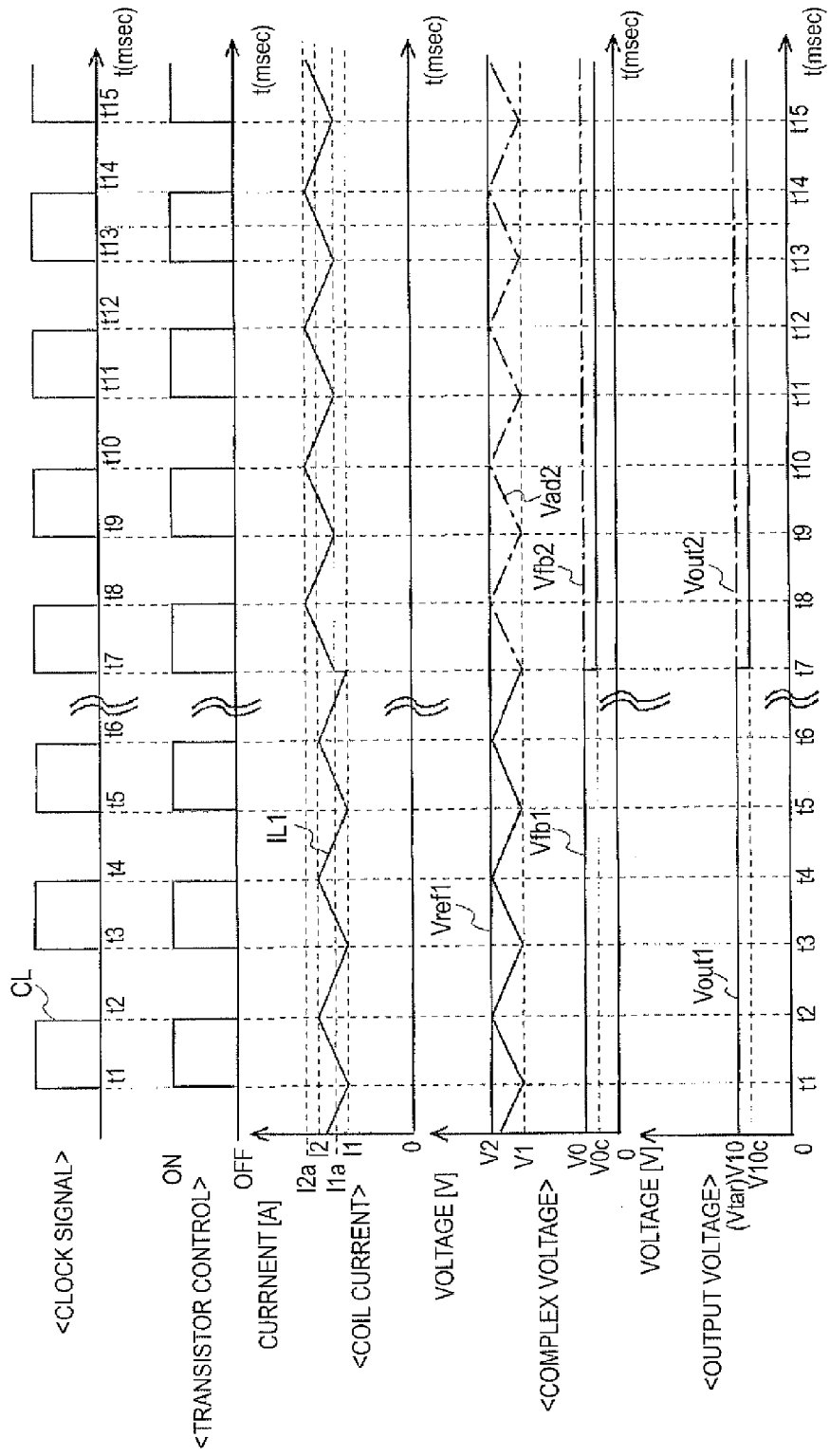
FIG. 12 is a view illustrating temporal changes of individual signals relative to the regulator of the sixth embodiment.

The LPF 61A is a filter for passing therethrough the current Id2 (hereinafter, referred to as "DC current Id1) of the DC component of a coil current IL2. The constant current source 62A is a current source which pulls a current from the adder circuit 30A according to the current Id2 output from the LPF 61A. A detailed description thereof will be made below with reference to FIG. 12. Also, it is possible to pull a current from the connection point of the second resistor 26A and the first resistor 25A for feedback. That is, it is needed only to configure such that as the output voltage Vout increases, the voltage to be compared with the voltage of the reference power supply 105A by the comparator 103A is considerably decreased. FIG. 12 is a view illustrating temporal changes of individual signals relative to the regulator 1cA of the sixth embodiment. In FIG. 12, graphs shown by solid lines represent states before the measure according to the present embodiment when it is assumed that the output current Iout increases in the period from the time t6 until the time t7. These states are the same as described with reference to FIG. 10, and thus will not be described. After the output current Iout increases, the output voltage Vout decreases.

In the present embodiment, as the coil current IL corresponding to the output current Iout increases, the voltage value of the complex voltage Vad is decreased while the reference voltage Vref is maintained, whereby that problem is solved. Also, the following description will be made on the assumption that the output current Iout increases at the time t7 like in FIG. 10.

If the coil current IL1 increases, in response to the increasing of the current value of the coil current IL1, the constant current source 62A pulls a current value corresponding to the current value of a DC current Id2 which is the DC component of the coil current ILL from the complex current Iad2 corresponding to the complex voltage Vad2. As a result, even if the DC current Id2 increases, the voltage value of the complex voltage Vad2 can be maintained in the same state as the state until the time t6, without increasing.

As a result, the ON periods of the transistor 101A also become the same ON periods as those before the time t6, and thus the voltage value of the output voltage Vout2 is maintained at the voltage value V10 like before the time t6, without decreasing. Also, since the voltage value of the output voltage Vout2 is maintained constant, the voltage value of the feedback voltage Vfb2 also is maintained at a voltage value Vc which is the same voltage value as that before the time t6. Therefore, even if the output voltage Vout increases, it is possible to control the output voltage Vout such that the voltage value of the output voltage Vout is stable, and it is possible to reduce the voltage difference between the output voltage Vout and the target voltage Vtar.

Seventh Embodiment

Subsequently, a seventh embodiment will be described. A switching regulator 1fA (hereinafter, referred to as "regulator 1fA") of the seventh embodiment has been obtained by changing the configuration of a portion of the regulator 1A of the first embodiment. Hereinafter, the configuration change and an operation according to the configuration change will be mainly described with reference to FIGS. 13 to 16.

8. Configuration Change and Operation According to Configuration Change

Figure 13:
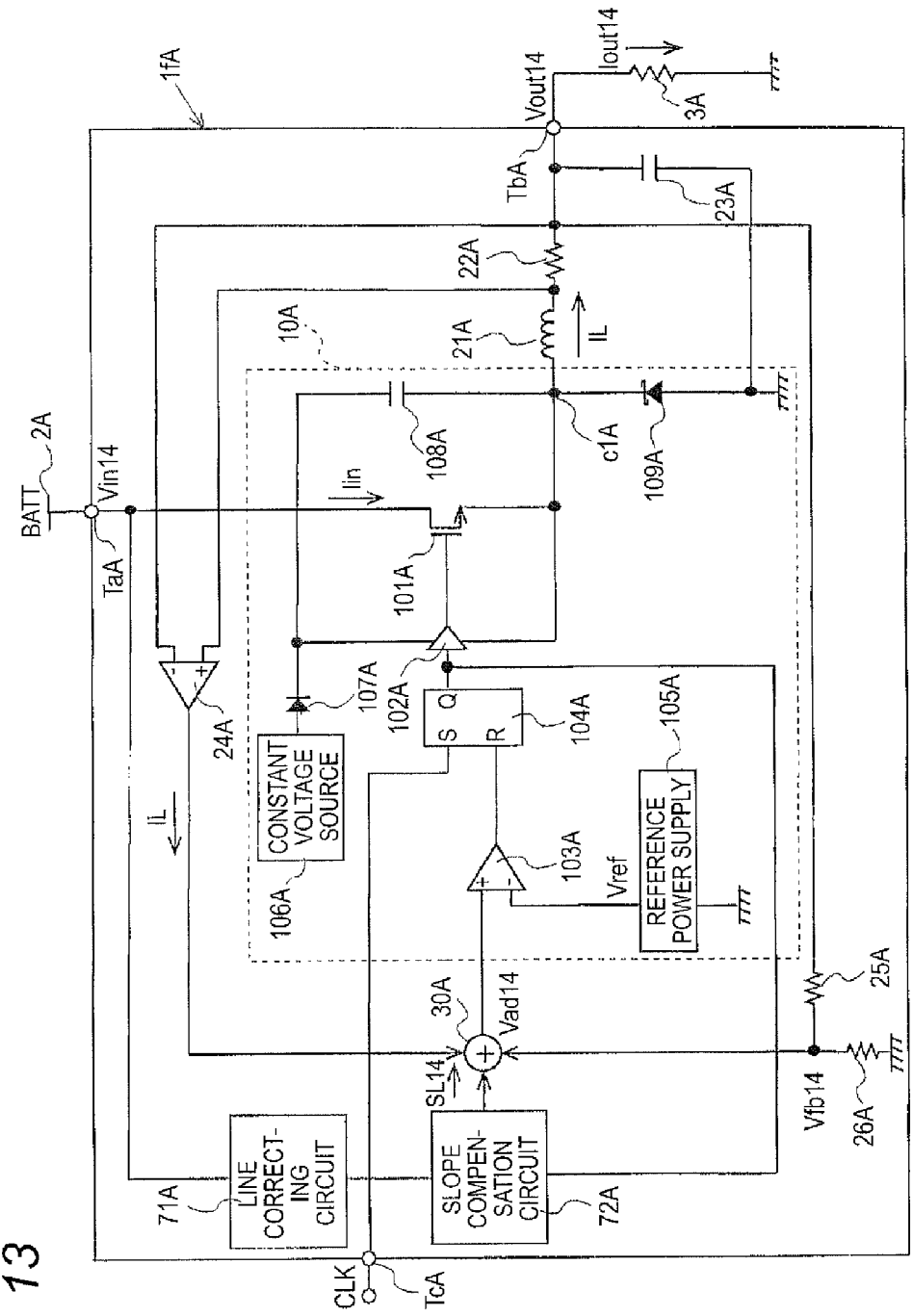
FIG. 13 is a view illustrating the circuit configuration of a regulator of a seventh embodiment.

<8-1. Configuration Change>
FIG. 13 is a view illustrating the circuit configuration of the regulator 1fA of the seventh embodiment. The regulator 1fA includes a line correcting circuit 71A and a slope compensation circuit 72A as new components, in addition to the configuration of the regulator 1A of the first embodiment. The line correcting circuit 71A is connected to the connection point of the input terminal TaA and the transistor 101A. The other end of the line correcting circuit 71A is connected to the slope compensation circuit 72A. The other end of the slope compensation circuit 72A is connected to the adder circuit 30A. Also, the slope compensation circuit 72A is connected to a point between the output (Q) terminal of the flip-flop 104A and the driver 102A.

In a case where the ON-Duty is larger than 50%, the OFF timings of the transistor 101A become non-periodic. For this reason, the slope compensation circuit 72A is used to prevent the voltage value of the output voltage Vout from considerably changing. In other words, the slope compensation circuit 72A is used to prevent sub-harmonic oscillation. Also, the line correcting circuit 71A is used to prevent the voltage value of the output voltage Vout from decreasing with decreasing of the voltage value of the input voltage Vin. A detailed operation of each circuit will be described below.

The line correcting circuit 71A receives the input voltage Vin, and outputs a correction signal according to the voltage value of the input voltage Vin to the slope compensation circuit 72A. The slope compensation circuit 72A generates a slope current whose slope decreases as the input voltage Vin decreases, on the basis of the correction signal, and outputs the slope current to the adder circuit 30A. In other words, the slope compensation circuit 72A generates a slope current whose current value rises at a smaller rate as the input voltage Vin decreases, on the basis of the correction signal, and outputs the slope current to the adder circuit 30A.

<8-2. Operation According to Configuration Change>
Before the operation of the regulator 1fA including the line correcting circuit 71A and the slope compensation circuit 72A will be described, temporal changes of individual signals in a case where a new additional component of the regulator 1fA is only the slope compensation circuit 72A will be described. In a case where the DC component of the coil current IL corresponding to the output current Iout increases with decreasing of the resistance value of the load 3A, the OFF timings of the transistor 101A become unstable. As a result, the voltage value of the output voltage Vout is not stabilized, and the voltage difference between the output voltage Vout and the target voltage Vtar increases. The slope compensation circuit 72A supplies a slope current such that the OFF timings of the transistor 101A are stable even if the current value of the coil current IL increases.

Figure 14:
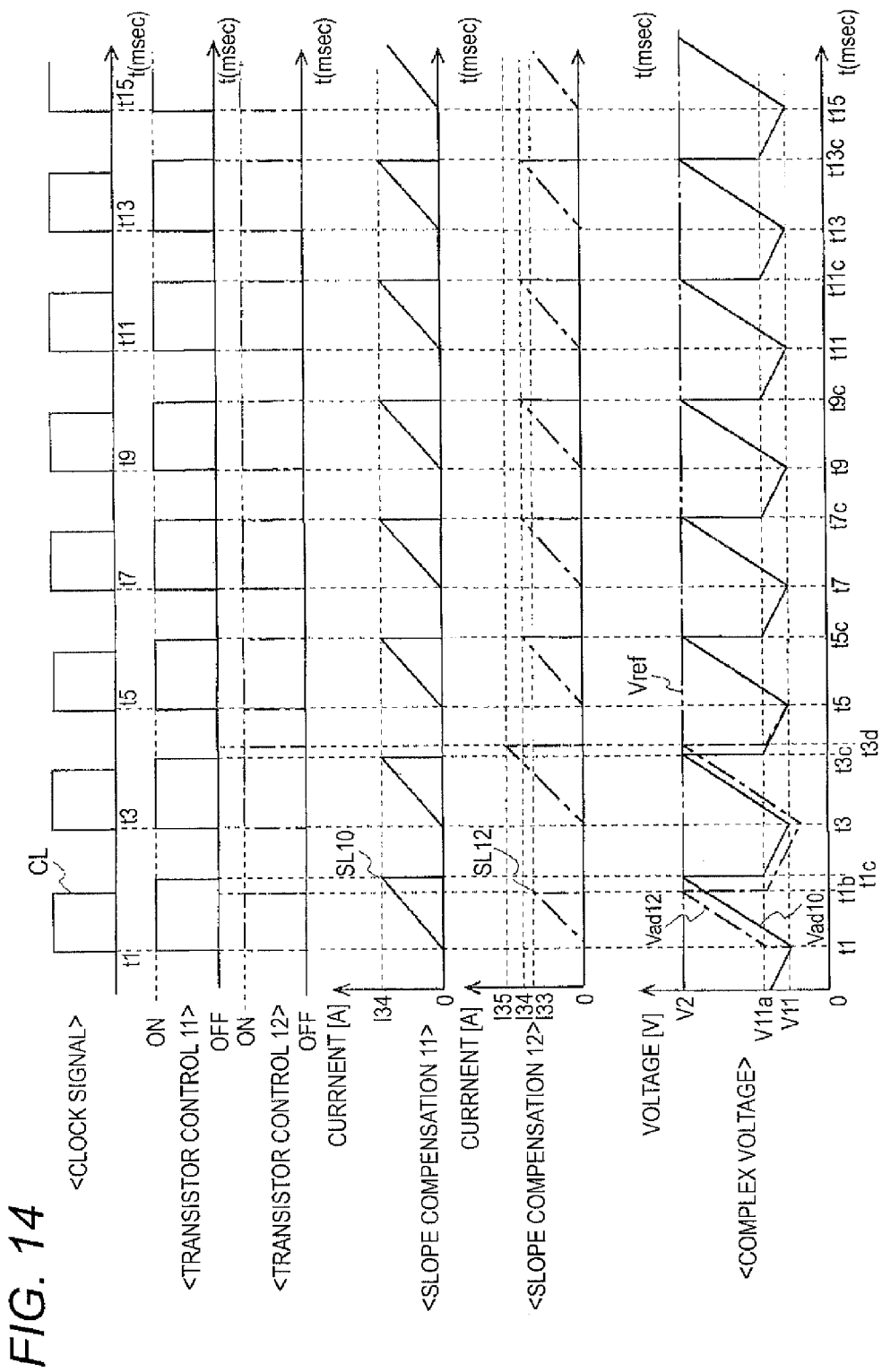
FIG. 14 is a view illustrating temporal changes of individual signals in a case where a regulator includes a slope compensation circuit.

FIG. 14 is a view illustrating temporal changes of individual signals in a case where the regulator includes the slope compensation circuit 72A. In FIG. 14, there are shown a clock signal graph, a transistor control graph 11, a transistor control graph 12, a slope compensation graph 11, a slope compensation graph 12, and a complex voltage graph.
<8-2-1. Steady State>
First, changes of individual signals in a case where the DC component of the coil current IL corresponding to the output current Iout is maintained at a predetermined value (a steady state) will be described. Hereinafter, the transistor control graph 11, the slope compensation graph 11, and the complex voltage graph of FIG. 14 relative to the steady state will be described.

The transistor control graph 11 (hereinafter, referred to as "graph 11") represents the state of the transistor 101A in a case where the resistance value of the load 3A is constant and thus the current value of the coil current IL is constant. In the graph 11, in a period from a time t1 until a time t15, the ON-Duty and OFF-Duty ratios of the transistor 101A are maintained, for example, at about 70% and about 30%, respectively.

The slope compensation graph 11 represents the waveform of a slope current SL10 which is output from the slope compensation circuit 72A. The current value of the slope current SL10 increases and then decreases with time. If the transistor 101A is turned on, the current value of the slope current SL10 is increased at a constant slope from 0 A, and in response to the output of the comparator 103A, that is, at a timing when the transistor 101A is turned off, the current value of the slope current SL10 is reset.

Specifically, in a period from the time t1 until a time t1c, the current value of the slope current SL10 increases from 0 A to a current value I34. Thereafter, the current value decreases to 0 A. In a period from the time t1c until a time t3, the current value is maintained at 0 A. Thereafter, in a period from the time t3 until a time t3c, the current value increases from 0 A to the current value I34. Thereafter, the slope current SL10 repeatedly and periodically increases and decreases.

A complex voltage Vad10 of the complex voltage graph is a voltage including the derived voltage VL and a slope voltage SV10. The derived voltage VL is a voltage which is derived on the basis of the coil current IL. The slope voltage SV10 is a voltage which is derived on the basis of the slope current SL10. The complex voltage Vad10 becomes a voltage value V11 at the time t1. Also, the reference voltage Vref becomes a voltage value V2, and is maintained at the same voltage value even after the time t1.

Further, if the transistor 101A is turned on at the time t1, the voltage value of the complex voltage Vad10 increases in the period from the time t1 until the time t1c. At the time t1c, the complex voltage Vad10 becomes the same voltage value as the reference voltage Vref. The reason why the voltage value of the complex voltage Vad10 increases as described above is that the current value of the slope current SL10 increases. That is, since the slope voltage SV10 corresponding to the slope current SL10 is included in the complex voltage Vad10, the rising slope of the complex voltage Vad10 becomes steeper than that before the slope voltage SV10 has been added. That is, the voltage rising rate of the complex voltage Vad10 becomes larger than that before the slope voltage SV10 has been added. Further, in a case where the complex voltage Vad10 and the reference voltage Vref become the same voltage value, the transistor 101A is turned off. If the transistor 101A is turned off, the current value of the slope current SL10 becomes 0 A. Therefore, the voltage value of the slope voltage SV10 to be included in the complex voltage Vad10 also becomes 0 V. As a result, the voltage value of the complex voltage Vad10 decreases from the voltage value V2 to a voltage value V11a.

Thereafter, in a period from the time t3c until a timer t5, since the transistor 101A is off, the voltage value of the complex voltage Vad10 decreases from the voltage value V11a to the voltage value V11. In a period from the time t5 until a time t5c, the voltage value of the complex voltage Vad10 increases. At the time t5c, the complex voltage Vad10 becomes the same voltage value as the reference voltage Vref. Since the regulator 1fA controls ON/OFF of the transistor 101A in response to periodic change of the complex voltage Vad10 as described above, it is possible to stabilize the output voltage Vout, and it is possible to reduce the voltage difference between the output voltage Vout and the target voltage Vtar.

<8-2-2. Case where Current Increases>

Subsequently, changes of individual signals in a case where the DC component of the coil current IL corresponding to the output current Iout increases will be described. Hereinafter, the transistor control graph 12, the slope compensation graph 12, and the complex voltage graph of FIG. 14 relative to a case where the DC component of the coil current IL increases will be described.

The transistor control graph 12 (hereinafter, referred to as "graph 12") represents the state of the transistor 101A in a case where the DC component of the coil current IL increases as the resistance value of the load 3A decreases. In the graph 12, for example, in a period from the time t1 until the time t3, the ON-Duty and OFF-Duty ratios of the transistor 101A become about 50% and about 50%, respectively. These changes in the duty ratios are caused by increasing of the DC component of the coil current IL at the time t1. That is, since the voltage value of a complex voltage Vad12 (to be described below) increases as the DC component of the coil current IL increases, the ON period of the transistor 101A becomes shorter than that before the increasing of the voltage value. Thereafter, in a period from the time t3 until the time t5, the ON-Duty and OFF-Duty ratios of the transistor 101A become about 80% and about 20%, respectively. After the time t5, the ON-Duty and OFF-Duty ratios of the transistor 101A become about 70% and about 30%, respectively. That is, the ON-Duty and OFF-Duty ratios of the transistor 101A become the same ratios as those before the increasing of the current value of the coil, current IL.

In the slope compensation graph 12, the current value of a slope current SL12 increases and then decreases with time. That is, if the transistor 101A is turned on, the current value of the slope current SL12 is increased at a constant slope from 0 A, and in response to the output of the comparator 103A, that is, at a timing when the transistor 101A is turned off, the current value of the slope current SL12 is reset.

In a period from the time t1 until a time t1b, the current value of the slope current SL12 increases from 0 A to a current value I33. Then, the current value decreases to 0 A.

Here, the period from the time t1 until the time t1b is a period shorter than the period from the time t1 until the time t1c. Also, the current value I33 is a current value smaller than the current value I34. The reason why the current value decreases in a relatively shorter time as described above is that the ON period of the transistor 101A is shorter. Thereafter, in a period from the time t3 until a time t3d, the current value increases from 0 A to a current value I35. Then, the current value decreases to 0 A. In a period from the time t3d until a time t5, the current value is maintained at 0 A. Thereafter, in a period from the time t5 until a time t5c, the current value increases from 0 A to the current value I34. Then, the current value decreases to 0 A. In a period from the time t5c until a time t7, the current value is maintained at 0 A. Thereafter, in a period from the time t7 until a time t7c, the current value increases from 0 A to the current value I34. Thereafter, the slope current SL12 repeatedly and periodically increases and decreases in sync with the ON/OFF timings of the transistor 101A.

The complex voltage Vad12 is a voltage including a slope voltage SV12. The slope voltage SV12 is a voltage which is derived on the basis of the slope current SL12. Since the slope voltage SV12 is added, the rising slope of the complex voltage Vad12 becomes steeper than that before the adding of the slope voltage SV12. That is, since the slope voltage SV12 is added, the rising rate of the voltage value of the complex voltage Vad12 becomes larger than that before the adding of the slope voltage SV12. Due to increasing of the DC component of the coil current IL, at the time t1, the complex voltage Vad12 becomes the voltage value V11a, Also, the reference voltage Vref has the voltage value V2, and is maintained at the same voltage value even after the time t1.

Due to increasing of the DC component of the coil current IL, at the time t1, the voltage value of the complex voltage Vad12 increases from the voltage value V11 to the voltage value V11a. Further, at the time t1, the transistor 101A is turned on. In the period from the time t1 until the time t1b, the voltage value of the complex voltage Vad12 increases. At the time t1b, the complex voltage Vad12 becomes the same voltage value as the reference voltage Vref. The reason why the voltage value of the complex voltage Vad12 increases as described above is that the current value of the slope current SL12 corresponding to the slope voltage SV12 which is included in the complex voltage Vad increases. In a case where the complex voltage Vad12 and the reference voltage Vref become the same voltage value, the transistor 101A is turned off.

Here, the period (from the time t1 to the time t1b) when the voltage value of the complex voltage Vad12 increases is a period shorter than the period (from the time t1 to the time t1c) when the voltage value of the complex voltage Vad10 increases. Therefore, the ON period of the transistor 101A at the complex voltage Vad12 becomes shorter than the ON period of the transistor 101A at the complex voltage Vad10. However, thereafter, the periods when the voltage value of the complex voltage Vad12 increases become substantially the same as the periods when the complex voltage Vad10 increases. That is, the ON periods of the transistor 101A at the complex voltage Vad12 become substantially the same as the ON periods of the transistor 101A at the complex voltage Vad10.

Specifically, at the time t1b, if the transistor 101A is turned off, the current value of the slope current SL12 becomes 0 A. Therefore, the voltage value of the slope voltage SV12 to be included in the complex voltage Vad12 becomes 0 V. As a result, the voltage value of the complex voltage Vad12 decreases from the voltage value V2. Thereafter, in the period from the time t1b until the time t3, since the transistor 101A is off, the complex voltage Vad12 decreases to a value lower than the range between the voltage value V2 and the voltage value V11. The voltage value of the complex voltage Vad12 increases in the period from the time t3 until the time t3d, and becomes the same as the reference voltage Vref at the time t3d. As a result, the output voltage Vout becomes substantially the same voltage value as the target voltage Vtar.

In a case where the complex voltage Vad12 and the reference voltage Vref become the same voltage value, the transistor 101A is turned off. If the transistor 101A is turned off as described above, the current value of the slope current SL12 becomes 0 A. Therefore, the voltage value of the slope voltage SV12 to be included in the complex voltage Vad12 also becomes 0 V. As a result, the voltage value of the complex voltage Vad12 decreases from the voltage value V2 to about the voltage value V11a. Thereafter, in the period from the time t3d until the time t5, since the transistor 101A is off, the voltage value of the complex voltage Vad12 decreases from about the voltage value V11a to the voltage value V11. Thereafter, the voltage value of the complex voltage Vad12 increases in the period from the time t5 until the time t5c, and becomes the same as the reference voltage Vref at the time t5c.

As described above, the regulator 1fA includes the slope compensation circuit 72A, for supplying a slope current, thereby stabilizing the ON/OFF timings of the transistor 101A even if the DC component of the coil current IL increases. That is, the regulator 1fA can prevent sub-harmonic oscillation. As a result, the voltage value of the output voltage Vout is stabilized, and the voltage difference between the output voltage Vout and the target voltage Vtar decreases.

In the regulator 1fA including the slope compensation circuit 72A as described above, in a case where the input voltage Vin decreases with decreasing of the voltage of the battery 2A, the voltage difference between the output voltage Vout and the target voltage Vtar increases. The reason is as follows. If the voltage value of the input voltage Vin decreases, the ON period of the transistor 101A becomes longer than that before the decreasing of the voltage value of the input voltage Vin. Since the ON period of the transistor 101A becomes longer, the slope current rises at a constant slope, and thus the current value becomes larger than that of the changing of the ON period. As a result, the voltage value of the complex voltage Vad decreases, and the voltage value of the output voltage Vout decreases.

Figure 15:
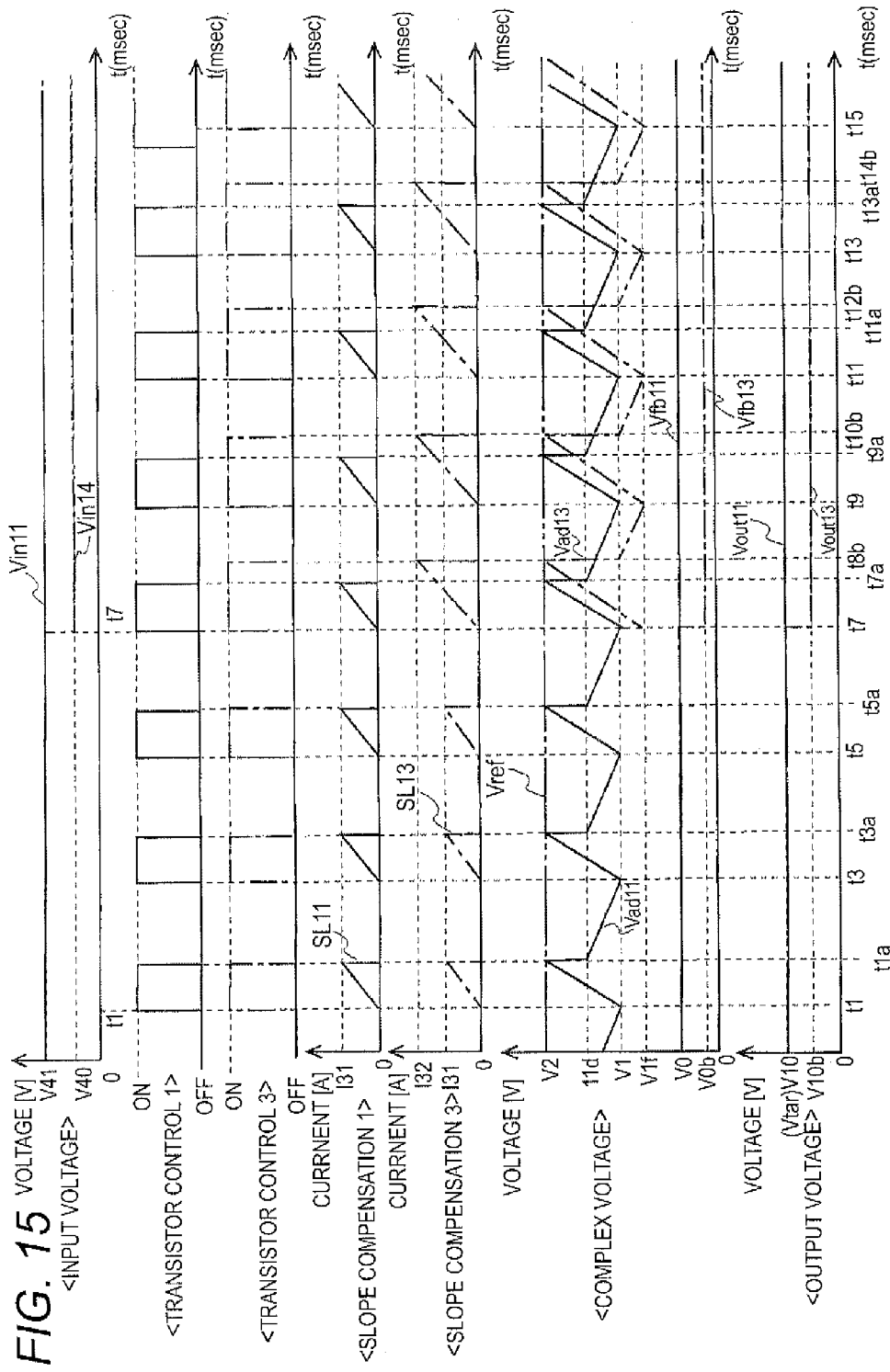
FIG. 15 is a view for explaining expansion of the voltage difference between an output voltage and a target voltage according to a decrease in the voltage value of an input voltage.

FIG. 15 is a view for explaining expansion of the voltage difference between the output voltage Vout and the target voltage Vtar according to decreasing of the voltage value of the input voltage Vin. FIG. 15 is a view illustrating an input voltage graph, a transistor control graph 1, a transistor control graph 3, a slope compensation graph 1, a slope compensation graph 3, a complex voltage graph, and an output voltage graph.

<8-2-3. Steady State>

First, changes of individual signals in a case where the voltage value of the input voltage Vin is constant (a steady state) will be described. Hereinafter, the input voltage graph, the transistor control graph 1, the slope compensation graph 1, the complex voltage graph, and the output voltage graph of FIG. 15 relative to the steady state will be described.

The input voltage graph is a graph representing the waveform of the input voltage Vin which is input from the battery 2A through the input terminal TaA. In a period from a time t1 until a time t15, the voltage value of an input voltage Vin11 is constant (for example, a voltage value V41).

In the transistor control graph 1, in the period from the time t1 until the time t15, the ON-Duty and the OFF-Duty ratios are maintained constant. The graph 1 is different from the graph 11 shown in FIG. 14, and for example, the ON-Duty and the OFF-Duty ratios are maintained at 30% and 70%, respectively.

In the slope compensation graph 1, in the period from the time t1 until the time t15, in response to ON/OFF of the transistor 101A, periodically and repeatedly, the current value of a slope current SL11 increases at a predetermined slope, and then decreases. Further, as shown by the complex voltage graph, in the period from the time t1 until the time t15, the voltage value of a complex voltage Vad11 including the slope current SL11 derived on the basis of the slope current SL11 periodically changes in sync with the ON/OFF timings of the transistor 101A. As a result, in the output voltage graph, an output voltage Vout11 becomes substantially the same voltage value as the voltage value V10 of the target voltage Vtar. Also, in the period from the time t1 until the time t15, the feedback voltage Vfb11 which is obtained by feeding back the output voltage Vout11 is maintained substantially constant at a voltage value V0.

<8-2-4. Case where Input Voltage Vin Decreases>

Subsequently, changes of individual signals in a case where the voltage value of the input voltage Vin decreases will be described. In the input voltage graph, the voltage value of an input voltage Vin14 is maintained constant at the voltage value V41 in a period from the time t1 until a time t7, and then decreases from the voltage value V41 to a voltage value V40 at the time t7. Thereafter, in a period from the time t7 until the time t15, the input voltage Vin14 is maintained at the voltage value V40.

In the transistor control graph 3 (hereinafter, referred to as "graph 3"), in the period from the time t1 until the time t7 when the voltage value of the input voltage Vin14 is the voltage value V41, the ON-Duty and the OFF-Duty ratios become the same ratios (30% and 70%) as those in the graph 1. Then, the voltage value of the input voltage Vin14 decreases from the voltage value V41 to the voltage value V40 at the time t7, and thereafter is maintained at the voltage value V40. Due to the decreasing of the voltage value of the input voltage Vin14, the ON-Duty ratio of the graph 3 becomes larger than the ON-Duty ratio of the graph 1. In the graph 3, for example, the ON-Duty ratio becomes 60% and the OFF-Duty ratio becomes 40%. Thereafter, since the input voltage Vin14 is maintained at the decreased voltage value in the period from the time t7 until the time t15, in the graph 3, the ON-Duty ratio is maintained at the increased ratio.

In the slope compensation graph 3, the current value of a slope current SL13 changes at a predetermined slope according to the ON/OFF duty ratios of the transistor 101A. Specifically, in the period from the time t1 until the time t7, on the basis of the ON/OFF duty ratios of the graph 3, repeatedly, the current value of the slope current SL13 increases from 0 A to a current value I31 at a predetermined slope and decreases from the current value I31 to 0 A. After the time t7, the ON-Duty ratio of the graph 3 increases. As a result, the current value of the slope current SL13 becomes larger than that before the increasing of the ON-Duty ratio. Thereafter, the current value of the slope current SL13 decreases. For example, in a period from the time t7 until the time t8b, the slope current SL13 increases from 0 A to a current value I32. The current value I32 is larger than the current value I31. Thereafter, the slope current SL13 decreases from the current value I32 to 0 A at a time t8b, and is maintained at 0 A in a period from the time t8b until the time t9. Also, at the time t9, the current value of the slope current SL13 increases from 0 A. Thereafter, periodically and repeatedly, the slope current SL13 increases and decreases.

In the complex voltage graph, a complex voltage Vad13 is a voltage including a slope voltage SV13. In the period from the time t1 until the time t7, the complex voltage Vad13 periodically and repeatedly changes similarly to the complex voltage Vad11. At the time t7, in response to the decreasing of the voltage value of the input voltage Vin14, the voltage value of the complex voltage Vad13 decreases from a voltage value V1 to a voltage value V1 f. Thereafter, in the period from the time t7 until the time t8b when the transistor 101A is on, the voltage value of the complex voltage Vad13 increases from the voltage value V1f to a voltage value V2.

Due to the decreasing of the complex voltage Vad13 at the time t7, an output voltage Vout13 decreases from the voltage value V10 to a voltage value V10b. Also, in response to the decreasing of the voltage value of the output voltage Vout13, a feedback voltage Vfb13 decreases from the voltage value V0 to a voltage value V0b.

Also, at the time t8b, the above described complex voltage Vad13 decreases from the voltage value V2 to the voltage value V1. Thereafter, in a period from the time t8b until a time t9, the complex voltage Vad13 decreases from the voltage value V1 to the voltage value V1 f. Then, at the time t9, the complex voltage Vad13 increases from the voltage value V1f.

Thereafter, the complex voltage Vad13 periodically and repeatedly increases and decreases. In a period from the time t8b until the time t15, the output voltage Vout13 is maintained substantially constant at the voltage value V10b. That is, the output voltage Vout13 is maintained at a voltage value smaller than the target voltage Vtar. Also, in the period from the time t8b until the time t15, the feedback voltage Vfb13 is maintained substantially constant at the voltage value V0b. That is, the feedback voltage Vfb13 is maintained at the decreased voltage value, similarly to the output voltage Vout13. As described above, the voltage difference between the output voltage Vout13 and the target voltage Vtar becomes relatively large. For this reason, the slope compensation circuit 72A and the line correcting circuit 71A are provided inside the circuit of the regulator 1fA of FIG. 13, whereby the voltage difference between the output voltage Vout and the target voltage Vtar is reduced.

Figure 16:
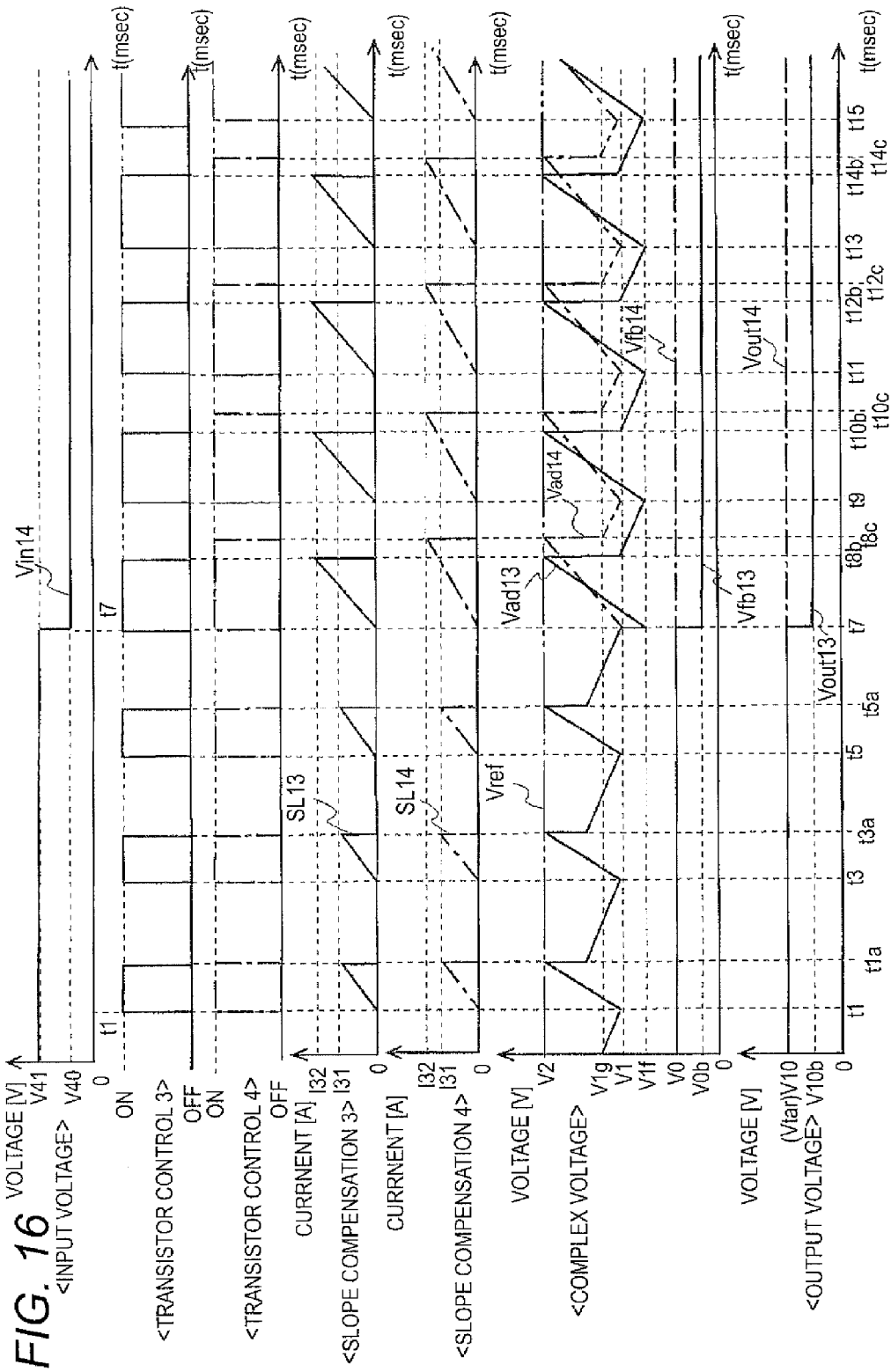
FIG. 16 is a view illustrating temporal changes of individual signals in a case where a regulator includes a line correcting circuit and a slope compensation circuit.

FIG. 16 is a view illustrating temporal changes of individual signals of the regulator 1fA obtained by providing the line correcting circuit 71A and the slope compensation circuit 72A in the regulator 1A. Specifically, FIG. 16 newly include a transistor control graph 4 and a slope compensation graph 4, in place of the transistor control graph 1 and the slope compensation graph 1 of FIG. 15.

In an input voltage graph, the voltage value of the input voltage Vin14 is maintained constant at the voltage value V41 in the period from the time t1 until the time t7, and decreases from the voltage value V41 to the voltage value V40 at the time t7. Thereafter, in the period from the time t7 until the time t15, the input voltage Vin14 is maintained at the decreased voltage value.

In the transistor control graph 4 (hereinafter, referred to as "graph 4"), in the period from the time t1 until the time t7, the ON/OFF duty ratios become the same as those of the graph 3. Then, at the time t7, the voltage value of the input voltage Vin14 decreases from the voltage value V41 to the voltage value V40. Due to this decreasing of the voltage value of the input voltage Vin14, the ON-Duty ratio of the graph 4 becomes larger than the ON-Duty ratio f the graph 3. In the graph 4, for example, the ON-Duty ratio is maintained at 80%, and the OFF-Duty ratio is maintained at 20%. Thereafter, since the input voltage Vin14 is maintained at the decreased voltage value in the period from the time t7 until the time t15, in the graph 3, the ON-Duty ratio is maintained at the increased ratio.

In the slope compensation graph 4, in the period from the time t1 until the time t7, on the basis of the ON/OFF duty ratios of the graph 4, repeatedly, a slope current SL14 increases from 0 A to the current value I31 at a slope based on the correction signal from the line correcting circuit 71A, and decreases from the current value I31 to 0 A. After the time t7, the ON-Duty ratio of the graph 4 increases. Therefore, the current value of the slope current SL14 becomes a current value larger than that before the increasing of the ON-Duty ratio. Also, at the time t7, the voltage value of the input voltage Vin14 decreases. In response to the decreased voltage value of the input voltage Vin14, the line correcting circuit 71A outputs the correction signal. The slope compensation circuit 72A sets a rising slope on the basis of the correction signal. In other words, the slope compensation circuit 72A changes the rising rate of the current value. Specifically, the slope compensation circuit 72A reduces the rising rate of the current value of the slope current SL14, on the basis of the correction signal from the line correcting circuit 71A attributable to the decreasing of the voltage value of the input voltage Vin14. In the period from the time t7 until the time t8, the slope current SL14 increases from 0 A to the current value I32. Then, the slope current SL14 decreases from the current value I32 to 0 A. Thereafter, repeatedly, the slope current SL14 increases and decreases.

The slope of the slope current SL14 is set by the correction signal input from the line correcting circuit 71A to the slope compensation circuit 72A after the time t7, and periodically and repeatedly increases and decreases on the basis of the ON/OFF duty ratios of the transistor 101A. In a period from the time t7 until the time t8c, the slope current SL14 increases from 0 A to the current value I32. Then, the slope current SL14 decreases from the current value I32 to 0 A at the time t8c, and is maintained at 0 A in the period from the time t8c until the time t9. Also, at the time t9, the slope current SL14 increases from 0 A. Thereafter, periodically and repeatedly, the slope current SL14 increases and decreases in sync with the ON/OFF timings of the transistor 101A.

In the complex voltage graph, a complex voltage Vad14 is a voltage including a slope voltage SV14. In the period from the time t1 until the time t7, the complex voltage Vad14 periodically and repeatedly changes similarly to the complex voltage Vad13. In this case, at the time t7, with the decreasing of the voltage value of the input voltage Vin14, the voltage value of the complex voltage Vad13 decreases from the voltage value V1 to the voltage value V1f. In contrast to this, the voltage value of the complex voltage Vad14 rarely decreases even if the voltage value of the input voltage Vin14 decreases at the time t7. The reason is that in response to decreasing of the voltage value of the input voltage Vin14, the slope of the slope current SL14 becomes relatively small.

Further, in the period from the time t7 until the time t8c when the transistor 101A is on, the voltage value of the complex voltage Vad14 increases from the voltage value V1f to the voltage value V2. The time t8c is a time later than the time t8b. This time comparison represents that provision of the line correcting circuit 71A causes the ON period of the transistor 101A to lengthen.

Since the complex voltage Vad14 does not decrease at the time t7, an output voltage Vout14 becomes substantially the same voltage value (the voltage value V10) as the voltage value before the time t7. Also, since the voltage value of the output voltage Vout14 does not decrease, a feedback voltage Vfb14 becomes substantially the same voltage value (the voltage value V0) as the voltage value before the time t7. Further, in the period from the time t7 until the time t8c, due to increasing of the voltage value of the complex voltage Vad14, the output voltage Vout14 is maintained substantially constant at the same voltage value (the voltage value V10) as the target voltage Vtar. The complex voltage Vad14 decreases from the voltage value V2 to a voltage value V1g at the time t8b, and decreases from the voltage value V1g to the voltage value V1 in a period from the time t8c until the time t9. Then, at the time t9, the complex voltage Vad14 increases from the voltage value V1. Thereafter, the complex voltage Vad14 periodically and repeatedly increases and decreases.

Also, the complex voltage Vad14 is a voltage including the derived voltage VL, the slope voltage. SV14, and the feedback voltage Vfb. If the input voltage Vin decreases, the rising slope of the coil current IL corresponding, to the derived voltage VL decreases. That is, the rising rate of the current value of the coil current IL decreases. For this reason, if the slope of the coil current IL changes due to change of the input voltage Vin, the line correcting circuit 71A outputs a correction signal such that the rising rate of the voltage value of the complex voltage Vad14 becomes an optimal value.

Further, with changing of the complex voltage Vad14 in the period from the time t8c until the time t15, the output voltage Vout becomes substantially the same voltage as the voltage value V10 of the target voltage Vtar. Also, the feedback voltage Vfb14 becomes substantially the same voltage as the voltage value V0. As described above, the regulator 1fA including the line correcting circuit 71A and the slope compensation circuit 72A inside the circuit can stabilize the output of the output voltage Vout, regardless of change of the voltage value of the input voltage Vin, and can reduce the voltage difference between the output voltage Vout and the target voltage Vtar.

<Modifications>

Although the first to seventh embodiments of the present invention have been described above, the present invention is not limited to the first to seventh embodiments described above, and can be modified into a variety of forms. Hereinafter, these modifications will be described. Also, all forms including forms having been described in the first to seventh embodiments and forms to be described below can be appropriately combined.

In the first to seventh embodiments, configurations including the sense resistor 22A and the sense amplifier 24A for deriving the current value of the coil current IL have been described. Besides the configurations described in the first to seventh embodiments, any other continuations capable of deriving the current value of the coil current IL can be used. For example, since the coil current IL is a current corresponding to the input voltage Vin, the sense resistor 22A and the sense amplifier 24A may be provided between the input terminal TaA and the drain of the transistor 101A so as to derive the current value.

Also, in the first to seventh embodiments, configurations in which a voltage including the output voltage Vout having been fed back is divided by the first resistor 25A and the second resistor 26A, whereby the feedback voltage Vfb is derived, and the feedback voltage Vfb is input to the adder circuit 30A have been described. In contrast to this, the first resistor and the second resistor may not be provided, and the voltage including the output voltage Vout may be input directly to the adder circuit 30A.

Also, in the first to seventh embodiments, configurations in which conversion of a voltage such as the feedback voltage Vfb into a current is performed inside the adder circuit 30A have been described. In contrast to this, a circuit for converting a voltage into a current may be provided outside the adder circuit 30A and be used to perform conversion of a voltage such as the feedback voltage Vfb into a current.

Also, in the first to seventh embodiments, the configurations of the switching regulators have been described as examples; however, the switching regulators may include elements other than those described in the embodiments.

Also, in the first to seventh embodiments, the configurations of the switching regulators have been described as examples; however, some internal elements of the switching regulators may be provided outside.

Also, in the first to seventh embodiments, the N-channel MOS transistor 101A has been described as an example of a switching element; however, the circuit configuration may be changed to include any other switching element (for example, a P-channel MOS transistor).

Hereinafter, eighth and ninth embodiments of the present invention will be described with reference to the accompanying drawings. The following embodiments are illustrative, and the technical scope of the present invention is not limited thereto.

9. First Premise Configuration

<9-1. Circuit Configuration>

Figure 17:
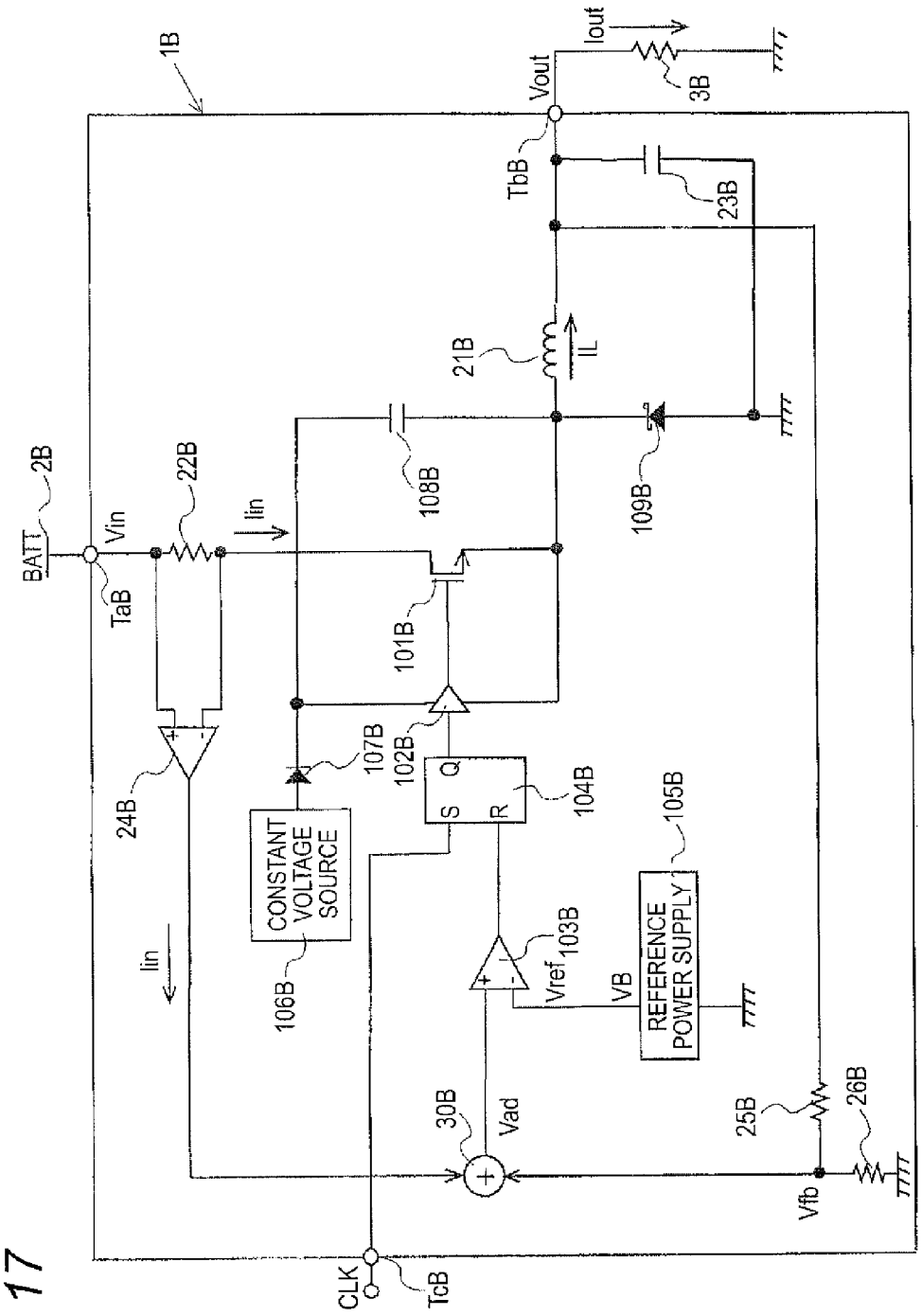
FIG. 17 is a view illustrating the circuit configuration of a regulator of a form of a first premise configuration.

FIG. 17 is a view illustrating the circuit configuration of a switching regulator 1B (hereinafter, referred to as "regulator 1B") of a first premise configuration. The regulator 1B regulates an output voltage Vout by switching control on a transistor 101B (to be described below) such that the output voltage Vout becomes a target voltage Vtar (for example, 5 V), and outputs an output current Iout to a load 3B. Also, one end of the load 3B is connected to a ground.

The load 3B is, for example, a micro computer of an electro control unit (ECU). The ECU is, for example, an engine control ECU for controlling driving of an engine, and the regulator 1B can be used for supplying necessary electric power to the micro computer of the ECU. Therefore, the regulator 1B can be used as a power supply not only for an engine control ECU but also for a variety of other electronic devices such as a navigation device and an audio device including a control unit for receiving the voltage of the regulator 1B so as to operate.

In the regulator 1B, a clock signal having a predetermined period is input to a flip-flop 104B through a clock input terminal TcB. The flip-flop 104E is for controlling driving of the transistor 101B, and has a set (S) terminal, a reset (R) terminal, and an output (Q) terminal. The flip-flop 104B is set if the clock signal is received by the set (S) terminal, and outputs an "H" signal from the output (Q) terminal to a driver 102B.

Also, if a signal from a comparator 103B (to be described below) is received by the reset (R) terminal, the flip-flop 104B outputs an "L" signal from the output (Q) terminal to the driver 102B.

On the basis of a signal from the output (Q) terminal of the flip-flop 104B, the driver 102B controls ON/OFF of the transistor 101B. In a case where the signal from the output (Q) terminal is the "H" signal, the transistor 101B applies a predetermined voltage or more to the gate, thereby turning on the transistor 101B, and in a case where the signal from the output (Q) terminal is the "L" signal, the transistor 101B applies a voltage less than the predetermined voltage to the gate, or does not apply a voltage to the gate, thereby turning off the transistor 101B.

The transistor 101B is an N-channel MOS transistor which is subjected to switching control for adjusting the current amount of an input current Iin. The input current Iin is a current which flows on the basis of an input voltage Vin (for example, 14 V) applied from a battery 2B to an input terminal TaB. In a case where the predetermined voltage or more is applied from the driver 102B to the gate of the transistor 101B, the transistor 101B is turned on, and the input current Iin flows between the drain and source of the transistor 101B through a sense resistor 22B. In a case where a voltage less than the predetermined voltage is applied to the gate of the transistor 101B, or a voltage is not applied the gate of the transistor 101B, the transistor 101B is turned off, and the input current Iin does not flow between the drain and the source. That is, even in the sense resistor 22B, the input current Iin does not flow.

The sense resistor 22B is a resistor for detecting the current value of the input current Tin. The current value of the input current Iin flowing in the sense resistor 22B changes in response to switching control on the transistor 101B as described above. Detection on the input current Iin using the sense resistor 22B will be described.

Also, the transistor 101B is turned on the basis of the clock signal having the predetermined period as described above. Specifically, in a case where a rising edge of the clock signal is input to the set (S) terminal of the flip-flop 104B, the transistor 101B is turned on. In contrast to this, the transistor 101B is turned off in a case where an output signal from the comparator 103B is input to the reset (R) terminal of the flip-flop 104B. That is, the ON timings of the transistor 101B are predetermined timings, and the OFF timings change in response to the comparison results of the comparator 103B. An operation of the comparator 103E relative to OFF of the transistor 101B will be described below.

In a case where the transistor 101B is on, the input current Iin flowing between the drain and the source flows into a coil 21B.

The coil 21B reduces current change of the input current Iin attributable to switching control on the transistor 101B. In a case where the transistor 101B is on, the input current Iin flows in the coil 21B, and in a case where the transistor 101B is off, a current from a Schottky diode 109B flows in the coil 21B. That is, in the case where the transistor 101E is off, the potential of the cathode side of the Schottky diode 109B becomes lower than the potential of the anode side. As a result, even if the transistor 101B is switched from ON to OFF, a current flows into the coil 21B through the Schottky diode 109B. The current (hereinafter, referred to as "coil current IL") flowing in the coil 21B as described above does not become 0 A immediately if the transistor 101B is turned off, but the current value gradually decreases at a constant slope. Therefore, in a case where the transistor 101B is on, the input current Iin and the coil current IL become the same current value, and in a case where the transistor 101B is off, except for a case where both of the current values of them are 0 A, the current values of them become different current values.

The coil current IL which is output from the coil 21B flows into a capacitor 23B. If the coil current IL flows into the capacitor 23B, the voltage value of the output voltage Vout increases. Further, the capacitor 23B eliminates an AC component from the coil current IL. Therefore, an output current Iout which is the DC component of the coil current IL flows into the load 3B through an output terminal TbB. Also, one end of the capacitor 23B is connected to the anode of the above described Schottky diode 109B and the ground.

In response to increasing and decreasing of the output current Iout, the regulator 1B controls the transistor 101B such that the output voltage Vout becomes constant. As a result, the coil current IL changes. Also, it can be said that change of the coil current IL is change of the input current Iin. That is, change of the output voltage Vout corresponds to change of the input current Iin. The input current Iin which changes as described above is used in comparison with a reference voltage Vref by the comparator 103B (to be described below).

Further, if the output voltage Vout changes, a voltage difference between the output voltage Vout and the target voltage Vtar occurs. The output voltage Vout is applied to a voltage dividing circuit composed of a resistor 25B and a resistor 26B, by a feedback loop provided at the connection point of the coil 21B and the capacitor 23B. The resistor 25B and the resistor 26B are resistors for dividing the output voltage Vout. Also, one end of the resistor 26B is connected to the ground. The resistor 25B and the resistor 26B divide the output voltage Vout and output a feedback voltage Vfb to an adder circuit 30B. The adder circuit 30B receives not only the feedback voltage Vfb but also the input current Iin, as will be described below. Hereinafter, input of the input current Iin to the adder circuit 30B will be described.

If the input current Iin flows into the above described sense resistor 22B, and the voltage of the sense resistor 22B is input to the non-inverted input terminal and inverted input terminal of a sense amplifier 24B. The sense amplifier 24B detects the current value of the input current Iin, on the basis of a voltage difference between both ends of the sense resistor 22B, and the predetermined resistance value of the sense resistor 22B, and outputs the current value to the adder circuit 30B.

The sense amplifier 24B constitutes a current detecting circuit; however, in the present embodiment, the value of the input current is detected by the sense resistor 22B. Needless to say, the sense resistor 22B may be connected to the output side of the coil 21B so as to directly detect the coil current IL.

The adder circuit 30B adds a plurality of currents, thereby obtaining a complex current, and converts the complex current into a voltage, and outputs the voltage to the comparator 103B. The adder circuit 30B adds the input current Iin and a feedback current Ifb into which the feedback voltage Vfb has been converted, thereby obtaining a complex current Iad, and converts the complex current Tad into a complex voltage Vad, and outputs the complex voltage Vad to the comparator 103B. Therefore, it can be said that the complex voltage Vad includes the feedback voltage Vfb and a voltage VL (hereinafter, referred to as "derived voltage VL") into which the input current Iin has been converted.

The comparator 103B compares the voltage of the non-inverted input terminal and the voltage of the inverted input terminal, and outputs a signal according to the comparison result. In a case where the complex voltage Vad input to the non-inverted input terminal and a power supply voltage VB (for example, 1.25 V) (hereinafter, referred to as "reference power supply voltage VB") input from a reference power supply 105B to the inverted input terminal become the same voltage value, the comparator 103B outputs a reset signal to the reset (R) terminal of the flip-flop 104B. As a result, the voltage to be applied from the driver 102B to the gate of the transistor 101B becomes less than the predetermined voltage value, and thus the transistor 101B is switched from ON to OFF.

Also, as a configuration for the driver 102B to apply the predetermined voltage to the gate of the transistor 101A, a known boostrap circuit is provided by a constant voltage source 106B, a diode 107B, and a capacitor 108B. Due to this circuit configuration, switching control on the transistor 101B is stably performed.

The present embodiment has the above described configuration, and has two features. A first feature is that the present embodiment controls the output voltage Vout without including a differential amplifier and a phase compensation circuit for feedback unlike in the related art. To this end, the complex current Tad obtained by adding the derived voltage VL corresponding to the input current Iin to the feedback voltage Vfb for feedback is compared with the reference voltage Vref A second feature is that the present embodiment turns on the transistor 101B with the predetermined period based on the clock signal, and turns off the transistor 101B in response to the output of the comparator 103B.

<9-2. Changes of Signals>

Figure 18:
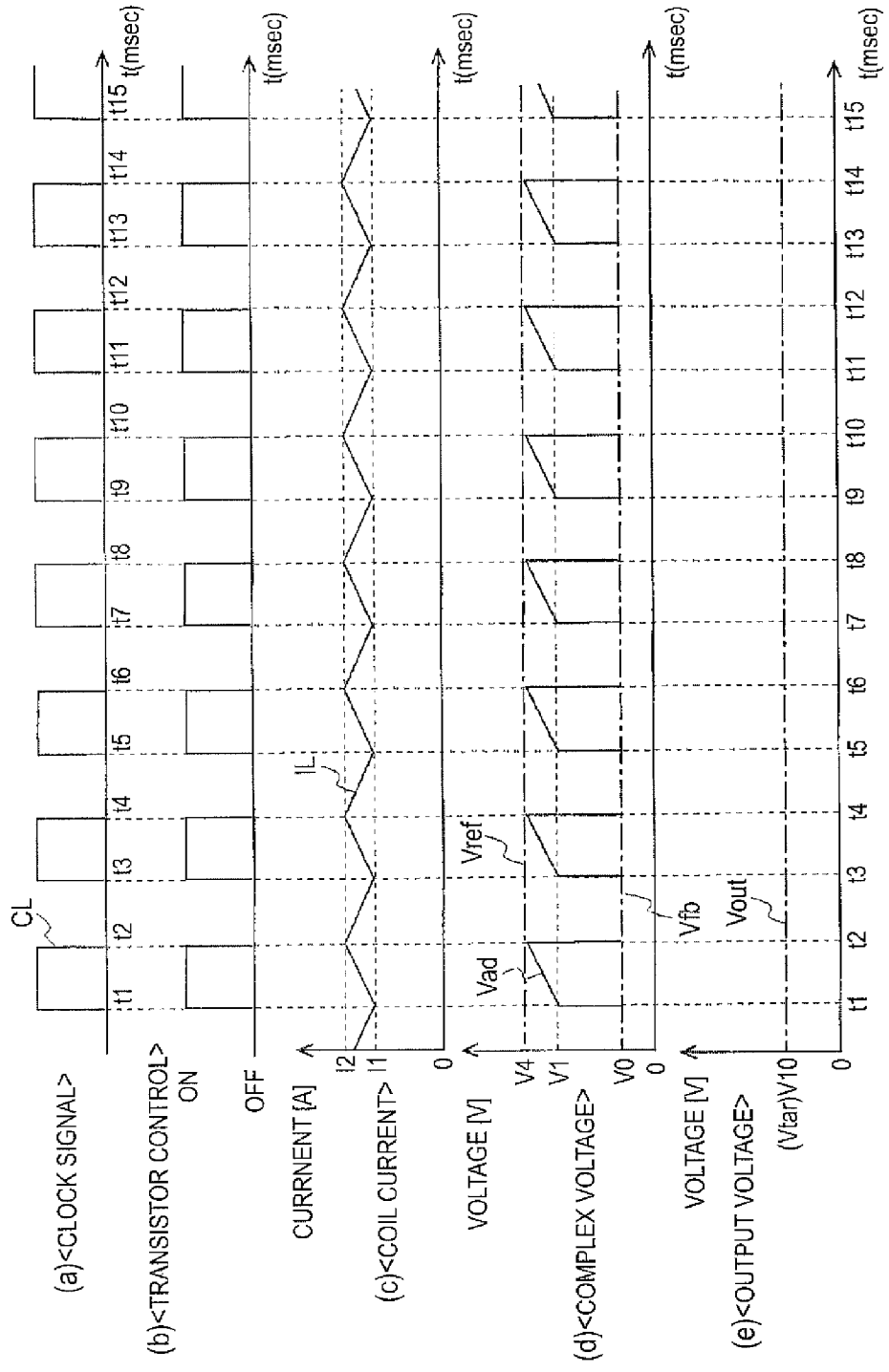
FIG. 18 is a view illustrating changes of individual signals relative to the regulator of the first premise configuration.

Subsequently, individual signals of the regulator 1B will be described. FIG. 18 shows graphs illustrating temporal changes of individual signals of the regulator 1B of the first premise configuration. The horizontal axis of each graph represents time [msec]. Hereinafter, the outline of each graph will be first described and then temporal changes of individual signals will be described.

A clock signal graph of (a) of FIG. 18 is a graph illustrating change of the clock signal CL which is input through the clock input terminal TaB. The clock signal CL repeats rising and falling at a fixed frequency. A transistor control graph of (b) of FIG. 18 is a graph illustrating the ON periods and OFF periods of the transistor 101B while illustrating the ON/OFF state of the transistor 101B. A coil current graph of (c) of FIG. 18 is a graph illustrating the current value [A] of the coil current IL flowing in the coil 21B at each time. A complex voltage graph of (d) of FIG. 18 is a graph illustrating the voltage value [V] of the complex voltage Vad which is input to the non-inverted input terminal of the comparator 103B at each time. An output voltage graph of (e) of FIG. 18 is a graph illustrating the voltage value [V] of the output voltage Vout at each time.

If the clock signal CL rises at a time t1 as shown in (a) of FIG. 18, the flip-flop 104B is set, and the transistor 101B is turned on as shown in (b) of FIG. 18. As a result, the input current Iin flows in the sense resistor 22B, and even in the coil 21B, the coil current IL flows and increases from a current value I1 as shown in (c) of FIG. 18. Also, since the input current Iin flows in the sense resistor 22B, the sense amplifier 24B detects the input current Iin and outputs the input current Iin to the adder circuit 30B. With increasing of the input current Iin, the complex voltage Vad which is obtained by adding the input current Iin and the feedback current Ifb of the feedback voltage Vfb in the adder circuit 30B increases from a voltage value V1 as shown in (d) of FIG. 18.

At a time t2, if the complex voltage Vad reaches a voltage value V4, a reset (R) signal is output from the output terminal of the comparator 103B, and in response to reception of the reset (R) signal, the flip-flop 104B is reset, and the transistor 101B is turned off as shown in (b) of FIG. 18. As a result, the current value of the input current Iie becomes 0 A, and the AC component and DC component of the derived voltage VL (the input current Iin) to be included in the complex voltage Vad become 0 (zero) as shown in (d) of FIG. 18, whereby the complex voltage Vad is composed only of the feedback voltage Vfb (the feedback current Ifb). As a result, the complex voltage Vad decreases to a voltage value V0. Also, as shown in (c) of FIG. 18, the coil current IL gradually decreases from a current value I2 at a timing when the transistor 101B is turned off due to the current flowing from the Schottky diode 109B to the coil 21B.

As shown in (b) of FIG. 18, a period from the time t1 when the transistor 101B is turned on until the time t2 when the transistor 101B is turned off is an ON period, and a period from the time t2 when the transistor 101B is turned off until a time t3 which is the next ON timing is an OFF period. As a result, for example, the ON-Duty of the transistor 101B becomes 50%. Further, according to the result of comparison of the complex voltage Vad and the reference voltage Vref by the comparator 103B for determining an OFF timing of the transistor 101B, the ON-Duty changes.

Due to this control on the transistor 101B, as shown in (e) of FIG. 18, in a period from the time t1 until the time t3, the output voltage Vout is maintained substantially at a voltage value V10 which is the same as the voltage value of the target voltage Vtar. Also, since the output voltage Vout is maintained substantially at the same voltage value as the target voltage Vtar, the feedback voltage Vfb is also maintained substantially constant at the voltage value V0. A mode for controlling the output voltage Vout on the basis of a current including at least a DC component (to be described below) as described above is referred to as a "current mode".

At the time t3, if the clock signal CL rises like at the above described time t1, the flip-flop 104B is set and the transistor 101B is turned on. Since the transistor 101B is turned on, the input current Iin flows in the sense resistor 22B, and even in the coil 21B, the coil current IL flows. Thereafter, each signal changes as described above.

<9-3. Bode Plot>

Figure 19:
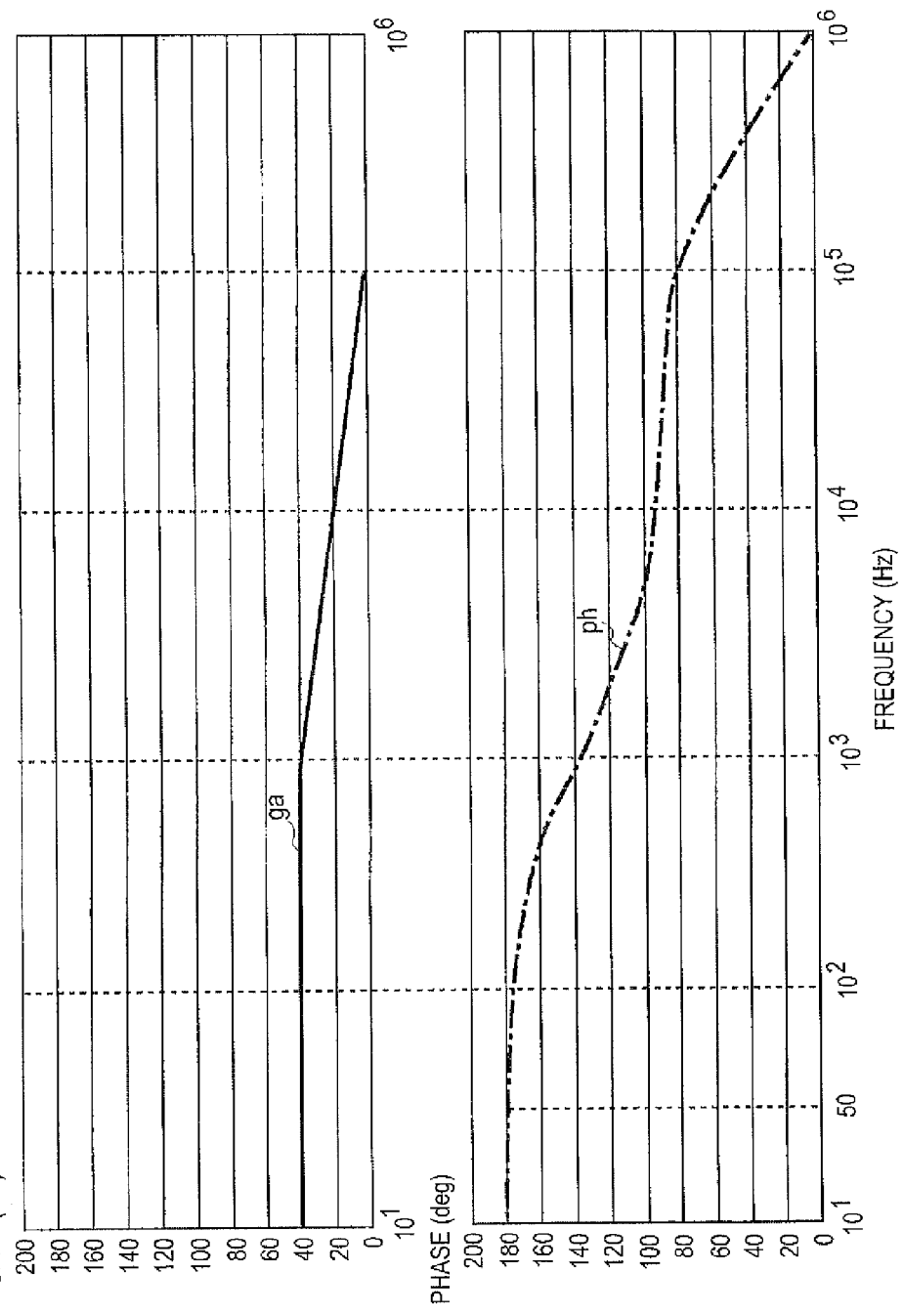
FIG. 19 is a Bode plot illustrating frequency characteristics in a current mode.

Subsequently, the effects of the present embodiment will be described with reference to a Bode plot. The regulator 1B of the present embodiment performs control by the current mode. At the upper portion of FIG. 19, a gain characteristic at each frequency in the current mode is shown by a gain characteristic curve ga. Also, at the lower portion of the FIG. 19, a phase characteristic is shown by a phase characteristic curve ph. Since control is performed in the current mode, the regulator 1B is not influenced by the inductance of the coil 21B, and thus only one pole based on the capacitor 23B appears. The frequency of the pole is, for example, about 1 kHz as shown by the gain characteristic curve ga. Therefore, the gain is maintained substantially constant (for example, at 40 dB) from 0 Hz to about 1 kHz, and decreases after about 1 kHz. This decreasing of the gain is caused by decreasing of the inductance of the capacitor 23B attributable to increasing of the frequency. Further, in the present embodiment, since a differential amplifier for feedback is not used, the gain becomes a relatively small value. Therefore, the gain relatively quickly decreases to 0 dB as the frequency increases. For example, at about 100 kHz, the gain becomes 0 dB.

Meanwhile, as shown by the phase characteristic curve ph, before and after the pole frequency, the phase exceeds 90 degrees. For example, the phase is almost constant at 180 degrees until about 50 Hz, and starts to be delayed after about 50 Hz, and is delayed by 90 degrees at about 10 kHz. Since the phase delay attributable to influence of the pole is only 90 degrees, at 100 kHz at which the gain becomes 0 dB, a phase margin can be set to a sufficient value of about 80 degrees. Therefore, it is possible to ensure a stable operation without oscillation of the output voltage Vout.

As described above, the regulator 1B of the present embodiment controls the gain and phase of an internal signal of the circuit by the current mode, without using a differential amplifier and a phase compensation circuit. Therefore, it is possible to oscillation of the output voltage Vout, and to obtain the output voltage Vout to be stably output. Therefore, the regulator 1B of the present embodiment can be easier designed as compared to a circuit of a voltage mode, and since it is unnecessary to provide a new component inside the circuit, it is possible to reduce the size of the entire circuit.

Also, since the regulator 1B of the present embodiment does not include a differential amplifier and a phase compensation circuit, delay of a response based on ON/OFF control on a MOS transistor with respect to change of an output voltage which is caused in a case where the capacity of an internal capacitor of a phase compensation circuit is comparatively large is solved.

Also, the regulator 1B of the present embodiment uses change of the current value of the input current Iin to control the transistor 101B. The regulator 1B compares the reference voltage Vref and the complex voltage Vad obtained by adding the input current Iin to the feedback current Ifb corresponding to the feedback voltage Vfb. As a result, the regulator 1B can control ON/OFF of the transistor 101B in response to change of the output voltage Vout, and can reduce the voltage difference between the output voltage Vout and the target voltage Vtar. Further, since the ON timings of the transistor 101B are controlled on the basis of the clock signal CL having the fixed frequency, and the switching frequency of the transistor 101B also becomes a fixed frequency. In a case where the switching frequency varies, in an in-vehicle device, noise becomes more likely to influence a radio or the like. In contrast to this, in the regulator 1B of the present embodiment, since the switching operation is performed at the fixed frequency, it becomes possible to set the reception frequency of the radio and the switching frequency to different frequencies. As a result, the regulator 1B can avoid superimposition of switching noise on the radio. Also, according to the regulator 1B, since it is possible to see the switching frequency in advance, other devices such as a radio can take a measure against noise, and is unlikely to be influenced by noise.

10. Second Premise Configuration

Subsequently, a second premise configuration will be described. In the regulator 1B of the first premise configuration, in a case where the current value of the output current Iout increases, there is a problem in which the voltage value of the output voltage Vout decreases with the increasing of the output current Iout. As a result, the voltage difference between the output voltage Vout and the target voltage Vtar increases, and stable power supply to the load 3B becomes difficult. For this reason, a regulator 1aB of the second premise configuration is configured to correct the reference voltage Vref in response to the input current Iie, thereby preventing the voltage value of the output voltage Vout from decreasing as the output current Iout increases.

<10-1. Relation Between Reference Voltage and Output Voltage>

First, the relation between increasing of the current value of the output current Iout and decreasing of the output voltage Vout will be described. FIG. 20 shows graphs illustrating changes of the reference voltage Vref and the output voltage Vout according to existence or non-existence of correction of the reference voltage Vref of the switching regulator 1aB (hereinafter, referred to as "regulator 1aB") of the second premise configuration. In the graphs of FIG. 20, each horizontal axis represents a current value [A], and each vertical axis represents a voltage value [V]. A graph of (a) of FIG. 20 is a graph illustrating the reference voltage Vref and change of the output voltage Vout of the regulator 1B which does not correct the reference voltage Vref. The output voltage Vout is shown by line Vout1a, and the reference voltage Vref is shown by a line Vref1a.

If the output current Iout increases from a current value Ia to a current value Ic as shown by the graph of (a) of FIG. 20, the voltage value of the output voltage Vout decreases a voltage value V14 to a voltage value V12 as shown by the line Vout1a. As a result, the voltage difference between the output voltage Vout and the target voltage Vtar increases, and stable power supply to the load 3B becomes difficult. Also, the voltage value of the reference voltage Vref is constant as shown by the line Vref1a. The reason why the output voltage Vout decreases with increasing of the output current Iout is as follows. Increasing of the output current Iout means increasing of the DC component of the input current Iin. That is, the DC component of the input current Iin corresponding to the output current Iout increases, and with the increasing of the DC component of the input current, the derived voltage VL corresponding to the input current Iin also increases. As a result, the complex voltage Vad increases.

The regulator 1aB performs feedback control on the output voltage Vout such that the complex voltage Vad and the reference voltage Vref coincide with each other. For example, it is assumed that the output current Iout increases by ΔI, and with the increasing of the output current Iout, the derived voltage VL increases by ΔV. Then, at the initial stage when the output current Iout increases, the complex voltage Vad increases by ΔV. Therefore, the difference between the complex voltage Vad and the reference voltage Vref when the transistor 101B is turned on becomes small, and the complex voltage Vad relatively quickly reaches the reference voltage Vref, whereby the ON-Duty of the transistor 101B decreases. Thereafter, the ON-Duty of the transistor 101A decreases to about 50% by feedback control. In this state, the voltage increase ΔV of the complex voltage Vad according to increasing of the input current Iin remains. As a result, the output voltage Vout is maintained in the state where the output voltage Vout has decreased by ΔV.

In the regulator 1aB of the present embodiment, in response to decreasing of the voltage value of the output voltage Vout as described above, the voltage value of the reference voltage Vref is corrected such that the voltage difference between the output voltage Vout and the target voltage Vtar becomes small.

The graph of (b) of FIG. 20 is a graph representing the reference voltage Vref and change of the output voltage Vout of the regulator 1aB which corrects the reference voltage Vref. The output voltage Vout is shown by a line Vout1b, and the reference voltage Vref is shown by a line Vref1b. In the graph of (a) of FIG. 20, the reference voltage Vref is maintained constant at a voltage value V30 as shown by the line Vref1a; however, in the graph of (b) of FIG. 20, the voltage value of the reference voltage Vref increases from the voltage value V30 as the current value of the output current Iout increases, as shown by the line Vref1b:

If the output current Iout changes to the current value Ia, as will be described below, the derived voltage VL is added to the reference power supply voltage VB, whereby the voltage value of the reference voltage Vref increases. As a result, the reference voltage Vref changes from the voltage value V30 to a larger voltage value V20 as shown by the line Vref1b. Further, if the output current Iout changes to a current value Ib larger than the current value Ia, the reference voltage Vref changes from the voltage value V20 to a larger voltage value V21 as shown by the line Vref1b. Furthermore, if the output current tout changes to a current value Ic larger than the current value Ib, the reference voltage Vref changes from the voltage value V21 to a larger voltage value V22 as shown by the line Vref1b. This change of the voltage value occurs in a case where the derived voltage VL is added to the reference power supply voltage VB as described above, whereby the voltage value of the reference voltage Vref increases.

As described above, since the voltage value of the reference voltage Vref increases as the current value of the output current tout increases, it is possible to compensate the increase of the current value of the output current Iout by the increase of the reference voltage Vref. As a result, the output voltage Vout becomes substantially the same voltage value as the voltage value V15 of the target voltage Vtar. As described above, the regulator 1aB can control the output voltage Vout such that the voltage value of the output voltage Vout is stable. Further, the regulator 1aB can reduce the voltage difference between the output voltage Vout and the target voltage Vtar.

<10-2. Configuration>

Subsequently, the configuration of the regulator 1aB of the second premise configuration will be described. The regulator 1aB has been obtained by changing the configuration of a portion of the regulator 1B of the first premise configuration. Hereinafter, the configuration change and changes of signals according to the configuration change will be mainly described with reference to FIGS. 21 and 22.

Figure 21:
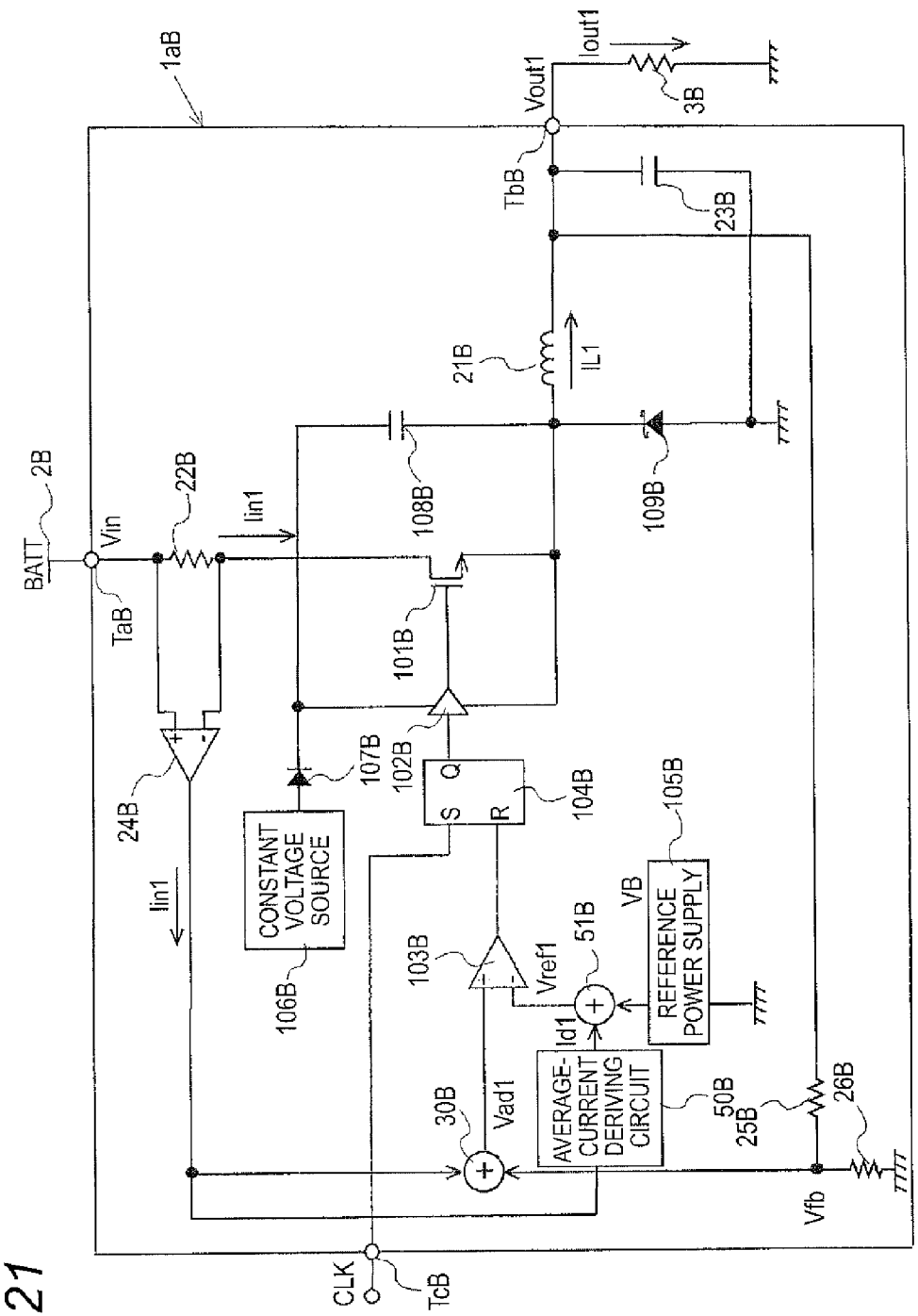
FIG. 21 is a view illustrating the circuit configuration of a regulator of a second premise configuration.

FIG. 21 is a view illustrating the circuit configuration of the regulator 1aB of the second premise configuration. The regulator 1aB has the same configuration as the configuration of the regulator 1B of the first premise configuration, except that the regulator 1aB includes an average-current deriving circuit 50B and a power adding circuit 51B as new components, in addition to the configuration of the regulator 1B of the first premise configuration. Also, in FIG. 21, a configuration in which an input current Iin1 is detected as a current corresponding to an output voltage Vout1 is shown; however, a coil current IL may be directly detected.

The average-current deriving circuit SOB of the FIG. 21 derives the average current Id1 of the maximum and minimum of the current value of the input current Iin in the ON period of the transistor 101B. It can be said that the average current Id1 is the average current of the maximum and minimum of the coil current IL. Also, it can be said that the average-current deriving circuit 50B is a DC-component deriving circuit for deriving the DC component of the input current Iin1.

The power adding circuit 51B applies a reference voltage Vref1 obtained by adding the average current Id1 and a current into which the reference power supply voltage VB has been converted, to the inverted input terminal of the comparator 103B. That is, the average-current deriving circuit 50B and the power adding circuit 51B constitute a reference voltage correcting circuit for correcting the reference voltage Vref1. Further, the comparator 103B compares the complex voltage Vad1 and the reference voltage Vref1. As described above, the regulator 1aB controls switching of the transistor 101B by the complex voltage Vad1 and the reference voltage Vref1, thereby capable of stabilizing an output voltage Vout1 even if the output current Iout increases, and controlling the voltage difference between the output voltage Vout1 and the target voltage Vtar such that the voltage difference becomes a small value.

<10-3. Changes of Signals>

Figure 22:
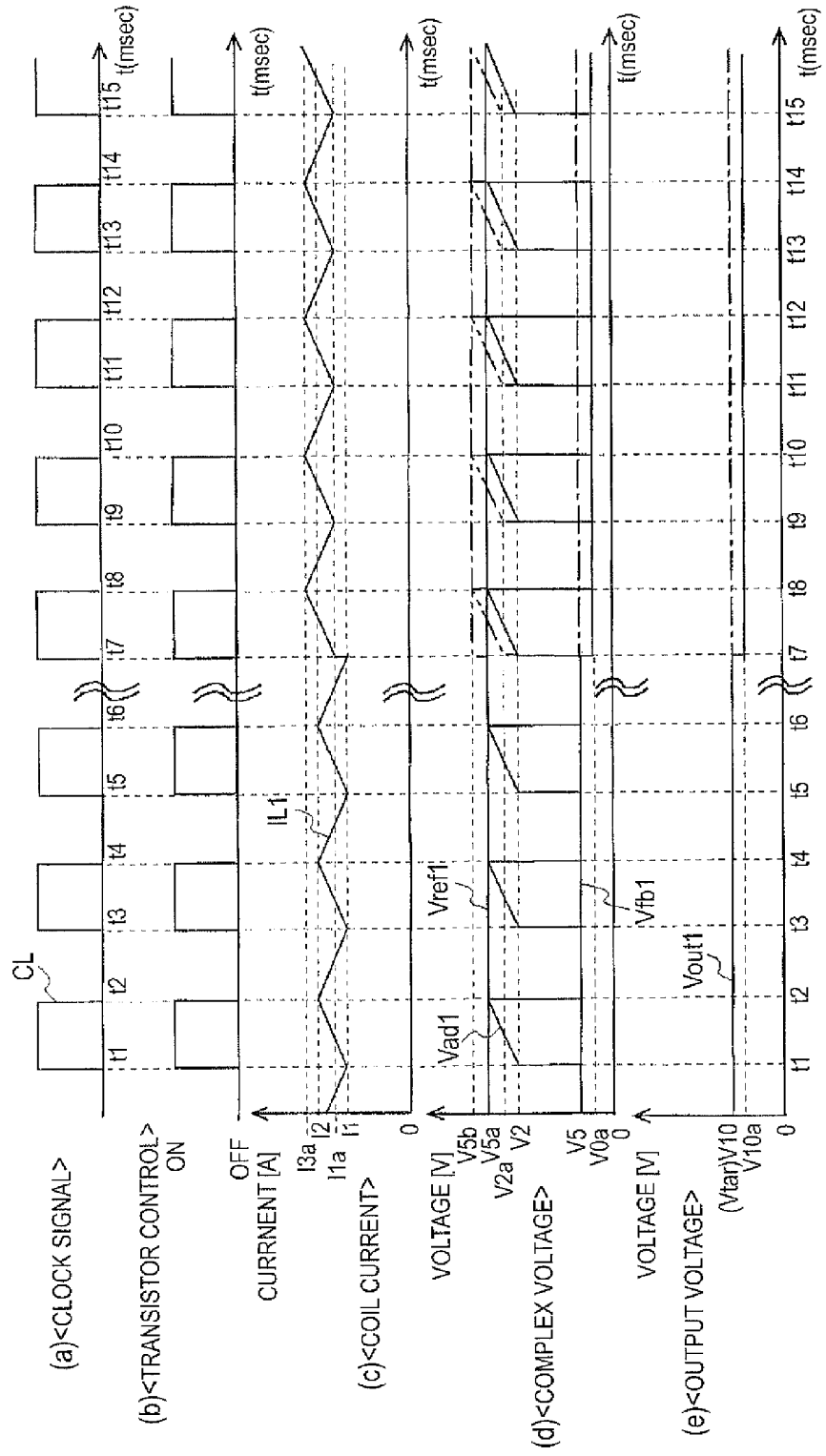
FIG. 22 is a view illustrating changes of individual signals relative to the regulator of the second premise configuration.

FIG. 22 is a view illustrating temporal changes of individual signals relative to the regulator 1aB of the second premise configuration. First, changes of individual signals in a case where it is assumed that the reference voltage Vref1 is not corrected in the regulator 1aB will be described. That is, a case where it is assumed that the reference power supply voltage VB is set to a voltage value V5a, and this voltage value is the voltage value of the reference voltage Vref1 will be described.

In a period from a time 0 until a time t6, each signal of the regulator 1aB repeats the same periodic change as that in the first premise configuration. Thereafter, the output current Iout1 increases in a period from the time t6 until a time t7, and thereafter is maintained at the increased current value. In this case, if the transistor 101B is turned on as shown in (b) of FIG. 22 at a rising edge of the clock signal CL shown in (a) of FIG. 22, the complex voltage Vad1 increases as shown in (d) of FIG. 22. Therefore, the ON period of the transistor 101B decreases. However, thereafter, due to feedback control, the ON periods of the transistor 101B gradually lengthen, and soon the ON-Duty becomes the same state as that before the increasing of the output voltage Vout1. As shown in FIG. 22, after the time t7, the state where the output current Iout1 has increased is maintained.

Change of each signal in the period from the time t6 until the time t7 will be described in more detail. As shown in (d) of FIG. 22, in the period from the time t6 until the time t7, the complex voltage Vad1 transiently changes. That is, after the time t6, since the current value of the input current Iin1 increases, the period when the voltage value of the complex voltage Vad1 increases becomes shorter than that before the time t6. The reason why the period when the voltage value of the complex voltage Vad1 increases shortens as described above is that a time for the voltage value of the complex voltage Vad1 to increase in response to the increase of the input current Iin1 and reach the voltage value of the reference voltage Vref shortens.

As a result, the ON period of the transistor 101B shortens, and the OFF period lengthens. Thereafter, due to feedback control, the ON periods of the transistor 101B gradually lengthen. Then, as shown in (d) of FIG. 22, the voltage value of the complex voltage Vad1 is stabilized after the time t7, and repeats periodic change in sync with the ON/OFF timings of the transistor 101B, like before the time t6. In other words, the ON-Duly of the control graph becomes the same value as the ON-Duty before the time t6.

Further, while the ON period of the transistor 101B shortens after the time t6 and returns to the original state, the output voltage Vout1 transiently decreases from a voltage value V10 at the time t6 to a voltage value V10a at the time t7, so as to absorb the increase of the input current Iin1. After the time t7, due to the ON-Duty and OFF-Duty ratios of the transistor 101B according to the stabilization of the voltage value of the complex voltage Vad1, the output voltage Vout1 having decreased is maintained at the voltage value V10a.

Also, the voltage value of the feedback voltage Vfb1 decreases to a voltage value V0a with transient decreasing of the voltage value of the output voltage Vout1 in the period from the time t6 until the time t7, and after the time t7, similarly to the output voltage Vout1, the feedback voltage Vfb1 having decreased is maintained at the voltage value V0a.

As described above, since the voltage according to the input current Iin1 is added to the feedback voltage Vfb1, and the complex voltage Vad1 is compared with the reference voltage Vref1, if the output current Iout increases, the output voltage Vout1 decreases to absorb the increase of the current value, and is stabilized in the decreased state. Further, in a case where the reference voltage Vref1 is constant, if the output current loud changes, since the output voltage Vout1 also changes, a voltage difference between the output voltage Vout1 and the target voltage Vtar may occur.

Subsequently, changes of signals in a case where if the output voltage Vout1 decreases due to increasing of the output current Iout1, the average current Id1 is added to the reference power supply voltage VB, whereby the reference voltage Vref1 increases will be described. The following description will be made on the assumption that the output voltage Vout1 increases at the time t7 unlike the above. Also, the following description will be made on the assumption that the reference power supply voltage VB is set to a voltage value V5, and in the period from the time 0 until the time t6, the average current Id1 is added to the reference power supply voltage VB, whereby the reference voltage Vref1 becomes the voltage value V5a.

The average current Id1 increases as the input current Iin1 corresponding to the output current Iout1 increases. At the time t7, if the input current Iin1 corresponding to the coil current IL increases as shown in (c) of FIG. 22 as the output current Iout1 increases, the average current Id1 also increases. As a result, the reference voltage Vref1 shown in (d) of FIG. 22 increases from the voltage value V5a to a voltage value V5b as shown by a dotted line.

Also, as the average current Id1 increases, the complex voltage Vad1 shown in (d) of FIG. 22 increases from the voltage value V2 to the voltage value V2a as shown by a dotted line. That is, almost at the same time as the complex voltage Vad1 increases, the reference voltage Vref1 also increases by the same voltage value. Therefore, the ON-Duty of the transistor 101B can be maintained substantially at 50% which is the same as that before the time t6, and thereafter the same state is repeated. As a result, as shown by a dotted line, the voltage value of the output voltage Vout1 is maintained at the voltage value V10 which is the same as that before the time t6, without decreasing. Also, since the feedback voltage Vfb1 changes according to the output voltage Vout1, as shown by a dotted line, the feedback voltage Vfb1 is maintained at the voltage value V0 which is the same as that before the time t6.

As described above, the regulator 1*a*B increases the voltage value of the reference voltage Vref1 in response to increasing of the current value of the average current Id1, thereby capable of stabilizing the output of the output voltage Vout1 even if the output current Iout1 increases, and controlling the output voltage Vout1 such that the voltage difference between the output voltage Vout1 and the target voltage Vtar is small.

11. Eighth Embodiment

Figure 23:
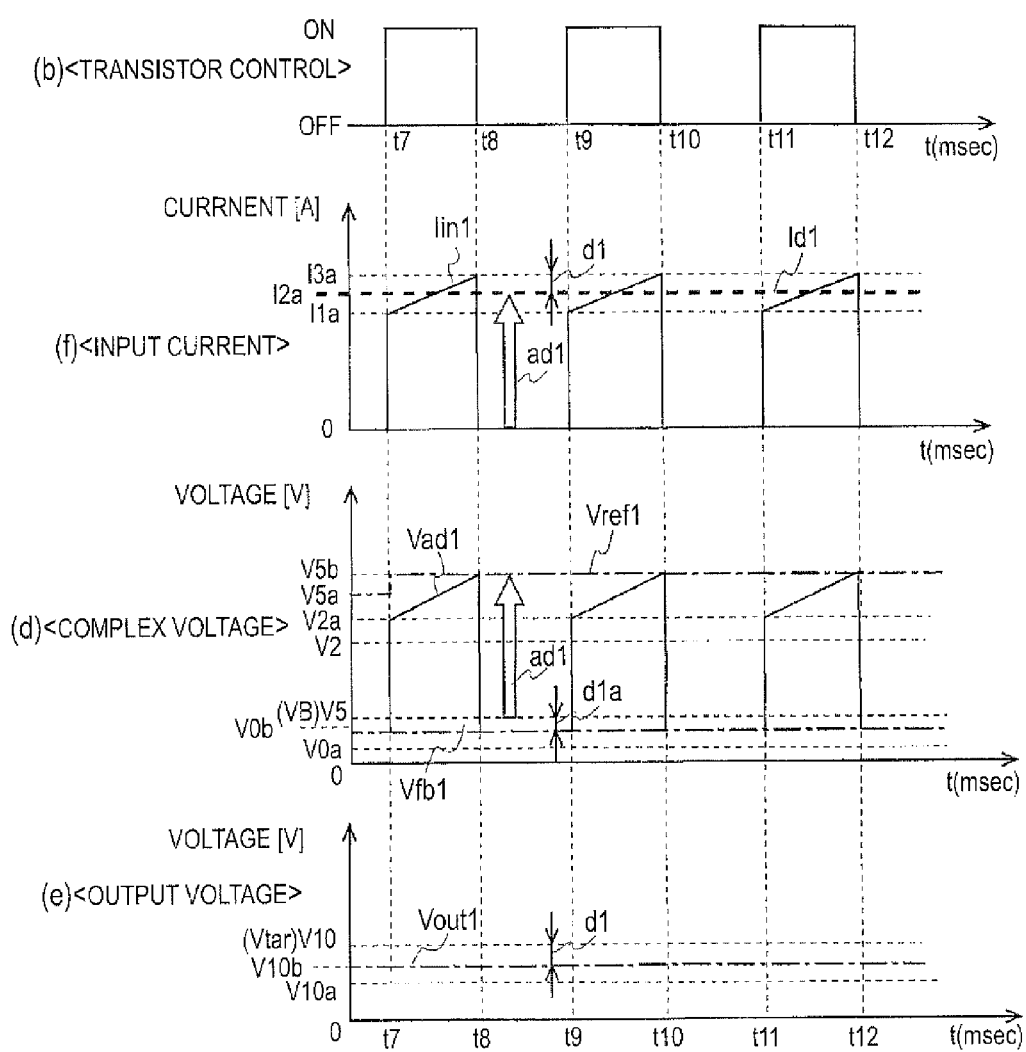
FIG. 23 is an enlarged view of signal waveforms is at a period (from a time t7 to a time t12) of FIG. 22.

Subsequently, an eighth embodiment will be described. In the above described second premise configuration, as a measure against a decrease in the output voltage Vout1, the regulator 1*a*B adds the average current Id1 to the reference power supply voltage VB, thereby setting the reference voltage Vref1. In the above description, besides this measure, the necessity to prevent a decrease in the output voltage Vout1 has become clear. With reference to FIG. 23, the reason why the output voltage Vout1 decreases will be described. FIG. 23 is an enlarged view of the signal waveforms in the second premise configuration in a time section (from the time t7 to the time t12) of FIG. 22. Also, FIG. 23 shows an input current graph in (f), in place of the coil current graph of (c) of FIG. 22, and the clock signal graph will not be described.

In the second premise configuration, as shown in (d) of FIG. 23, the DC component and AC component of the input current Iin1 is added to the feedback voltage Vfb1. Meanwhile, the average current Id1 which is the DC component of the input current Iin1 is added as a correction amount ad1 to the reference power supply voltage VB, whereby the reference voltage Vref1 is set, and the reference voltage Vref1 is used to prevent the output voltage Vout1 from decreasing in response to increasing of the output current Iout1. Also, the DC component of the input current Iin1 is the average current Id1 (a current value I2a) of the minimum value I1a and the maximum value I3a shown in (f) of FIG. 23.

However, actually, as shown in (e) of FIG. 23, the output voltage Vout1 becomes the voltage value V10b with respect to the voltage value V10 of the target voltage Vtar, and thus the voltage value of the output voltage Vout1 becomes lower than the target voltage Vtar by a difference d1. This voltage difference is, for example, several mV. Also, the output voltage Vout1 decreases by the difference d1, and the feedback voltage Vfb1 becomes a voltage value V0b smaller than the voltage value V5 of the reference power supply voltage VB by a difference d1a. Also, the difference d1 of the output voltage Vout1 corresponds to the difference d1a of the feedback voltage Vfb1 obtained by feeding back the output voltage Vout1, and the difference d1 becomes larger than the difference d1a.

The reason why the output voltage Vout1 decreases as described above is that, for example, at the time 8, with respect to the complex voltage Vad1, the maximum value I3a of the input current Iin1 is added, whereas with respect to the reference voltage Vref1, the current value I2a of the average current Id1 of the input current Iin1 is added. That is, the voltage value of the reference voltage Vref1 decreases by the difference d1 between the maximum value I3a of the input current Iin1 and the current value I2a of the average current Id1. Therefore, even if the current value of the input current Iin1 increases, the complex voltage Vad1 reaches the reference voltage Vref1, without increasing by a voltage corresponding to the difference d1. As a result, the ON period of the transistor 101B shortens by a period corresponding to the difference d1, and the output voltage Vout1 decreases by a voltage value corresponding to the difference d1.

A circuit configuration for improving decreasing of the output voltage Vout1 as described above, and changes of signals will be described below.

<11-1. Configuration>

Figure 24:
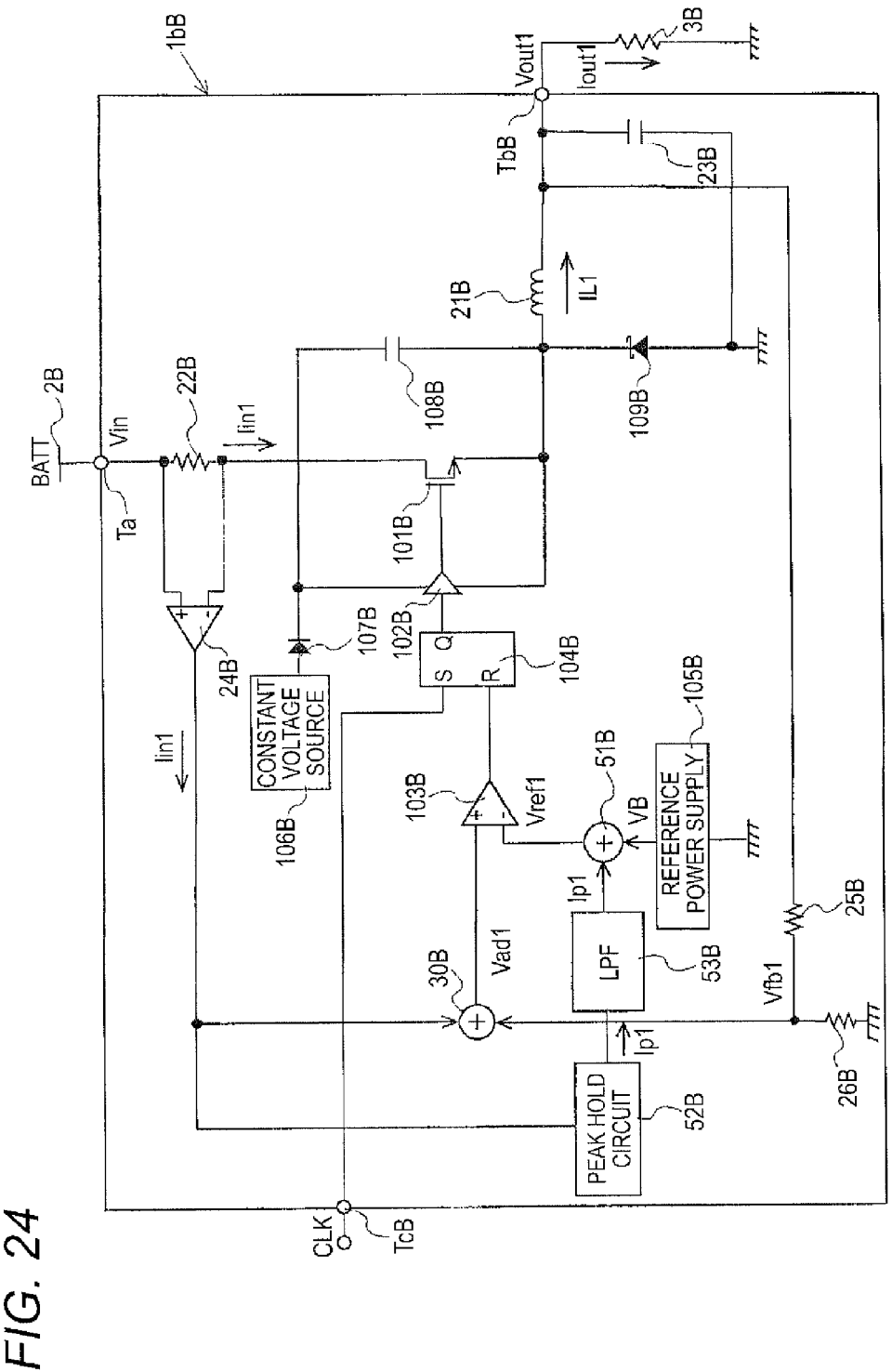
FIG. 24 is a view illustrating the circuit configuration of a regulator of an eighth embodiment.

FIG. 24 is a view illustrating the circuit configuration of a regulator 1*b*B of the eighth embodiment. The regulator 1*b*B has been obtained by adding a peak hold circuit 52B and a low-pass filter (LPF) 53B as new components to the configuration of the regulator 1*a*B of the second premise configuration, and eliminating the average-current deriving circuit 50B. The other configuration is the same as that of the regulator 1aB of the second premise configuration.

The peak hold circuit 52B is a circuit for acquiring the peak value of the input current Iin1. More specifically, the peak hold circuit 52B is a circuit for detecting the maximum value of the input current Iin1 in one cycle (one period) of control on the transistor 101B. The peak hold circuit 52B receives the output of the input current Iin1 from the sense amplifier 24B, and acquires the maximum value (peak value) of the input current Iin1 in one cycle (one period) from when the transistor 101B is turned on until when the transistor 101B is turned off, and outputs a current (hereinafter, referred to as "input peak current Ip1") configured by the peak value of the input current Iin1, to the LPF 53B. The peak hold circuit 52B resets the acquired peak value at a predetermined timing.

The LPF 53B is a filter device for reducing temporal change of the input peak current Ip1. In a case where the input peak current Ip1 changes at a certain timing, if the changed input current Iin is added to the reference power supply voltage VB, oscillation may occur. For this reason, the LPF 53B reduces temporal change of the input peak current Ip1, and outputs the input peak current Ip1 to the power adding circuit 51B. As a result, the input peak current Ip1 filtered by the LPF 53B is output to the power adding circuit 51B.

The power adding circuit 51B adds the input peak current Ip1 and a current into which the reference power supply voltage VB has been converted, thereby obtaining the reference voltage Vref1, and applies the reference voltage Vref1 to the inverted input terminal of the comparator 103B.

<11-2. Changes of Signals>

Figure 25:
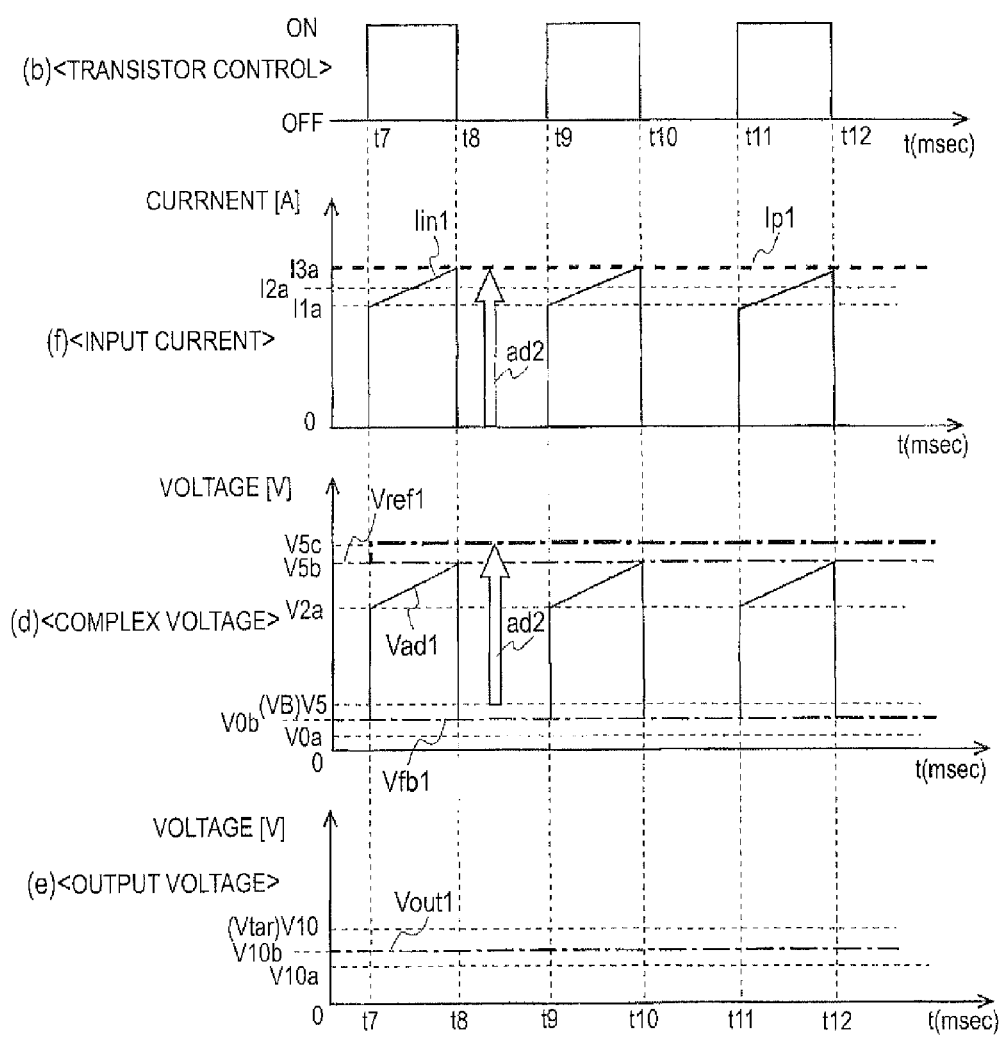
FIG. 25 is a view for explaining changes of individual signals in a case of using a peak hold circuit.

FIG. 25 is a view illustrating changes of individual signals in a case of using the peak hold circuit 52B. As described above with reference to FIG. 23, the regulator 1aB of the second premise configuration adds the average current Id1 as the correction amount ad1 to the reference power supply voltage VB, thereby setting the reference voltage Vref1. In contrast to this, the regulator 1bB of the present embodiment acquires the input peak current corresponding to the peak value I3a of the input current Iin1, for example, at the time t8, by the peak hold circuit 52B, and adds the acquired input peak current Ip1 as a correction amount ad2 to the reference power supply voltage VB, thereby setting the reference voltage Vref1. That is, the regulator 1bB sets the reference voltage Vref1 on the basis of the correction amount ad2 obtained by adding the current value which is the difference between the input peak current Ip1 and the average current Id1, to the correction amount ad1.

As a result, the voltage value of the reference voltage Vref1 becomes a voltage value V5c larger than the voltage value V5b. That is, the difference between the voltage values V5b and V5c of the reference voltage Vref1 corresponds to the difference d1 shown in FIG. 23.

Figure 26:
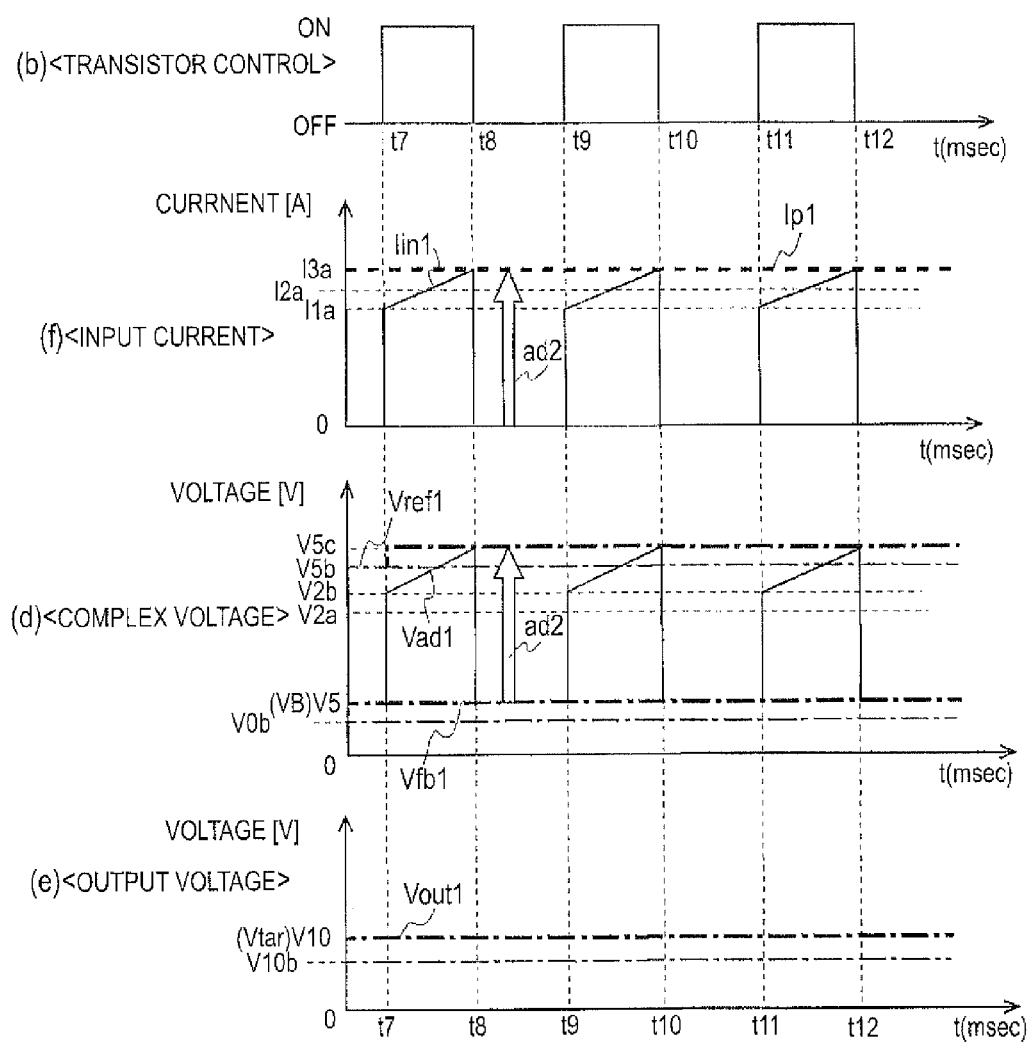
FIG. 26 is a view for explaining changes of individual signals relative to the reference voltage having been corrected on the basis of an input peak current.

FIG. 26 is a view illustrating changes of individual signals relative to the reference voltage Vref1 corrected on the basis of on the input peak current Ip1. If the reference voltage Vref1 increases from the voltage value V5b to the voltage value V5c by the correction amount ad2 based on the input peak current Ip1, a time for the complex voltage Vad1 to reach the reference voltage Vref1 lengthens. As a result, the ON period of the transistor 101B lengthens, resulting in stable duty (for example, 50%). Therefore, the output voltage Vout1 does not decreases, and can be maintained at the voltage value V10 which is the same as the target voltage Vtar. Also, since the voltage value of the output voltage Vout1 is maintained at the same voltage value as the target voltage Vtar, the feedback voltage Vfb1 can be maintained at the voltage value V5 which is the same as the reference power supply voltage VB. Also, the difference d1 between the voltage values V10 and V10b of the output voltage Vout1 shown in FIG. 23 corresponds to the difference d1 between the voltage values V5b and V5c.

As described above, since the reference voltage Vref1 is set in response to the peak value of the input current Iin1, the same input current Iin1 is included in the complex voltage Vad1 and the reference voltage Vref1, and thus it is possible to reduce the voltage difference between the output voltage and the target voltage. Also, it is possible to equalize a voltage to be added to the feedback voltage Vfb1 and a voltage to be added to the reference power supply voltage VB. Further, since the peak value of the input current Iin is acquired in each cycle of switching of the transistor 101B, and the reference voltage Vref1 is set on the basis of the peak value of each cycle, it is possible to set the reference voltage Vref1 according to a change in the peak value.

12. Ninth Embodiment

Subsequently, a ninth embodiment will be described. In the above described eighth embodiment, the reference power supply voltage VB is corrected on the basis of the peak value of the input current Iin1, whereby the voltage difference between the output voltage Vout1 and the target voltage Vtar is reduced.

In the circuit configuration of a regulator, a slope compensation circuit may be provided. In a case where the ON-Duty of the transistor 101B is more than 50% and the input current Iin1 increases, sub-harmonic oscillation in which the OFF timings of the transistor 101B are non-periodic may occur. The slope compensation circuit is used to prevent that sub-harmonic oscillation. If sub-harmonic oscillation occurs, jitter may occur in the switching waveform of the transistor 101B, and noise may influence other devices. If a slope compensation circuit is provided in a regulator, sub-harmonic oscillation is prevented. Specifically, a slope compensation circuit is a circuit for generating a slope current whose current value increases at a predetermined rising rate in an ON period of the transistor 101B and decreases at an OFF timing. For example, in the regulator 1bB of the eighth embodiment, a slope compensation circuit may output a slope current to an adder circuit 30B such that the slope current is added to the complex voltage Vad1, whereby slope compensation is performed. Then, the rising slope of the complex voltage Vad1 becomes larger than that before adding of the slope current, and it is possible to prevent sub-harmonic oscillation.

Figure 27:
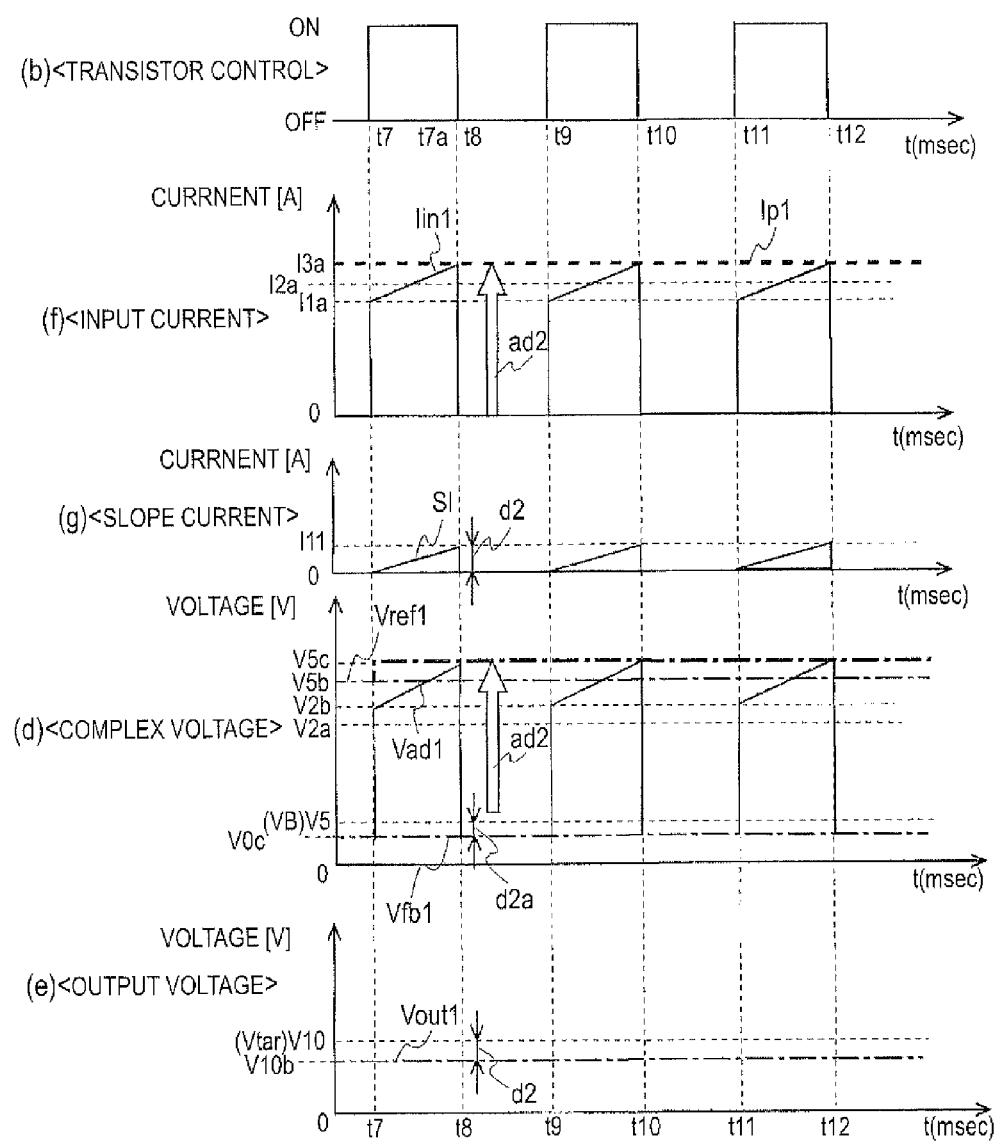
FIG. 27 is a view illustrating a slope current graph in addition to the graphs of FIG. 26.

However, for example, in a case where a slope compensation circuit is included in the regulator 1bB, there is a problem as shown in FIG. 27. FIG. 27 is a view for explaining the problem in a case where a slope compensation circuit is included in the regulator 1bB, and is a view mainly including a slope compensation graph in addition to the graphs of FIG. 26. At a time t7, if the transistor 101B is turned on, a slope current SI increases at a predetermined rising rate. Thereafter, at a time t8, the slope current SI reaches a current value I11 which is a peak value. Then, if the transistor 101B is turned off, the current value of the slope current SI decreases to 0 A. Thereafter, the slope current SI repeats the same change in response to switching control on the transistor 101B.

The slope current SI is supplied to the adder circuit 30A and is added to the complex voltage Vad1 Then, the rising slope of the complex voltage Vad1 becomes larger than that before the adding of the slope current SI, and the rising rate increases. As a result, a time for the voltage value of the complex voltage Vad1 to reach the voltage value V5c of the reference voltage Vref1 becomes relatively short. Therefore, the ON period of the transistor 101B shortens, and the OFF period lengthens. As a result, the output voltage Vout1 becomes lower than the target voltage Vtar. In response to the lowering of the output voltage Vout1, the feedback voltage Vfb1 also becomes lower than the reference power supply voltage VB, and thus the ON period of the transistor 101B lengthens. This feedback operation is repeated, whereby the output voltage Vout1 is maintained, for example, at the voltage value V10c smaller than the voltage value V10 of the target voltage Vtar. Further, a difference d2 between the voltage value V10 and the voltage value V10c becomes a value corresponding to the current value I1.1 of the slope current SI.

Also, the feedback voltage Vfb is maintained, for example, at the voltage value V0c smaller than the voltage value V5 of the reference power supply voltage VB. Further, a difference d2a between the voltage value V5 and the voltage value V0c becomes a value corresponding to the current value I11 of the slope current SI. Also, the difference d2 of the output voltage Vout1 corresponds to the difference d2a of the feedback voltage Vfb1 obtained by feeding back the output voltage Vout1, and the difference d2 becomes larger than the difference d2a.

A circuit configuration for improving decreasing of the output voltage Vout1 as described above, and changes of signals will be described below.

<12-1. Configuration>

Figure 28:
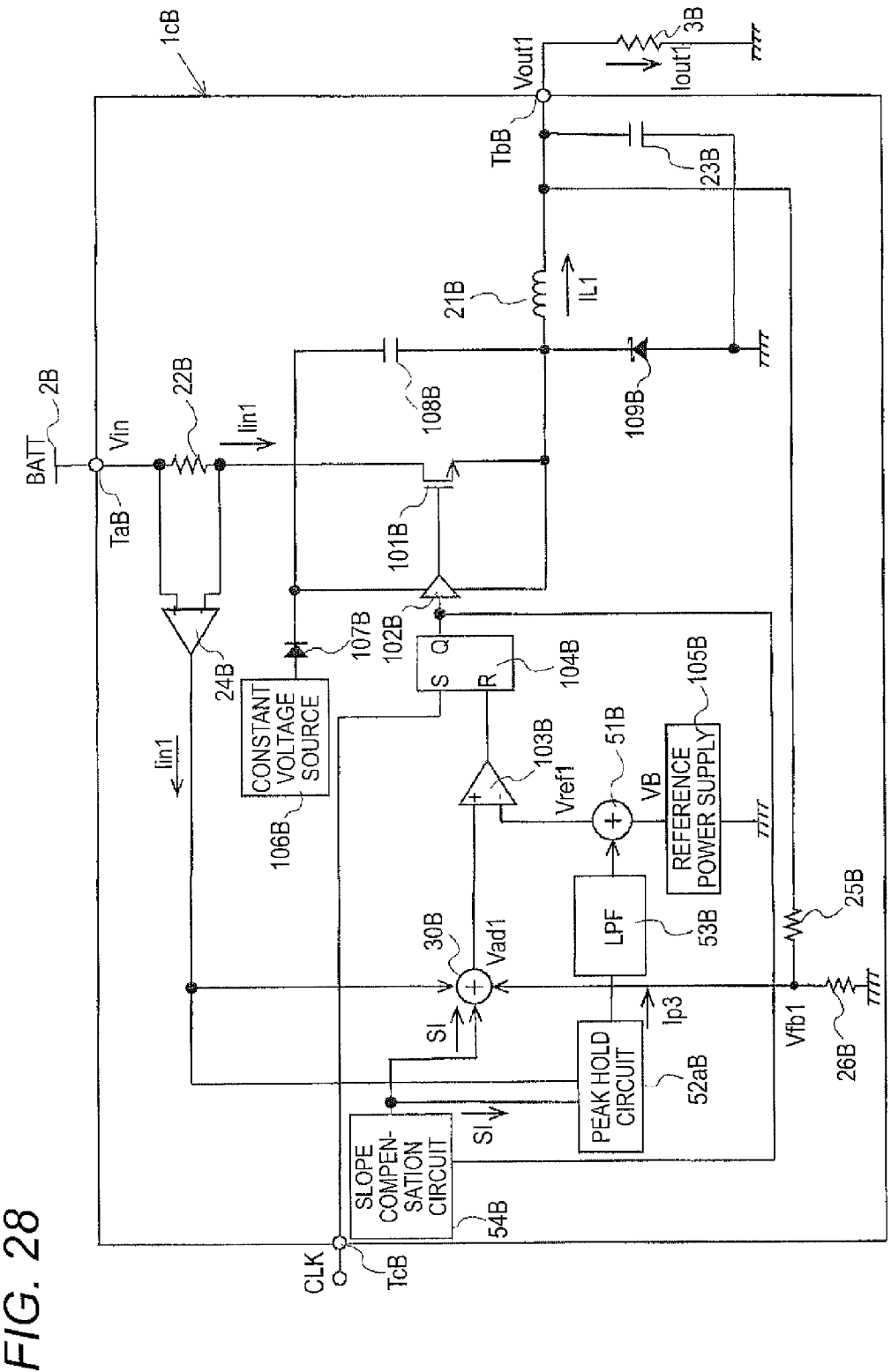
FIG. 28 is a view illustrating the circuit configuration of a regulator of a ninth embodiment.

FIG. 28 is a view illustrating the circuit configuration of a regulator 1cB of the ninth embodiment. The regulator 1cB has been obtained by adding a slope compensation circuit 54B as a new component to the configuration of the regulator 1bB of the eighth embodiment, and replacing the configuration of the peak hold circuit 52B with a peak hold circuit 52aB. The other configuration is the same as that of the regulator 1bB of the eighth embodiment.

The slope compensation circuit 54B is a circuit for generating a slope current SI whose current value increases at a predetermined rising rate in an ON period of the transistor 101B and decreases at an OFF timing. That is, the current value of the slope current SI increases and then decreases with time.

Further, the slope compensation circuit 54B outputs the slope current SI to the adder circuit 30B while outputting the slope current SI to the peak hold circuit 52aB. The slope current SI output to the adder circuit 30B is added to the complex voltage Vad1 including a feedback current Ifb1 and the input current Iin1, and the complex voltage Vad1 is output to the comparator 103B. Also, a peak value which is the maximum value of the slope current SI is acquired by the peak hold circuit 52aB. The peak hold circuit 52aB outputs a current Ip3 (hereinafter, referred to as "complex peak current Ip3) including the current (hereinafter, referred to as "slope peak current Ip2") of the peak value of the slope current SI and the input peak current Ip1, to the LPF 53B. As a result, the complex peak current Ip3 having been filtered by the LPF 53B is output to the power adding circuit 51B. The power adding circuit 51B adds the complex peak current Ip3 and the current into which the reference power supply voltage VB has been converted, thereby obtaining the reference voltage Vref1, and applies the reference voltage Vref1 to the inverted input terminal of the comparator 103B.

<12-2. Changes of Signals>

Subsequently, a method of adding the complex peak current Ip3 to the reference power supply voltage VB so as to set the reference voltage Vref1, thereby improving a decrease in the output voltage Vout1 will be described with reference to FIGS. 29 and 30.

Figure 29:
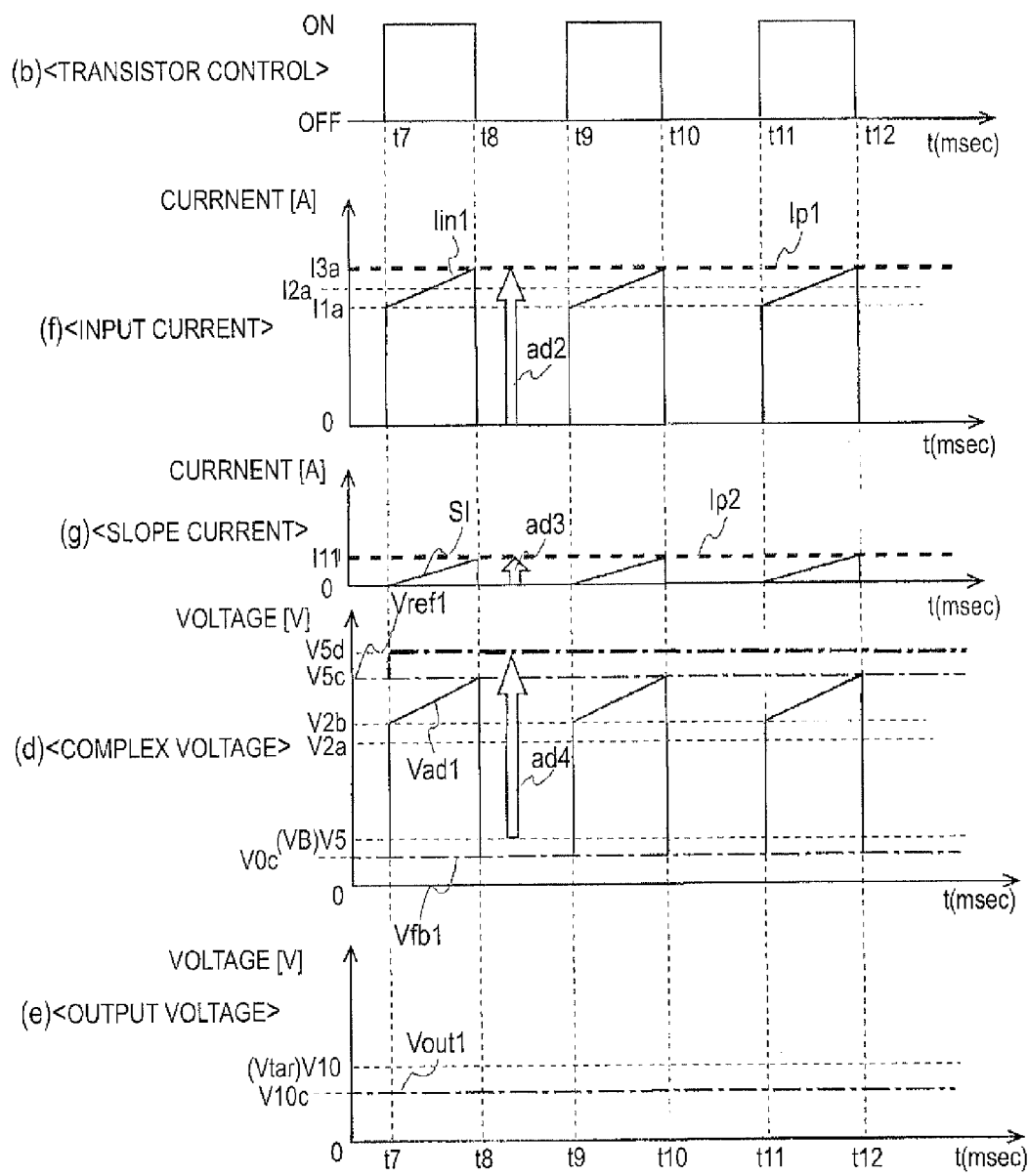
FIG. 29 is a view for explaining setting of the reference value based on the peak value of an input current and the peak value of a slope current.

FIG. 29 is a view for explaining setting of the reference voltage Vref1 based on the peak value of the input current Iin1 and the peak value of the slope current SI. The regulator 1bB of the eighth embodiment adds the input peak current Ip1 as the correction amount ad2 to the reference power supply voltage VB, thereby setting the reference voltage Vref1. In contrast to this, the regulator 1cB of the present embodiment adds the input peak current Ip1 including the peak value I3a of the input current Iin1 input to the peak hold circuit 52aB, for example, at the time t8, and the slope peak current Ip2 including the peak value I11 of the slope current SI, thereby obtaining the complex peak current Ip3, and uses the complex peak current Ip3 as a correction amount ad4 to set the reference voltage Vref1. That is, the regulator 1cB adds the correction amount ad2 corresponding to the current value I3a of the input current Iin1, and a correction amount ad3 corresponding to the current value I11 of the slope current SI, thereby obtaining the correction amount ad4, and adds the correction amount ad4 to the reference power supply voltage VB, thereby setting the reference voltage Vref1.

As a result, the voltage value of the reference voltage Vref1 becomes a voltage value V5d larger than the voltage value V5c based on the correction amount ad2. The difference between the voltage values V5c and V5d of the reference voltage Vref1 corresponds to the difference d2 shown in FIG. 27.

Figure 30:
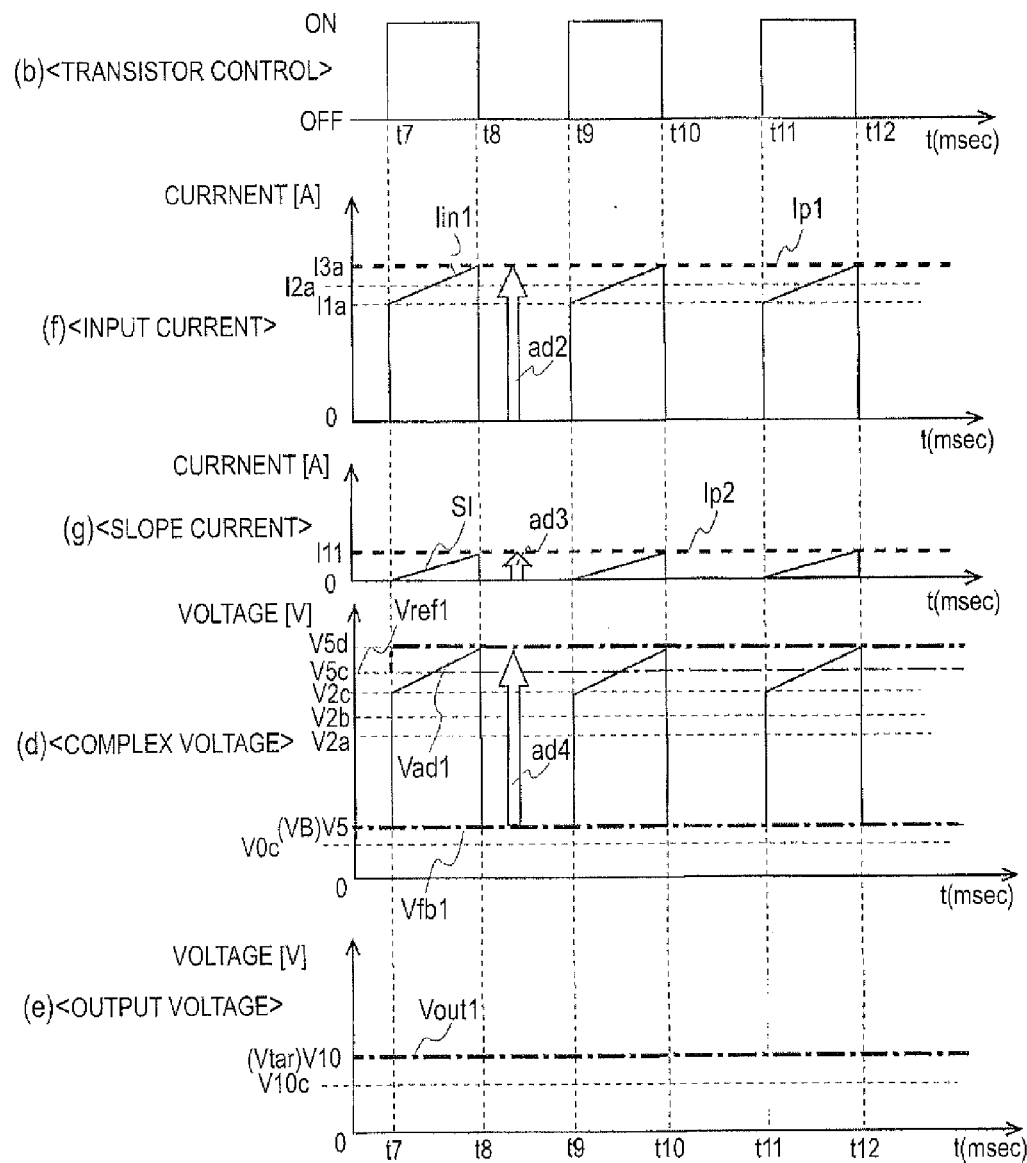
FIG. 30 is a view for explaining changes of individual signals relative to the reference voltage having been set on the basis of a complex peak current.

FIG. 30 is a view illustrating changes of individual signals relative to the reference voltage Vref1 set on the basis of the complex peak current Ip3. If the reference voltage Vref1 increases from the voltage value V5c to a voltage value V5d by the correction amount ad4 based on the complex peak current Ip3, a time for the complex voltage Vad1 to reach the reference voltage Vref1 lengthens. As a result, the ON period of the transistor 101B lengthens, resulting in stable duty (for example, 50%). Therefore, the output voltage Vout1 does not decreases, and can be maintained at the voltage value V10 which is the same as the target voltage Vtar.

Also, the difference d1 between the voltage values V10 and V10c of the output voltage Vout1 shown in FIG. 23 corresponds to the difference d1 between the voltage values V5b and V5c of the reference voltage Vref1.

As described above, since the reference voltage Vref1 is set according to the peak value of the input current Iin1 and the peak value of the slope current SI, even if the slope compensation circuit 54B is provided, and adds the slope current SI to the complex voltage Vad1, thereby performing slope compensation, the voltage to be added to the feedback voltage Vfb1 and the voltage to the added to the reference power supply voltage VB become the same voltage, and thus it is possible to reduce the difference between the output voltage Vout1 and the target voltage Vtar. Also, since the peak value of the input current Iin1 and the peak value of the slope current SI are acquired in each cycle of switching of the transistor 101B, and the reference voltage Vref1 is set on the basis of the peak values of each cycle, it is possible to set the reference voltage Vref1 according to a change in the peak values, and it is possible to reduce the difference between the output voltage Vout1 and the target voltage Vtar.

<Modifications>

Although the eight and ninth embodiments of the present invention have been described above, the present invention is not limited to the eight and ninth embodiments described above, and can be modified into a variety of forms. Hereinafter, these modifications will be described. Also, all forms including forms having been described in the eight and ninth embodiments and forms to be described below can be appropriately combined.

In the eighth and ninth embodiments, the regulator 1bB (or 1cB) uses the sense resistor 22B and the sense amplifier 24B to detect the current value of the input current Iin1, and uses the adder circuit 30B to add the current value of the input current Iin1 to the feedback current Ifb1, thereby deriving the complex voltage Vad1. In contrast to this, the regulator 1bB (or 1cB) may add the coil current IL1, instead of the input current Iint, to the feedback current Ifb1, thereby deriving the complex voltage Vad1.

Also, in the eighth and ninth embodiments, the regulator 1bB (or 1cB) includes the sense resistor 22B and the sense amplifier 24B between the input terminal Ta (TaB) and the transistor 101B, and uses them to detect the input current Iin1. In contrast to this, if detection of the input current Iin1 is possible, the regulator 1bB (or 1cB) may be configured to detect the current value at any other position in the circuit.

Also, in the eighth and ninth embodiments, in a case of deriving the complex voltage Vad1, the regulator 1bB (or 1cB) converts a complex current Iad1 obtained by adding the feedback current Ifb1 and the input current Iin1, into a voltage. In contrast to this, the regulator 1bB (or 1cB) may add the feedback voltage Vfb1 and a derived voltage VL1 into which the input current Iin1 has been converted, thereby deriving the complex voltage Vad1.

Also, in the eighth and ninth embodiments, a current (for example, the input peak current Ip1) is added to the reference power supply voltage VB. However, a voltage (for example, a voltage into which the input peak current Ip1 has been converted) may be added to the reference power supply voltage VB.

Also, in the eighth and ninth embodiments, the voltage including the output voltage Vout1 having been fed back is divided by the resistor 25B and the resistor 26B, whereby the feedback voltage Vfb1 is derived, and the feedback voltage Vfb1 is input to the adder circuit 30B. In contrast to this, the resistor 25B and the resistor 26B may be omitted and a voltage including the output voltage Vout1 may be input directly to the adder circuit 30B.

Also, in the eighth and ninth embodiments, conversion of the feedback voltage Vfb1 into a current is performed inside the adder circuit 30B. In contrast to this, a circuit for performing conversion into a current may be provided outside the adder circuit 30B and perform conversion of the feedback voltage Vfb1 into a current.

Also, in the eighth and ninth embodiments, conversion of the reference power supply voltage VB into a current is performed inside the power adding circuit 51B. In contrast to this, a circuit for performing conversion into a current may be provided outside the power adding circuit 51B and perform conversion of the reference power supply voltage VB into a current.

Also, in the eighth and ninth embodiments, the N-channel MOS transistor 101B is an example of a switching element. However, the circuit configuration may be changed to include any other switching element (for example, a P-channel MOS transistor).

Also, in the eighth and ninth embodiments, the configuration of the regulator 1bB (or 1cB) has been described as an example, and elements other than those described in the embodiments may be included.

Also, in the eighth and ninth embodiments, the configuration of the regulator 1bB (or 1cB) has been described as an example, and some elements in the switching regulator may be provided outside.

Also, in the eighth and ninth embodiments, control technologies relative to regulators have been mainly described. However, the technologies are not limited to the regulars. The technologies described in the embodiments can be applied to any other electronic circuits which perform PWM control.

Hereinafter, tenth and eleventh embodiments of the present invention will be described with reference to the accompanying drawings. The following embodiments are illustrative, and the technical scope of the present invention is not limited thereto.

Tenth Embodiment

<13. Configuration of Switching Regulator>

Figure 31:
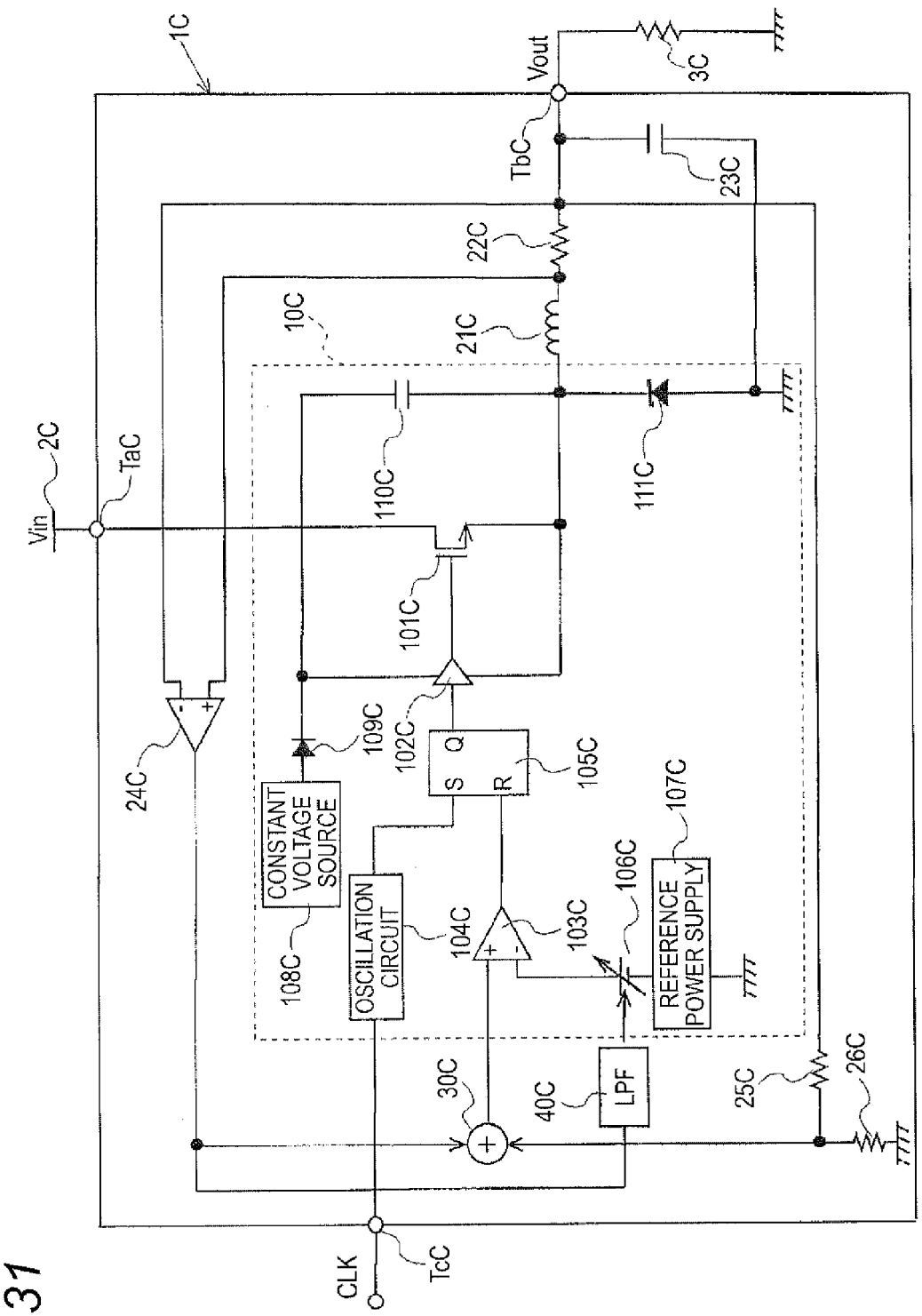
FIG. 31 is a view mainly illustrating the circuit configuration of a switching regulator of a tenth embodiment.

First, the circuit configuration of a switching regulator 1C will be described. FIG. 31 is a view mainly illustrating the circuit configuration of the switching regulator 1C of the tenth embodiment. The switching regulator 1C performs switching control on a MOS transistor 101C included in a control unit 10C (to be described below), thereby decreasing an input voltage Vin (whose ideal value is, for example, 14 V) input form a battery 2C through a terminal TaC such that the input voltage Vin becomes the same as a target voltage Vtar (whose ideal value is, for example, 5V), and outputs an output voltage Vout. Then, an output current Iout based on the output voltage Vout flows into a load 3C (for example, a micro computer of an electronic control unit (ECU)) through a terminal TbC. The ECU is, for example, an engine control ECU for controlling driving of an engine, and the switching regulator 1C can be used to supply constant electric power to the micro computer of the corresponding ECU.

Between the terminal TaC and terminal TbC of the switching regulator 1C, an N-channel MOS transistor 101C is provided to be subjected to switching control for decreasing the input voltage Vin. Specifically, the drain of the MOS transistor 101C is connected to the terminal TaC, and the source thereof is connected to the terminal (TbC) side. Further, the gate is connected to a driver 102C for controlling the ON/OFF state of the MOS transistor 101C. Also, the source of the MOS transistor 101C is connected to a coil 21C, and the coil 21C is connected directly to a resistor 22C. The current amount (current value) of a current (a coil current IL) flowing in the coil 21C varies in response to switching control on the MOS transistor 101C, and the resistor 22C detects the current amount of the coil current IL. Further, the resistor 22C is connected to the load 3C through the terminal TbC, and the other end of the load 3C is connected to a ground.

Also, the connection point of the coil 21C and the resistor 22C is connected to the non-inverted input terminal of a current sense amplifier 24C. The current sense amplifier 24C converts the coil current IL into a voltage, and outputs the voltage. The resistor 22C and the terminal TbC are connected at two connection points of the terminal (TaC) side and the terminal (TbC) side, and the connection point of the terminal (TbC) side is connected to a capacitor 23C. The capacitor 23C accumulates electric charge corresponding to the output current Iout which is a DC component obtained by eliminating the AC component of the coil current IL. Further, the other end of the capacitor 23C is connected to the anode of a Schottky diode 111C. In a case where the MOS transistor 101C is off, in the Schottky diode 111C, the coil current IL flows from the anode to the cathode. Also, the anode of the Schottky diode 111C is connected to the ground.

Further, the connection point of the resistor 22C and the terminal TbC on the terminal (TaC) side is connected to the inverted input terminal of the current sense amplifier 24C. Also, this connection point is connected to a resistor 25C which is one of resistors for dividing the feedback voltage of the output voltage Vout. The other end of the resistor 25C is connected to one end of a resistor 26C which is the other resistor for dividing the output voltage Vout, and the other end of the resistor 26C is connected to the ground. The connection point of the resistor 25C and the resistor 26C is connected to the adder circuit 30C. Also, the voltage of the connection point of the resistor 25C and the resistor 26C is input as a feedback voltage Vfb to the adder circuit 30C.

The adder circuit 30C is connected to the connection point of the output terminal of the current sense amplifier 24C and a low-pass filter (LPF) 40C (to be described below), and is connected to the non-inverted input terminal of the comparator 103C for outputting a signal of the result of comparison between an addition voltage Vad and a reference voltage Vref. The adder circuit 30C adds a converted voltage VL which is the output of the current sense amplifier 24C, and the feedback voltage Vfb output from the resistor 25C and the resistor 26C for dividing the output voltage Vout, thereby obtaining the addition voltage Vad, and outputs the addition voltage Vad to the non-inverted input terminal of the comparator 103C.

Subsequently, the circuit configuration of the control unit 10C of the switching regulator 1C will be described. The control unit 10C includes elements relative to switching control on the MOS transistor 101C. An oscillation circuit 104C of the control unit 10C is connected to a terminal TcC, and receives a clock signal of a micro computer provided outside the switching regulator 1C. Further, the other end of the oscillation circuit 104C is connected to the set terminal S of a flip-flop 105C which switches the state of an output signal in response to an input signal.

The non-inverted input terminal of the comparator 103C is connected to the adder circuit 30C. The inverted input terminal of the comparator 103C is connected to a regulated power supply 106C. The regulated power supply 106C is for changing the voltage value of the reference voltage Vref, and changes the value of the reference voltage Vref according to the voltage value of the DC component of the converted voltage VL. Also, the other end of the regulated power supply 106C is connected to a reference power supply 107C for securing a predetermined voltage which is the reference voltage Vref, and the other end of the reference power supply 107C is connected to the ground. The output terminal of the comparator 103C is connected to the reset terminal R of the flip-flop 105C. Further, the output terminal Q of the flip-flop 105C is, connected to the driver 102C.

Also, a constant voltage source 108C for outputting a predetermined value (for example, 5 V) is connected to the anode of a diode 109C, and the cathode of the diode 109C is connected to a capacitor 110C for mainly accumulating electric charge of a current flowing from the constant voltage source 108C. Also, the other end of the capacitor 110C is connected to the connection point of the coil 21C and the cathode of the Schottky diode 111C. Further, the connection point of the diode 109C and the capacitor 110C is connected to the driver 102C.

14. Operation of Switching Regulator

Figure 32:
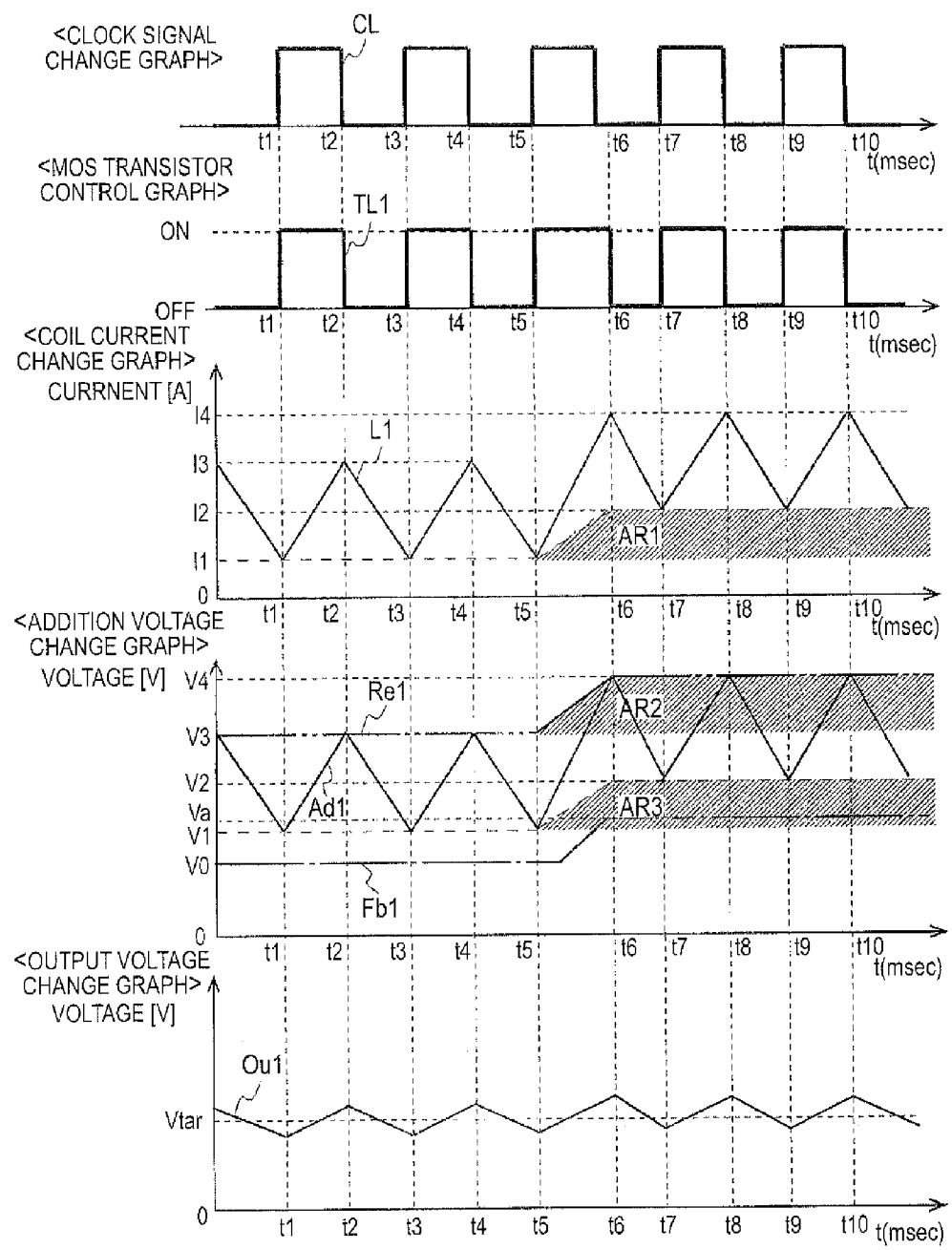
FIG. 32 is a view illustrating temporal changes of individual signals relative to the switching regulator.

Subsequently, the operation of the switching regulator 1C will be described. A description of the operation will be made mainly with reference to FIG. 32. FIG. 32 is a view illustrating temporal changes of individual signals relative to the switching regulator 1C. Each graph of FIG. 32 will be described. In the following description, the horizontal axis of each graph represents time (msec).

<14-1. Clock Signal Change Graph>

A clock signal change graph shows a clock signal CL representing the waveform of a clock signal input from a micro computer provided outside the switching regulator 1C. The clock signal CL is output while repeating rising and falling with a predetermined period.

Specifically, the clock signal CL is input to the oscillation circuit 104C through the terminal TcC, and is output from the oscillation circuit 104C to the set terminal S of the flip-flop 105C. If the clock signal CL is received, for example, in response to the rising edge of the clock signal CL at a time t1, the flip-flop 105C outputs a High signal (hereinafter, referred to as "H signal") from the output terminal Q to the driver 102C. If receiving the H signal, the driver 102C sets a voltage to be applied to the gate of the MOS transistor 101C to a voltage higher than the voltage of the source, thereby turning on the MOS transistor 101C substantially at the same time as the time t1.

That is, electric charge of a current flowing from the constant voltage source 108C through the diode 109C, and electric charge of the input current lie flowing according to the input voltage Yin are accumulated in the capacitor 110C, whereby the potential of the gate of the MOS transistor 101C becomes the same as that of the capacitor 110C. As a result, a predetermined voltage difference between the voltage of the gate and the voltage of the source (the input voltage Yin) occurs, and the MOS transistor 101C is turned on. Also, in a case where the MOS transistor is turned off, the potential of the voltage of the gate and the potential of the voltage of the source become the same potential.

<14-2. Mos Transistor Control Graph>

A MOS transistor control graph shows a control signal TL1 representing the control state of the MOS transistor 101C. In other words, the MOS transistor control graph shows the ON periods and OFF periods of the MOS transistor 101C. Here, for example, in a case where the ON periods and OFF periods of the MOS transistor 101C have the same length, the ON-Duty and OFF-Duty ratios of the control signal TL1 become 50% and 50%, respectively, and thus become equal. However, in a case where the OFF periods and the OFF periods have different lengths, the ON-Duty and OFF-Duty ratios become different. For example, in a case where the resistance value of the load 3C decreases, as the current value of the coil current IL which is a current corresponding to the output current Iout increases, the ON periods become longer than the OFF periods. That is, the ON-Duty ratio becomes larger than the OFF-Duty ratio.

Specifically, considering the ON/OFF timings of the control signal TL1, in a period from the time t1 until the time t5, since the resistance value of the load 3C is constant, the ON-Duty and OFF-Duty ratios of the MOS transistor 101C become equal. Thereafter, in a period from the time t5 until the time t7, since the resistance value of the load 3C decreases, the current value of the coil current IL increases, and thus the ON period of the MOS transistor 101C becomes longer than the OFF period. That is, the ON-Duty ratio becomes larger than the OFF-Duty ratio. Also, after the time t7, for example, the resistance value of the load 3C becomes constant, and the lengths of the ON periods and the OFF periods of the MOS transistor 101C become equal, and the ON-Duty ratio and the OFF-Duty ratio become equal.

<14-3. Coil Current Change Graph>

A coil current change graph shows a current graph line L1 representing change of the current value of the coil current IL flowing in the coil 21C. The vertical axis of the graph represents a current value [A]. The coil current IL is a current which flows in the coil 21C by switching control on the MOS transistor 101C, and in a case where the MOS transistor 101C is on, the coil current IL flows from the battery into the coil 21C through the terminal TaC. Also, in a case where the MOS transistor 101O is off, the coil current IL flows from the cathode of the Schottky diode 111C into the coil 21C through the anode. Also, the coil current IL is detected by the resistor 22C, and is converted into the converted voltage VL by the current sense amplifier 24C, and the converted voltage VL is output from the current sense amplifier 24C.

That is, since the coil current IL flows in the resistor 22C, the voltage of the one end of the resistor 22C is input to the non-inverted input terminal of the current sense amplifier 24C, and the voltage of the other end of the resistor 22C is input to the inverted input terminal of the current sense amplifier 24C. Then, the voltage difference between both input terminals of the current sense amplifier 24C is output as the converted voltage VL from the output terminal of the current sense amplifier 24C. The converted voltage VL output from the output terminal is added to the feedback voltage Vfb in the adder circuit 30C.

In the coil current change graph of FIG. 32, as shown by the current graph line L1, the coil current IL becomes a current value I1 at the time t1 Thereafter, since the MOS transistor 101C is turned on at the time t1, the current value increases. In a period from the time t1 until a time t2 when the MOS transistor 101C is turned off, the coil current IL increases from the current value I1 to a current value I3. Thereafter, the MOS transistor 101C is turned off at the time t2, and then the current value of the coil current IL decreases. In a period from the time t2 until the time t3 when the MOS transistor 101C is on again, the coil current IL decreases from the current value I3 to the current value I1.

Further, in the period from the time t1 until a time t5, since the resistance value of the load 3C is constant, the lengths of the ON periods and OFF periods of the MOS transistor 101C become equal, and the current value of the coil current IL changes between the current values I1 and I3. Also, in a period from the time t5 until the time t6, since the resistance value of the load 3C decreases, in order to increase a current to flow in the load 3C, the MOS transistor 101C becomes the ON state. Also, the ON period from the time t5 until the time t6 becomes longer than the ON period from the time t1 until the time t2 or the ON period from the time t3 until the time t4. As a result, the current value of the coil current IL increases form the current value I1 (the time t5) to a current value I4 (the time t6) larger than the current value I3. Further, in a period from the time t6 until the time t7, the MOS transistor 101C is off, and thus the current value of the coil current IL changes form the current value I4 (the time t6) to a current value I2 (the time t7) which is larger than the current value I1 and is smaller than the current value I3.

After the time t7, in a period from the time t7 until a time t8, the MOS transistor 101C is on, and thus the coil current IL increases form the current value I2 to the current value I4. Thereafter, in a period from the time t8 until a time t9, the MOS transistor 101C is off, and thus the coil current IL decreases from the current value I4 to the current value I2. Thereafter, the same change is repeated. Also, after the time t7, the coil current regularly and repeatedly changes on the basis of the reference value of the load 3C having decreased at the time t5. In other words, as the resistance value of the load 3C, decreases the DC component of the coil current IL corresponding to an area AR1 hatched in the coil current change graph increases.

<14-4. Addition Voltage Change Graph>

An addition voltage change graph shows an addition graph line Ad1 representing change of the voltage value of the addition voltage Vad obtained by adding the feedback voltage Vfb and the converted voltage VL into which the coil current IL has been converted. Also, change of the feedback voltage Vfb which is included in the addition voltage Vad is shown by a feedback graph line Fb1. Further, change of the voltage value of the reference voltage Vref relative to the addition voltage Vad is shown by a reference graph line Re1. The vertical axis of this graph represents a voltage value [V].

The output voltage Vout is fed back by the feedback loop, and is divided by the resistor 25C and the resistor 26C, whereby the feedback voltage Vfb is obtained, and the feedback voltage Vfb is added to the converted voltage VL into which the coil current IL has been converted, in the adder circuit 30C.

In FIG. 32, as shown by the feedback graph line Fb1, the addition graph line Ad1, and the reference graph line Re1 in the addition voltage change graph, at the time t1, the feedback voltage Vfb becomes a voltage value V0, and the addition voltage Vad becomes a voltage value V1, and the reference voltage Vref becomes a voltage value V3. Further, at the time t1, the MOS transistor 101C is turned on at the time t1, and thus the voltage value of the addition voltage Vad increases until the time t2. At the time t2, the addition voltage Vad becomes the voltage value V3 which is the same as the reference voltage Vref. This is due to change of the current value of the coil current IL. If the addition voltage Vad and the reference voltage Vref become equal as described above, the MOS transistor 101C is turned off.

Specifically, in the switching regulator 1C of FIG. 31, the addition voltage Vad is input to the non-inverted input terminal of the comparator 103C, and is compared with the reference voltage Vref input to the inverted input terminal. Also, the reference voltage Vref has a voltage value which is the sum of the voltage value of the reference power supply 107C and the voltage value of the regulated power supply 106C. When the addition voltage Vad and the reference voltage Vref are compared in the comparator 103C, if there is no voltage difference between both voltages (the difference between both voltages is 0 V), the H signal is output from the output terminal of the comparator 103C to the reset terminal R of the flip-flop 105C. Then, the flip-flop 105C outputs a Low signal (hereinafter, referred to as "L signal") from the output terminal Q to the driver 102C. As a result, the MOS transistor 101C is switched from the ON state to the OFF state.

Meanwhile, if there is a voltage difference between the addition voltage Vad and the reference voltage Vref (the voltage difference between them is not 0 V), the L signal is output from the output terminal of the comparator 103C to the reset terminal R of the flip-flop 105C, and when a rising edge of the clock signal is input to the set terminal S of the flip-flop 105C, the H signal is output from the output terminal Q of the flip-flop 105C to the driver 102C.

After the MOS transistor 101C is turned off, the voltage value of the addition voltage Vad decreases. In a period until the time t3 when the MOS transistor 101C is turned on again, the addition voltage Vad decreases from the voltage value V3 to the voltage value V1.

Further, in the period from the time t1 until the time t5, since the resistance value of the load 3C is constant, the current value of the coil current IL regularly and repeatedly changes, and thus the addition voltage Vad changes between the voltage values V1 and V3. Also, in the period from the time t1 until the time t5, the feedback voltage Vfb is maintained substantially constant at the voltage value V0, without considerably changing. Thereafter, in a period from the time t5 until the time t6, since the MOS transistor 101C is on, the voltage value of the addition voltage Vad increases from the voltage value V1 (the time t5) to a voltage value V4 (the time t6) larger than the voltage value V3.

The reason why the addition voltage Vad increases to the voltage value V4 is that the reference voltage Vref increases from the voltage value V3 to the voltage value V4. Specifically, the reason is that the voltage value of the regulated power supply 106C is added to the voltage value of the reference power supply 107C. The voltage value of the regulated power supply 106C is a voltage value obtained by filtering the addition voltage Vad output from the output terminal of the current sense amplifier 24C by the LPF 40C as shown in FIG. 31.

Specifically, the increase of the DC component of the coil current IL shown by the area AR1 in the coil current change graph of FIG. 32 is added, as the voltage value of the regulated power supply 106C shown by an area AR2 in the addition voltage change graph, to the reference voltage Vref, whereby the reference voltage Vref increases from the voltage value V3 to the voltage value V4. Also, since the increase of the DC component of the coil current IL shown by the area AR1 is converted into a voltage in the current sense amplifier 24C, thereby becoming the DC component of the converted voltage VL, this DC component becomes the increase (increase from the voltage value V1 to the voltage value V2) of the DC component of the addition voltage Vad as shown by an area AR3. Also, with the increasing of the addition voltage Vad, the voltage value of the feedback voltage Vfb also increases from the voltage value V0 to a voltage value Va in a period from the time t5 until the time6 as shown by the feedback graph line Fb1.

Thereafter, in the period from the time t6 until the time t7, since the MOS transistor 101C is off, the addition voltage Vad decreases from the voltage value V4 (the time t6) to the voltage value V2 (the time t7) which is larger than the voltage value V1 and is smaller than the voltage value V3. After the time t7, in the period from the time t7 until the time t8, since the MOS transistor 101C is on, the addition voltage Vad increases from the voltage value V2 to the voltage value V4. Then, the MOS transistor 101C is turned off, and thus the addition voltage Vad decreases from the voltage value V4 to the voltage value V2. Thereafter, the same change is repeated. As described above, as the current value of the coil current IL changes, the voltage value of the addition voltage Vad changes. In other words, as the DC component of the coil current IL increases (the area AR1), the voltage value of the reference voltage Vref increases (the area AR2) and the voltage value of the DC component of the addition voltage Vad corresponding to the DC component of the converted voltage VL increases (the area AR3).

<14-5. Output Voltage Change Graph>

The output voltage change graph shows an output graph line Ou1 representing change of the voltage value of the output voltage Vout. The vertical axis of the graph represents the voltage value [V]. In the period from the time t1 until the time t10, by switching control on the MOS transistor 101C described above, the output voltage Vout changes as shown by the output graph line Ou1, so as to become substantially equal to the target voltage Vtar.

That is, since the reference voltage Vref is changed according to the value of the coil current which is a current corresponding to the output voltage Vout as described above, it is possible to suppress the output voltage Vout from changing due to decreasing of the gain of the entire circuit, thereby reducing the difference between the output voltage Vout and the target voltage Vtar. More specifically, since the reference voltage Vref is increased in response to increasing of the DC component of the converted voltage VL, it is possible to increase the voltage value of the reference voltage Vref in a state where periodic change of the voltage value of the converted voltage VL has been eliminated.

<14-6. Change of Output Voltage According to Existence or Non-Existence of Adjustment on Reference Voltage>

Now, the effects of a case of changing the voltage value of the reference voltage Vref according to the voltage value of the regulated power supply 106C will be described with reference to FIG. 33. That is, change of the output voltage Vout in a case of using the reference voltage Vref having a predetermined voltage value without adding the voltage value of the regulated power supply 106C, and change of the output voltage Vout in a case of increasing the reference voltage Vref by adding the voltage value of the regulated power supply 106C will be described with reference to FIG. 33. FIG. 33 is a view illustrating change of the output voltage Vout according to existence or non-existence of adding of the voltage value of the regulated power supply 106C to the reference voltage Vref. In each graph of FIG. 33, the horizontal axis represents a current value [A], and the vertical axis represents a voltage value [V]. The upper graph of the FIG. 33 mainly shows change of the output voltage Vout in a case where the voltage value of the regulated power supply 106C is not added to the reference voltage Vref (the voltage value V10). In the upper graph, an output graph line Oua represents change of the output voltage Vout, and a reference graph line Rea represents change of the reference voltage Vref.

Also, in the switching regulator 1C of the present embodiment without a gain increasing element such as a differential amplifier, as described above with reference to FIG. 32, in the period from the time t5 until the time t6, since the output current Iout corresponding to the coil current IL increases from the current value Ta to the current value Ic, the DC gain of the entire circuit of the switching regulator 1C further decreases. As a result, the voltage value of the output voltage Vout relative to the target voltage Vtar (the voltage value V14) becomes a voltage value smaller than the target voltage Vtar. That is, as the output current Iout increases from the current value Ia to the current value Ic, the output voltage Vout decreases from a voltage value V13 to the voltage value V11. For this reason, stable power supply to the load 3C becomes difficult.

With respect to this, the lower graph of FIG. 33 shows a case where the voltage value of the regulated power supply 106C is added to the reference voltage Vref. That is, the difference from the upper graph is that in the upper graph, the reference voltage Vref is constant at the voltage value V10, whereas in the lower graph, the reference voltage Vref increases as the output current Iout increases.

Specifically, if the output current Iout changes to the current value Ia larger than 0 A, the voltage value of the regulated power supply 106C (the increase of the DC component of the converted voltage VL) is added to the voltage value of the reference power supply 107C, whereby the reference voltage Vref is changed from the voltage value V10 to the voltage value V20 larger than the voltage value V10. Further, if the output current Iout changes to the current value Ib larger than the voltage value Va, the voltage value of the regulated power supply 106C (the increase of the DC component of the converted voltage VL) is added to the voltage value of the reference power supply 107C, whereby the reference voltage Vref is changed from the voltage value V20 to the voltage value V21 larger than the voltage value V20. Furthermore, if the output current Iout changes to the current value Ic larger than the voltage value Vb, the voltage value of the regulated power supply 106C (the increase of the DC component of the converted voltage VL) is added to the voltage value of the reference power supply 107C, whereby the reference voltage Vref is changed from the voltage value V21 to the voltage value V22 larger than the voltage value V21.

That is, since the voltage value of the reference voltage Vref increases as the current value of the output current Iout increases, the ON periods (ON-Duty) of the MOS transistor 101C become longer than those before increasing of the current value of the output current Iout. As a result, as shown by the lower graph of FIG. 33, a graph line Oub representing change of the output voltage Vout represents a voltage value which is substantially the same as the voltage value V14 corresponding to the target voltage Vtar. As described above, in the switching regulator 1C of the present embodiment, it is possible to suppress the output voltage Vout from changing due to a change in the gain of the entire circuit, thereby capable of reducing the difference between the output voltage and the target voltage, and securing the stability of the voltage value of the output voltage Vout.

Eleventh Embodiment

Subsequently, an eleventh embodiment will be described. A switching regulator 1aC of the eleventh embodiment has been obtained by changing the configuration of a portion of the switching regulator 1C of the tenth embodiment. Specifically, in the tenth embodiment, a configuration in which in order to suppress the output voltage Vout from decreasing with increasing of the output current Iout corresponding to the coil current IL due to a change in the resistance valise of the load 3C, the voltage value of the reference voltage Vref is increased has been described. In contrast to this, in the eleventh embodiment, a configuration for suppressing decreasing of the output voltage Vout without increasing the voltage value of the reference voltage Vref will be described.

The configuration and process of the switching regulator 1aC of the eleventh embodiment are substantially the same as those of the tenth embodiment, except for the configuration of a portion. Thereafter, the difference will be mainly described with reference to FIGS. 34 and 35.

15. Configuration of Switching Regulator

Figure 34:
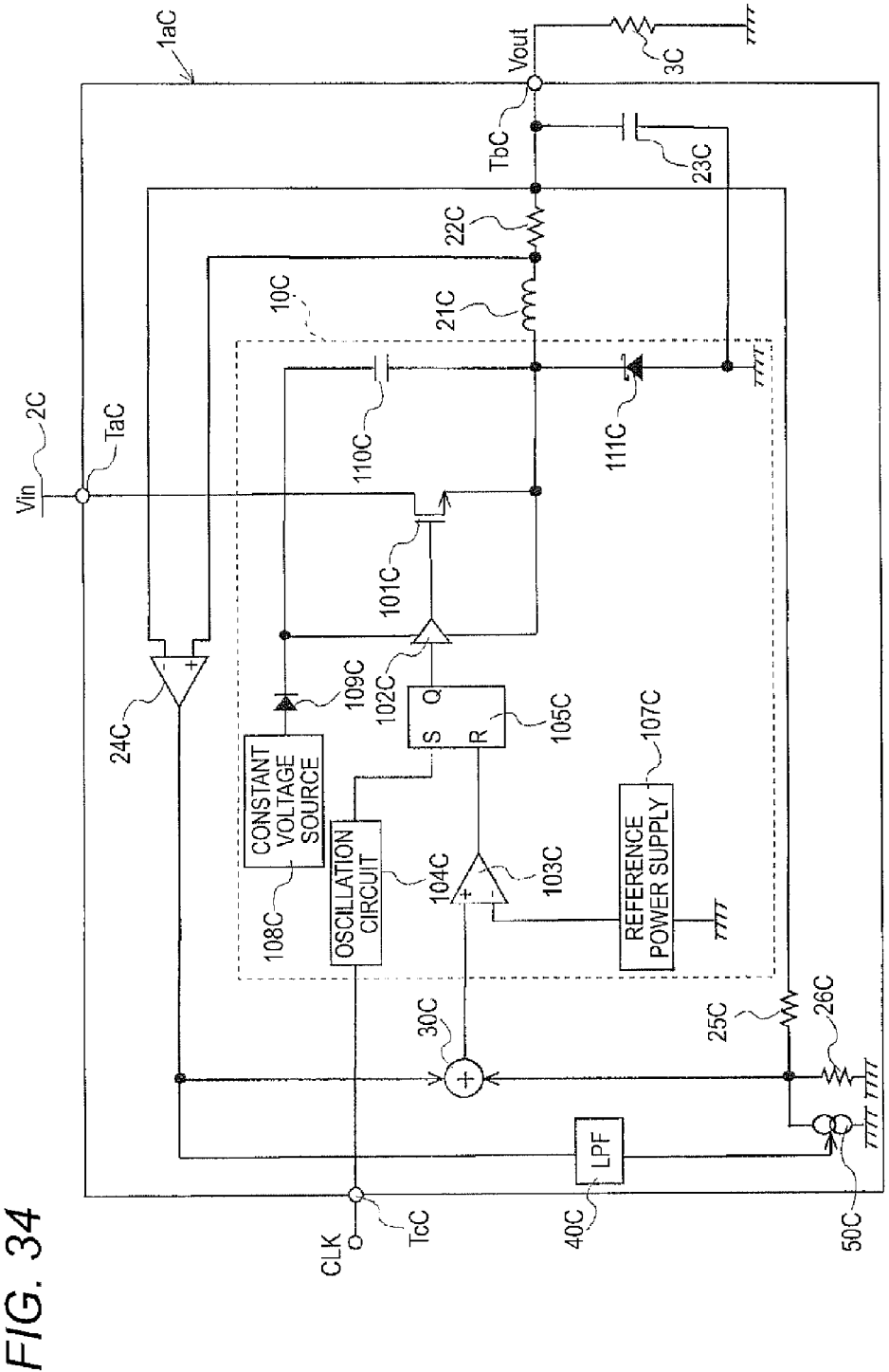
FIG. 34 is a view mainly illustrating the circuit configuration of a switching regulator of an eleventh embodiment.

FIG. 34 is a view mainly illustrating the circuit configuration of the switching regulator 1aC of the eleventh embodiment. Although the LPF 40C in the tenth embodiment is connected to the regulated power supply 106C, in the eleventh embodiment, since the voltage value of the reference voltage Vref is constant, an LPF 40C of the switching regulator 1aC of FIG. 34 does not need to be connected to the regulated power supply 106C. Therefore, the LPF 40C is not connected to the regulated power supply 106C and is connected to a constant current source 50C newly provided in the eleventh embodiment. Also, the constant current source 50C is connected to the connection point of the resistor 25C and the resistor 26C, and the other end thereof is connected to the ground.

16. Operation of Switching Regulator

Figure 35:
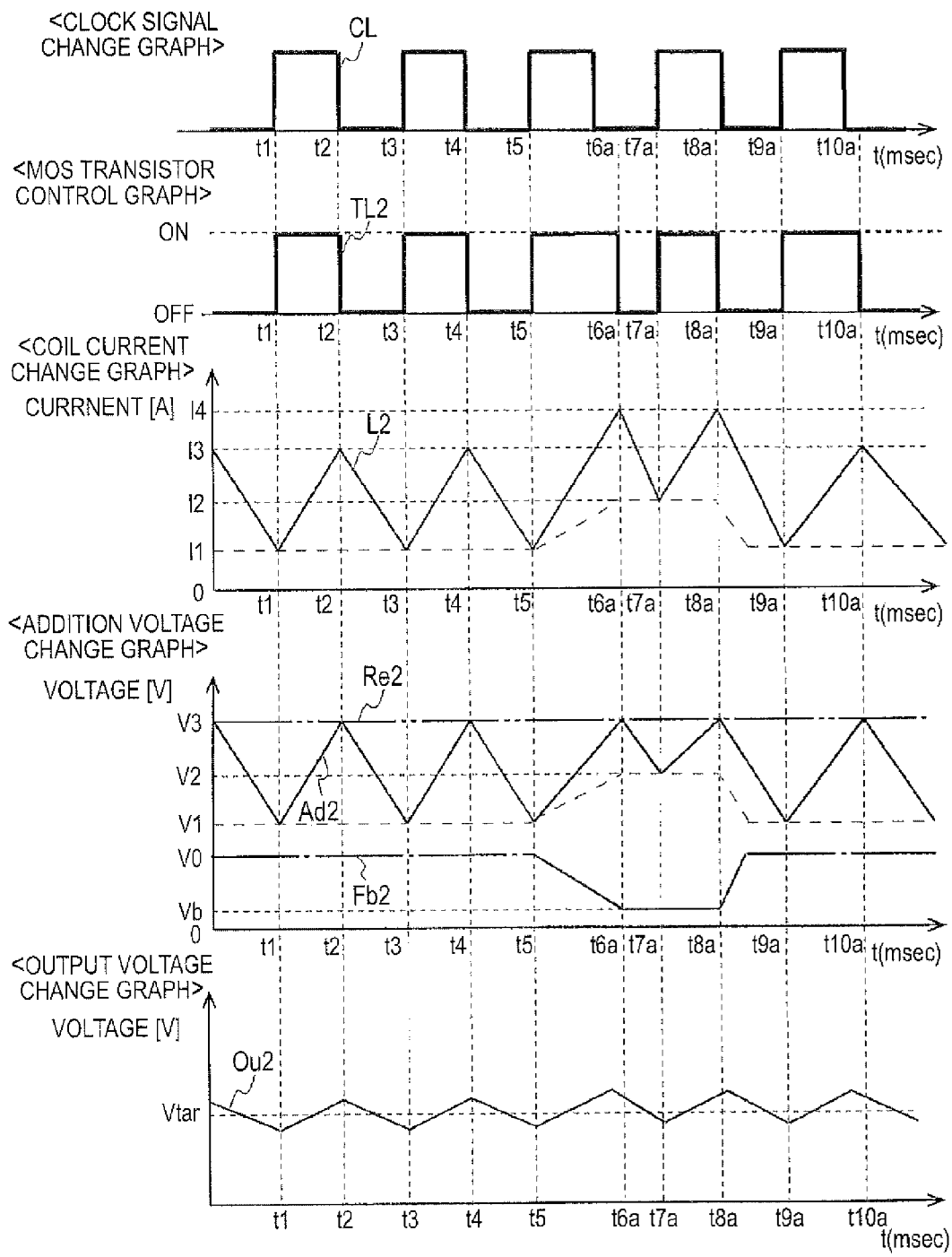
FIG. 35 is view illustrating temporal changes of individual signals relative to the switching regulator.

FIG. 35 is a view illustrating temporal changes of individual signals relative to the switching regulator 1aC. In FIG. 35, in the period from the time t1 until the time t5, temporal changes of the individual signals are the same as those of the tenth embodiment described with reference to FIG. 32, and after the time t5, temporal changes of the individual signals are different from those of the tenth embodiment.

Specifically, since the resistance value of the load 3C decreases at the time t5, in a period from the time t5 until a time t6a, the coil current IL corresponding to the output current Iout increases from the current value I1 to the current value I4 as shown by a current graph line L2 in the coil current change graph. In this case, in the tenth embodiment, with increasing of the coil current IL, the addition voltage Vad increases, and the increase of the DC component of the converted voltage VL to be included in the addition voltage. Vad becomes the voltage value of the regulated power supply 106C. Thereafter, since the voltage value of the reference voltage Vref increases by the voltage value of the regulated power supply 106C, the ON-Duty period of the MOS transistor 101C lengthens. As a result, as the coil current IL increases to the current value I4 larger than the current value I3, the addition voltage Vad increases to the voltage value V4 larger than the voltage value V3.

In contrast to this, in the switching regulator 1aC of the eleventh embodiment, since the voltage value of the reference voltage Vref is constant, even if the coil current IL increases, as shown by an addition graph line Ad2, the addition voltage Vad does not increase beyond the voltage value V3 of the reference voltage Vref shown by a reference graph line Re2. In other words, if the addition voltage Vad becomes the same voltage value as the voltage value V3 of the reference voltage Vref, the MOS transistor 101C is switched from the ON state to the OFF state. As described above, at the time t5, the MOS transistor 101C is turned on, and at the time t6a earlier than the time t6 shown in the tenth embodiment, the MOS transistor 101C is turned off. Thereafter, at a time t7a, the MOS transistor 101C is turned on again.

Also, in the period from the time t5 until the time t6a, as the coil current IL increases due to a decrease in the resistance value of the load (as the current value of the coil current IL in the period from the time t5 until the time t6a becomes larger than the current value in the period from the time t1 until the time t2 or in the period from the time t3 until the time t4 since the resistance value of the load 3C in the period from the time t5 until the time t6a becomes smaller than resistance value of the load 3C in the period from the time t1 until the time t2 or in the period from the time t3 until the time t4), the DC component of the coil current IL increases (from the current value I1 to the current value I2). Also, with the increasing of the DC component of the coil current IL, the DC component of the converted voltage VL also increases, and the DC component of the addition voltage Vad increases (from the voltage value V1 to the voltage value V2). However, since the voltage value of the reference voltage Vref shown by the reference graph line Re2 is constant at the voltage value V3, the voltage value of the addition voltage Vad does not increase beyond the voltage value V3. As a result, as the DC component of the converted voltage VL increases, the addition voltage Vad increases, and the feedback voltage Vfb decreases from the voltage value V0 to the voltage value Vb as shown by a feedback graph line Fb2.

Thereafter, at the time t7a, the MOS transistor 101C is turned on, and until a time t8a, the ON state is maintained. Then, at the time t8a, the MOS transistor 101C is turned off, and until a time t9a, the OFF state is maintained.

In this case, the ON period of the MOS transistor 101C from the time t7a to the time t8a is shorter than a period when the coil current IL increases (for example, the ON period from the time t5 until the time t6). Also, the OFF period of the MOS transistor 101C from the time t8a to the time t9a is shorter than a period when the coil current IL decreases (for example, the OFF period from the time t6a until the time t7a).

This is because if the current value of the coil current IL increases due to a decrease in the resistance value of the load 3C, since the DC component of the converted voltage VL to be included in the addition voltage Vad increases, and the reference voltage Vref is constant at the voltage value V3, without changing, as shown by the reference graph line Re2, the graph line slope of an addition graph line Ad2 representing the voltage value of the addition voltage Vad becomes smaller than the slope of the current graph line L2 representing the current value of the coil current IL. Also, at the time t8a, due to a decrease in the DC component of the converted voltage VL, the feedback voltage Vfb increases from the voltage value Vb to the voltage value V0 as shown by the feedback graph line Fb2.

Also, from the constant current source 50C of the switching regulator 1aC of FIG. 34, a flow corresponding to an increase in the DC component of the converted voltage VL flows. In other words, the converted voltage VL including the AC component and the DC component passes through the LPF 40C, whereby only the DC component of the converted voltage VL flows into the constant current source 50C. Further, an increase of the DC component of the coil current IL flowing from the coil 21C due to the increase of the DC component of the converted voltage VL, is shunted at the connection point of the resistor 22C and the capacitor 23C, thereby flowing to the ground through the feedback loop. As described above, a current corresponding to the increase of the DC component of the converted voltage VL is shunted. Also, the remaining current of the DC component of the coil current IL except for the increase is flows into the capacitor 23C, and electric charge corresponding to the output current Iout is accumulated in the capacitor 23C.

As a result, as shown by an output graph line Ou2, in the period from the time t1 until the time10, the output voltage Vout changes such that the output voltage Vout becomes substantially equal to the target voltage Vtar. As described above, since a portion of the coil current IL corresponding to the output current Iout is shunted to a different path on the basis of a current corresponding to the output current Iout, it is possible to suppress the output voltage Vout from changing due to a decrease in the gain of the entire circuit, and to reduce the difference between the output voltage Vout and the target voltage Vtar.

More specifically, since a portion of a current corresponding to the output current Iout (a current proportional to the DC current of the coil current IL) is shunted to a different path on the basis of the DC component of the converted voltage VL, it is possible to suppress the output voltage Vout from changing due to a change in the gain of the entire circuit, and to reduce the difference between the output voltage Vout and the target voltage Vtar.

<Modifications>

Although the tenth and eleventh embodiments of the present invention have been described above, the present invention is not limited to the tenth and eleventh embodiments described above, and can be modified into a variety of forms. Hereinafter, these modifications will be described. Also, all forms including forms having been described in the tenth and eleventh embodiments and forms to be described below can be appropriately combined.

In the tenth and eleventh embodiments described above, the configurations of the switching regulators have been described as examples; however, the switching regulators may include elements other than those described in the tenth and eleventh embodiments.

In the tenth and eleventh embodiments described above, the configurations of the switching regulators have been described as examples; however, some internal elements of the switching regulators may be provided outside.

In the tenth and eleventh embodiments described above, the N-channel MOS transistor 101A has been described as an example of a switching element; however, the circuit configuration may be changed to include any other switching element (for example, a P-channel MOS transistor).

What is claimed is:

1. A switching regulator configured to convert an input voltage into an output voltage, the switching regulator comprising:
    a control unit configured to perform switching control in response to a result of comparison between a reference voltage and a complex voltage which includes a feedback voltage acquired by feeding back the output voltage, and a derived voltage derived on the basis of an input current; and
    an adding unit configured to add currents,
    wherein the adding unit adds a feedback current acquired by converting the feedback voltage, and the input current including an AC component and a DC component, to derive the complex voltage.

2. The switching regulator according to claim 1, further comprising:
    a transistor configured to be subjected to switching control; and
    a coil connected to an output side of the transistor,
    wherein the input current is a current flowing in the coil.

3. The switching regulator according to claim 2, further comprising a comparing unit configured to compare the complex voltage and the reference voltage,
    wherein the transistor is turned on in response to an edge of a clock signal having a fixed period, and is turned off in response to an output signal from the comparing unit.

4. The switching regulator according to claim 2, further comprising a first resistor connected at a previous stage of an output terminal at the output side of the transistor,
    wherein the complex voltage is a voltage at an upstream side of the first resistor.

5. The switching regulator according to claim 2, further comprising:
    a filter unit configured to pass therethrough the DC component of the input current corresponding to the DC component of the derived voltage; and
    a generating unit configured to generate a first slope current whose current value increases and then decreases with time, wherein the complex voltage includes the feedback voltage, the DC component of the derived voltage, and a voltage corresponding to the first slope current.

6. The switching regulator according to claim 5, wherein the generating unit generates the first slope current whose current value increases at a constant slope at an ON timing of the transistor and then is reset at an OFF timing of the transistor.

7. The switching regulator according to claim 1, further comprising a second resistor configured to derive the complex voltage on the basis of a complex current including the input current and a feedback current corresponding to the feedback voltage.

8. The switching regulator according to claim 1, further comprising a changing unit configured to change the reference voltage in response to the current value of the input current.

9. The switching regulator according to claim 8, wherein the changing unit increases the reference voltage in response to an increase in the DC component of the input current.

10. A switching regulator configured to convert am input voltage into an output voltage, the switching regulator comprising:
a control unit configured to perform switching control in response to a result of comparison between a reference voltage and a complex voltage which includes a feedback voltage acquired by feeding back the output voltage, and a derived voltage derived on the basis of an input current;
a changing unit configured to change the reference voltage in response to the current value of the input current; and
a filter unit configured to pass therethrough the DC component of the input current,
wherein the changing unit increases the reference voltage in response to an increase in the DC component of the input current, and
wherein the changing unit converts the DC component of the input current output from the filter unit into a voltage, and adds the voltage to the reference voltage.

11. The switching regulator according to claim 1, further comprising a decreasing unit configured to decrease the complex voltage in response to an increase in the DC component of the input current.

12. The switching regulator according to claim 1, further comprising:
a supplying unit configured to supply a second slope current whose current value increases and then decreases with time; and
a signal outputting unit configured to output a signal for changing a rising rate of the current value of the second slope current, in response to the voltage value of the input voltage.

13. The switching regulator according to claim 12, wherein the signal outputting unit outputs a signal for reducing the rising rate of the current value of the second slope current, in response to a decrease in the input voltage.

14. The switching regulator according to claim 1, further comprising a setting unit configured to set the reference voltage in response to a peak value of the input current.

15. A switching regulator configured to convert and input voltage into an output voltage, the switching regulator comprising:
a control unit configured to perform switching control in response to a result of comparison between a reference voltage and a complex voltage which includes a feedback voltage acquired by feeding back the output voltage, and a derived voltage derived on the basis of an input current;
a setting unit configured to set the reference voltage in response to a peak value of the input current, and
a supplying unit configured to supply a slope current whose current value increases and then decreases with time, to the complex voltage,
wherein the setting unit sets the reference voltage in response to a peak value of the input current and a peak value of the slope current.

16. The switching regulator according to claim 15, wherein the setting unit adds the peak value of the input current and the peak value of the slope current to a reference power supply voltage having a predetermined voltage value, to set the reference voltage.

17. The switching regulator according to claim 14, further comprising an acquiring unit configured to acquire a peak value of a current,
wherein the acquiring unit acquires the peak value in one cycle from ON to OFF of the switching control, and resets the peak value having been acquired in the previous cycle, thereby acquiring the peak value of the present cycle.

18. An electronic device comprising:
the switching regulator according to claim 1; and
a control device that receives the voltage of the switching regulator, thereby operating.

19. An electronic circuit configured to convert an input voltage into an output voltage, the electronic circuit comprising:
a control unit configured to perform switching control in response to a result of comparison between a reference voltage and a complex voltage which includes a feedback voltage acquired by feeding back the output voltage, and a derived voltage derived on the basis of an input and
an adding unit configured to add currents
wherein the adding unit adds a feedback current acquired by converting the feedback voltage, and the input current including an AC component and a DC component to derive the complex voltage.

* * * * *